(12) United States Patent
Yamada

(10) Patent No.: US 7,143,111 B2
(45) Date of Patent: Nov. 28, 2006

(54) MAGAZINE AUTOMATIC EDITING SYSTEM

(75) Inventor: Syuji Yamada, Hiroshima (JP)

(73) Assignee: Joho Service Corporation, Hiroshima (JP)

( * ) Notice: Subject to any disclaimer, the term of this patent is extended or adjusted under 35 U.S.C. 154(b) by 259 days.

(21) Appl. No.: 10/481,225

(22) PCT Filed: Apr. 17, 2002

(86) PCT No.: PCT/JP02/03799

§ 371 (c)(1),
(2), (4) Date: Dec. 16, 2003

(87) PCT Pub. No.: WO03/088079

PCT Pub. Date: Oct. 23, 2003

(65) Prior Publication Data

US 2004/0250203 A1 Dec. 9, 2004

(51) Int. Cl.
*G06F 17/30* (2006.01)
(52) U.S. Cl. .................... 707/104.1; 707/10; 709/203
(58) Field of Classification Search .................. 707/1, 707/100, 10, 3, 104.1; 705/10, 104.1; 709/203
See application file for complete search history.

(56) References Cited

U.S. PATENT DOCUMENTS

| | | | |
|---|---|---|---|
| 6,711,549 B1* | 3/2004 | Loeb et al. | 705/8 |
| 2002/0062358 A1* | 5/2002 | Kori | 709/219 |
| 2002/0165774 A1* | 11/2002 | Quinn et al. | 705/14 |
| 2002/0188635 A1* | 12/2002 | Larson | 707/515 |
| 2003/0069790 A1* | 4/2003 | Kane | 705/14 |
| 2004/0039750 A1* | 2/2004 | Anderson et al. | 707/103 R |
| 2004/0047510 A1* | 3/2004 | Kawabata | 382/232 |

FOREIGN PATENT DOCUMENTS

| | | |
|---|---|---|
| JP | 11-091189 | 4/1999 |
| JP | 2002-215262 | 8/2000 |
| JP | 2001-338046 | 12/2001 |
| JP | 2002-032506 | 1/2002 |

\* cited by examiner

*Primary Examiner*—Greta Robinson
*Assistant Examiner*—Cheryl Lewis
(74) *Attorney, Agent, or Firm*—Flynn, Thiel, Boutell & Tanis, P.C.

(57) ABSTRACT

A system database stores client data, manuscript data, publication instruction data and sales data related to magazine editing and various data constituting a user and various information magazines. An image database stores image data to appear on an advertisement. An editing and imposition device fetches publication data accumulated in the database, performs automatic layout of a manuscript, and creates a page-up manuscript. An editing layout device displays the page-up manuscript and image data stored in the image database as a block copy image. A user terminal inputs client data, publication instruction data, manuscript data and sales data. A web application server executes a search request or an update request from the user terminal for data to the system database and the image database. The user terminal and the web application server to communicate with each other through an Internet network to enable a user to freely perform automatic editing.

13 Claims, 45 Drawing Sheets

Fig.1 HARDWARE CONFIGURATION

SHEET SPACE LAYOUT AND COORDINATE SYSTEM

Fig.4 Imposition and proofread processing flow (1)

Fig.5 Imposition and proofread processing flow (2)

Fig.8 WebJINS SYSTEM FUNCTIONAL CONFIGURATION (MANUSCRIPT DATA NEWLY REGISTRATION)

Fig.11 WebJINS SYSTEM FUNCTIONAL CONFIGURATION (MANUSCRIPT DATA DELETION)

Fig.12 WebJINS SYSTEM FUNCTIONAL CONFIGURATION (MANUSCRIPT DATA INQUIRY)

WebJINS system functional configuration
(manuscript block copy output, manuscript block copy fax transmission)

Fig.14

MANUSCRIPT FORMAT

| FIXED FRAME | |
|---|---|
| COMPANY NAME | LABEL |
| ESSENTIAL POINTS FOR RECRUITMENT | |
| WHERE TO MAKE CONTACT | |

HEADING

BODY

MAP

LOGO

Fig.15 WebJINS SYSTEM FUNCTIONAL CONFIGURATION (CLIENT INFORMATION REGISTRATION)

Fig.16 WebJINS SYSTEM FUNCTIONAL CONFIGURATION (CLIENT INFORMATION CHANGE)

Fig.17 WebJINS SYSTEM FUNCTIONAL CONFIGURATION
(CLIENT INFORMATION DELETION)

Fig.18 WebJINS SYSTEM FUNCTIONAL CONFIGURATION (CLIENT INFORMATION INQUIRY)

Fig.20 WebJINS SYSTEM FUNCTIONAL CONFIGURATION (Publication instruction change registration)

WebJINS SYSTEM FUNCTIONAL CONFIGURATION
(Publication instruction stop)

Fig.22 WebJINS SYSTEM FUNCTIONAL CONFIGURATION (Publication instruction deletion)

Fig.23 WebJINS SYSTEM FUNCTIONAL CONFIGURATION (Publication instruction duplication)

Fig.25 WebJINS SYSTEM FUNCTIONAL CONFIGURATION
(Sales newly registration)

Fig.26 WebJINS SYSTEM FUNCTIONAL CONFIGURATION (Sales change)

Fig.27 WebJINS SYSTEM FUNCTIONAL CONFIGURATION
(Sales deletion)

Fig.28 WebJINS SYSTEM FUNCTIONAL CONFIGURATION (Sales duplication)

Fig.29 WebJINS SYSTEM FUNCTIONAL CONFIGURATION (Sales inquiry)

Fig.30 WebJINS SYSTEM FUNCTIONAL CONFIGURATION (MAINTENANCE FUNCTION)

Fig.31 MAINTENANCE OPERATION SYSTEM SCREEN TRANSITION VIEW

Fig.32 MAINTENANCE (Web) OPERATION SYSTEM SCREEN TRANSITION VIEW

Fig.33 WebJINS SYSTEM VB MAINTENANCE FUNCTIONAL CONFIGURATION (ASP COMPANY REGISTRATION)

Fig.34 WebJINS SYSTEM VB MAINTENANCE FUNCTIONAL CONFIGURATION (ASP COMPANY INFORMATION MAGAZINE LAYOUT REGISTRATION)

Fig.35 WebJINS SYSTEM VB MAINTENANCE FUNCTIONAL CONFIGURATION
(ASP COMPANY EXTERNAL CHARACTER CONVERSION TABLE REGISTRATION)

Fig.36 WebJINS SYSTEM VB MAINTENANCE FUNCTIONAL CONFIGURATION
(REGISTRATION OF ADVERTISEMENT AGENTS/GOOD CLIENTS OF REGISTERATION COMPANY)

Fig.37 WebJINS SYSTEM Web MAINTENENCE FUNCTIONAL CONFIGURATION (Person-in-charge code maintenance)

Fig.38 WebJINS SYSTEM MAINTENENCE FUNCTIONAL CONFIGURATION (Post code maintenance)

Fig.39 WebJINS SYSTEM MAINTENENCE FUNCTIONAL CONFIGURATION
(Publication position maintenance)

Fig.40 WebJINS SYSTEM MAINTENENCE FUNCTIONAL CONFIGURATION (Calendar maintenance)

Fig.41 WebJINS SYSTEM MAINTENENCE FUNCTIONAL CONFIGURATION
(Cleint classification name maintenance)

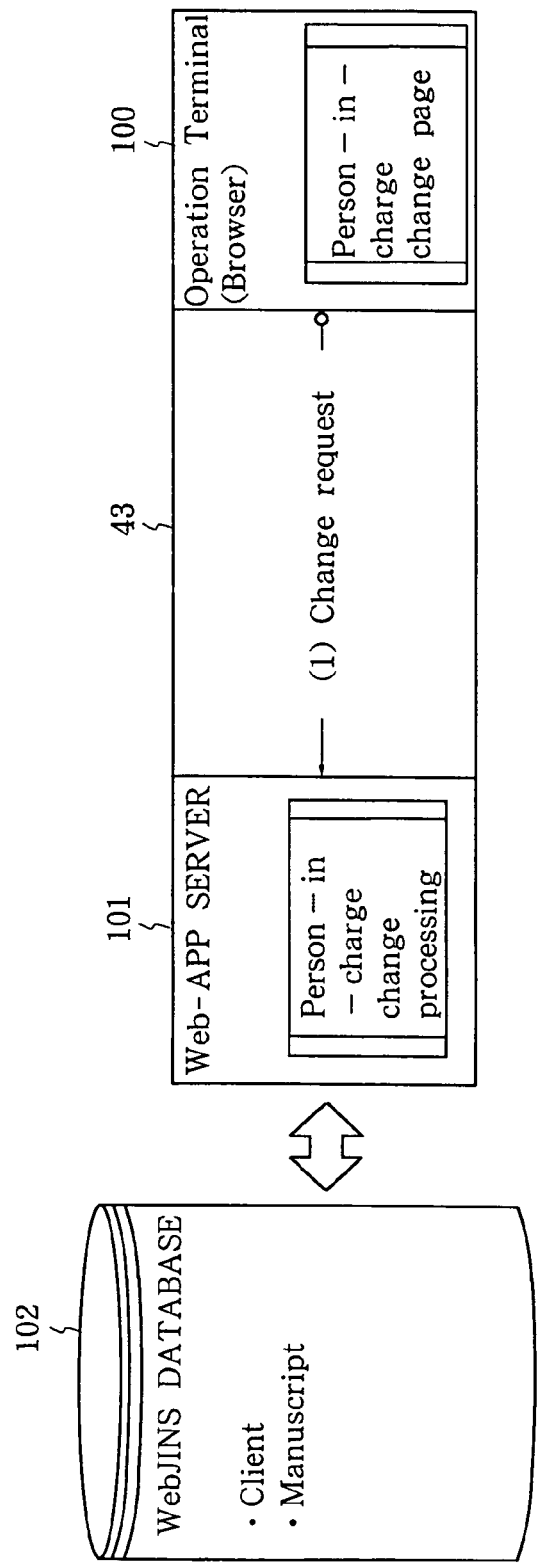
Fig.43 WebJINS SYSTEM MAINTENANCE FUNCTIONAL CONFIGURATION (CHANGE OF PERSON IN CHARGE)

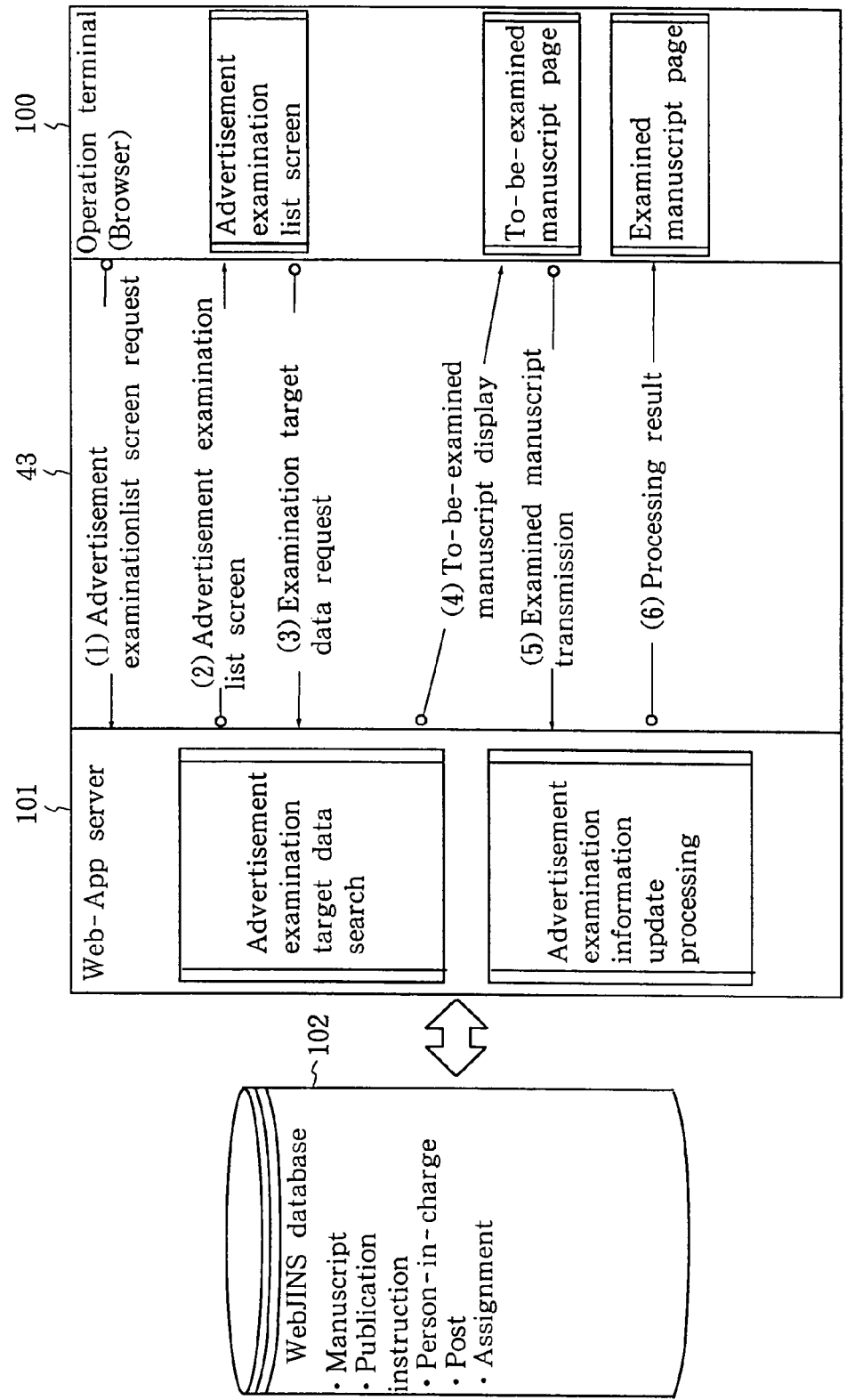
Fig.44 WebJINS SYSTEM FUNCTIONAL CONFIGURATION
(Advertisement examination function)

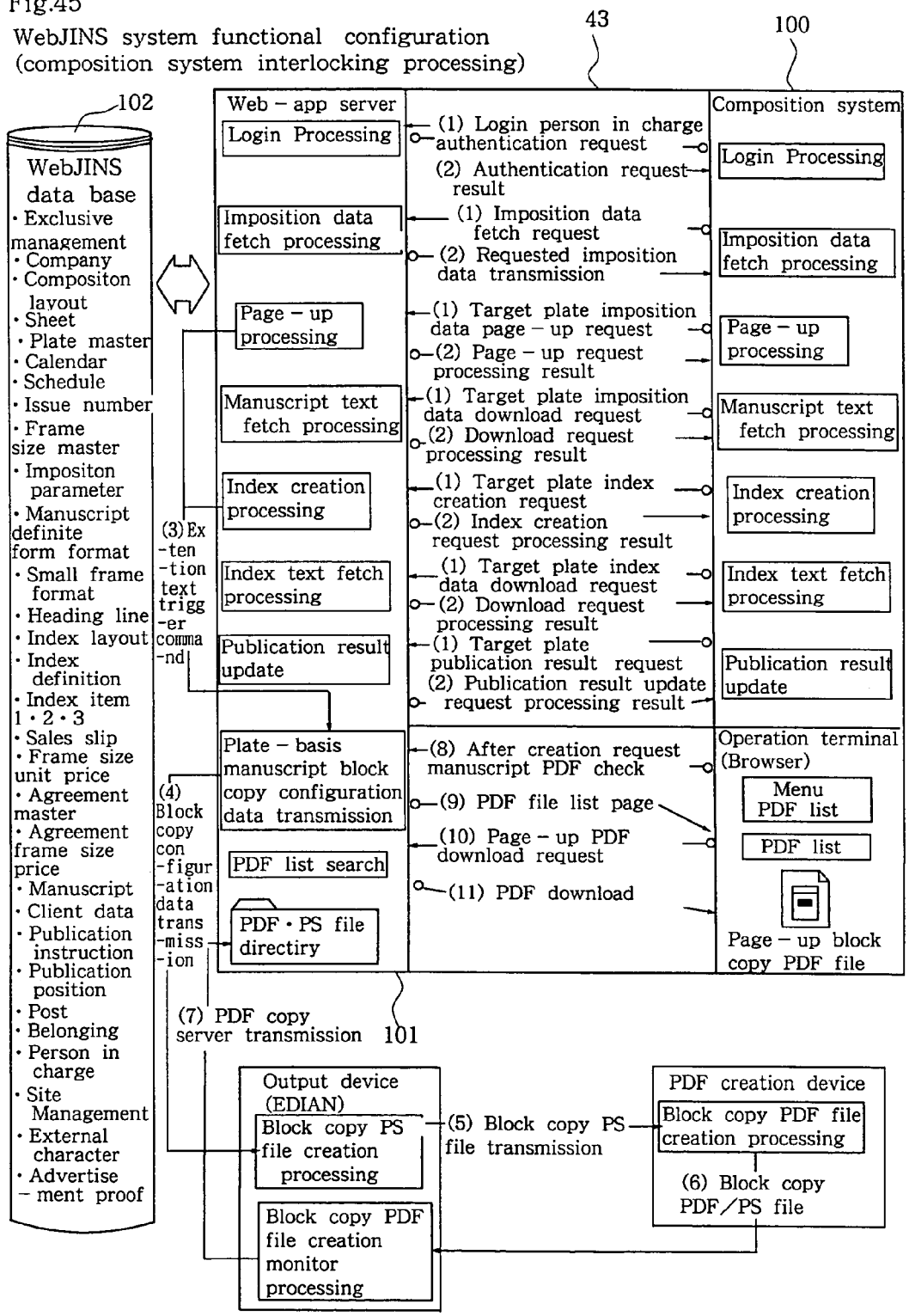

MAGAZINE AUTOMATIC EDITING SYSTEM

FIELD OF THE INVENTION

This invention relates to a magazine automatic editing system for various information, and particularly relates to a magazine automatic editing system capable of performing automatic editing through an Internet network.

BACKGROUND OF THE INVENTION

Various information magazines become products after experts make editing including imposition, plate-planning, photographic operation and the like followed by plate making, printing and bookbinding. Such imposition, plate-planning and photographic operation steps executed by experts and editing and printing steps which require quite intensive people rely on the skills of the professional engineers, manpower and the like, so that there is a limit to keeping certain levels in these steps.

Further, because of physical operation, there is a limit to shortening time from deadline to bookbinding. Further, if the number of people including sales persons to workers involved before presenting actual products to issue various information magazines is large, the probability of the occurrence of errors is high, accordingly. For example, erroneous product notation may be a fatal blow to publication and advertisement industries that may possibly degrade reputation.

Due to this, there have been proposed digitizing steps such as an imposition step, a proofreading step and a step of heating and printing a pre-sensitized plate, connecting a system to a user by a dedicated line such as LAN and thereby enabling the user to automatically edit various information magazines. However, the network cannot be freely used by users.

This invention has been made in view of these respects, and it is an object of this invention to provide an information magazine automatic editing system which enables a user to perform automatic editing through the Internet network and to freely use the system.

SUMMARY OF THE INVENTION

An invention is an information magazine automatic editing system including:

a system database storing and accumulating at least client data, manuscript data, publication instruction data and sales data related to various information magazine editing and various constant data constituting a user and various information magazines;

an image database storing and accumulating at least image data of one of a logo and a map to appear on an advertisement;

an automatic editing and imposition device fetching the publication related data accumulated in the system database, creating imposition data from the publication indication data to perform automatic layout of a manuscript, and creating a page-up manuscript from imposition data;

an editing layout device fetching and displaying the page-up manuscript created by the automatic editing, imposition and proofread device and the image data stored in the image database, and transmitting the manuscript data transmission-requested from each user terminal to a client through a transmission software as a block copy image;

the user terminal searching and inputting at least the client data, the publication instruction data, the manuscript data and the sales data related to the various information magazine editing; and a Web application server executing a search request or an update request from the user terminal for each of the data to the system database and the image database using defined programs, having the feature in that the user terminal and the Web application server can communicate with each other through an Internet network.

Another invention for an information magazine automatic editing system has the feature in that the search request or the update request for automatic editing processing data is issued from the user terminal by requesting, from a client side browser, the defined JAVA (Registered trademark of Sun Microsystems, Incorporated) program of the Web application server to start a system search and input screen and by processing the search request or the update request transmitted through a communication device and the Internet network as a browser request by the defined JAVA script program of the Web application server, during monitoring the issued requests, if the Web application server receives one of the requests from the user terminal, the Web application server acquires a content of the request for the defined JAVA program from the user terminal, and if the Web application server receives the search request for client information, the Web application server requests the image database to search the client information having a designated client code and transmits the requested and searched client information to each of the user terminals through the Internet network, and the client side browser of the user terminal monitors the one issued request until the client side browser receives a response to the request after transmitting the request, displays a content of the response on a screen of the user terminal and appropriately continues later processings.

According to the invention the user terminal and the Web application server can communicate with each other through the Internet network, and the Web application server executes the search request or the update request for each of the data from the user terminal to the WebJINS system database and the image database using the defined programs, whereby a user can freely perform automatic editing through the Internet network.

BRIEF DESCRIPTION OF THE DRAWINGS

FIG. 14 shows an example of the definition of a manuscript format;

FIG. 43 is a view explaining the change of the person-in-charge in the maintenance function configuration;

FIG. 44 is a view explaining an advertisement examination function in the maintenance function configuration; and FIG. 45 is a view explaining the outline of a composition system interlocking processing.

DETAILED DESCRIPTION OF THE INVENTION

The embodiments of a magazine automatic editing system for various information according to this invention will be described hereinafter based on the drawings. One example of an automatic editing system is the WebJINS™ various information magazine automatic editing system sold by JoHo Service Corporation. However, this invention is not limited to any one embodiment.

Figure 1:
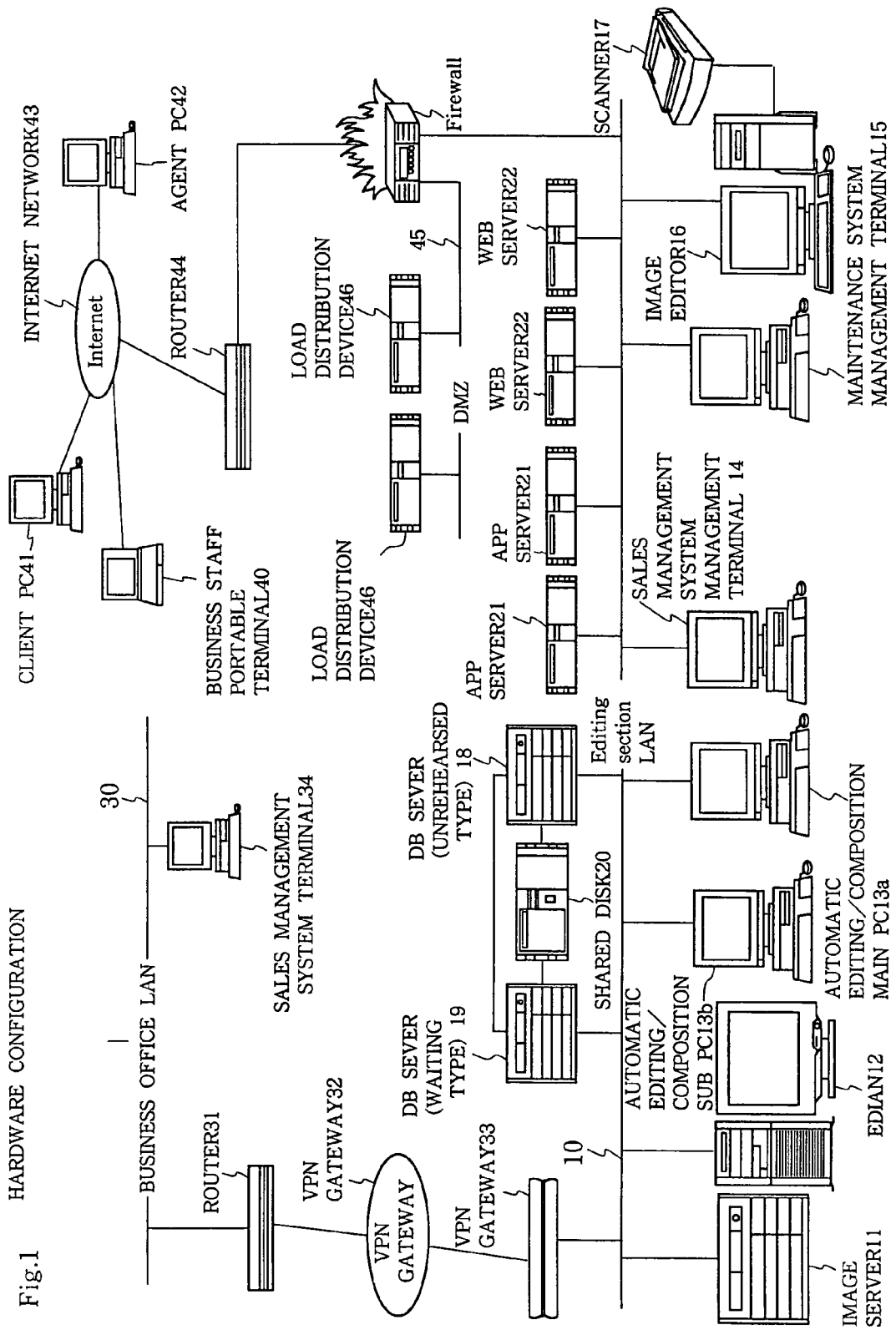
FIG. 1 is a hardware block diagram of an information magazine automatic editing system.

FIG. 1 is a hardware block diagram of the magazine automatic editing system. An image server 11, an output device (EDIAN: Registered trademark of Canon System Solutions, Incorporated) 12, an automatic editing/composition main PC 13a, an automatic editing/composition sub PC 13b, a sales management system management terminal 14, a maintenance system management terminal 15, and an image editor 16 are connected to an editing section LAN 10. An image is fetched by a scanner 17 into the image editor 16.

Further, an unrehearsed type DB server 18 and a waiting type DB server 19 are connected to the editing section LAN 10, and the unrehearsed type DB server 18 and the waiting type DB server 19 have a shared disk 20. An App server 21 and a Web server 22 are also connected to the editing section LAN 10.

Moreover, each business office LAN 30 is connected to the editing section LAN 10 through a router 31, a VPN gateway (Virtual Private Network) 32 and a VPN gateway 33. A sales management system terminal 34 is connected to each business office LAN 30.

A portable terminal 40 of each sales person and the user terminal of each of client PCs and agent PCs 42 are connected to the editing section LAN 10 through an Internet terminal 43 and a router 44. Load distribution devices 46 are connected between the editing section LAN 10 and the router 44 through a DMZ (DeMilitarized Zone) 45.

Figure 2:
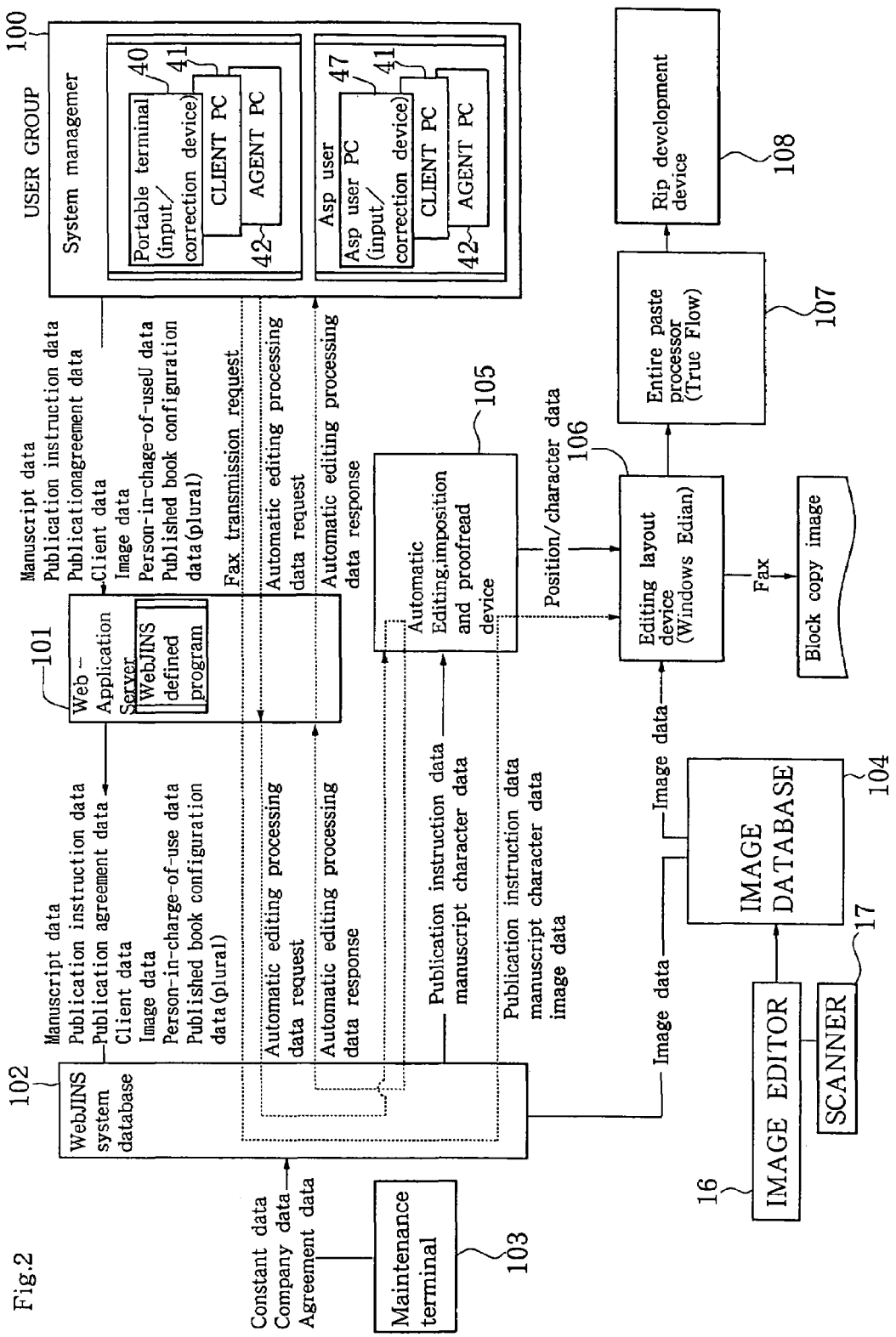
FIG. 2 is a block diagram showing elements related to the magazine automatic editing system.

FIG. 2 shows elements related to the information magazine automatic editing system.

The magazine automatic editing system includes a user terminal 100, a WEB application server 101, a system database 102, a maintenance terminal 103, an image database 104, the image editor 16, the scanner 17, an automatic editing, imposition and proofread device 105, an editing layout device 106, an entire paste processor 107, and an RIP development device 108.

The user terminal 100 is a PC (personal computer) used to search and input manuscript data, publication instruction data, publication agreement data, client data, image data, person-in-charge-of-use data, published book configuration data and sales data. In a system management company, the portable terminal 40, the client PC 41, the agent PC 42 and the like are used. An ASP (Application Service Provider) user uses an ASP user PC 47, the client PC 41, the agent PC 42 and the like.

The Web application server 101, which consists of the App server 21 and the Web server 22, executes a search request and an update request for the respective data from the terminal and the user terminal 100 to the respective databases using defined programs.

The system database 102, which consists of the unrehearsed type DB server 18, the waiting type DB server 19 and the shared disk 20, stores and accumulates the manuscript data, the publication instruction data, the publication agreement data, the client data, the image data, the personin-charge-of-use data, the published book configuration data and the sales (agreement information) data, and stores and accumulates various constant data constituting the person-in-charge-of-use and the book.

The maintenance terminal 103 carries out the maintenance of constant data such as a manuscript format used in the system. In addition, the maintenance terminal 103 registers information on companies (agents, clients, ASPs) that use the system. Further, the maintenance terminal 103 is a terminal which registers agreement information on companies (agents, clients, ASPs) that use the system.

The image database 104 which consists of the image server 11 fetches, stores and accumulates image data such as a logo or a map to appear on an advertisement using the image editor 16 and the scanner 17. This image editor 16 edits the images fetched by the scanner 17 and stores the fetched images in the image server 11.

The automatic editing, imposition and proofread device 105 and the editing layout device 106 consist of the automatic editing/composition main PC 13a and the automatic editing/composition sub PC 13b. The automatic editing, composition and proofread device 105 fetches the publication data (publication instruction, manuscript and client data) stored in the system database 102 into the system, and creates imposition data from the publication instruction data to perform the automatic layout of the manuscript (automatic editing). In addition, the automatic editing, composition and proofread device 105 allows the editing person to proofread (imposition-proofread) the automatically laid-out advertisement manuscript. Further, the automatic editing, composition and proofread device 105 creates a page-up manuscript to be fetched by the editing layout device from the imposition data.

The editing layout device 106 fetches and displays the page-up data created by the automatic editing, imposition and proofread device 105 and the image data on the image server 11. The editing layout device 106 allows the editing person to finally check the displayed advertisement manuscript. The editing layout device 106 converts the advertisement manuscript into a PS (Post Script) file and supplies the PS file to the entire paste processor 107. In addition, the editing layout device 106 transmits, as a block copy image, the manuscript data, for which the portable terminal or each user terminal issues a facsimile transmission request, to a client facsimile through a facsimile software.

The entire paste processor 107 conducts a plate-planning processing to the PS file output in page output order, and transmits the processed PS file to the RIP development device 108.

Figure 3:
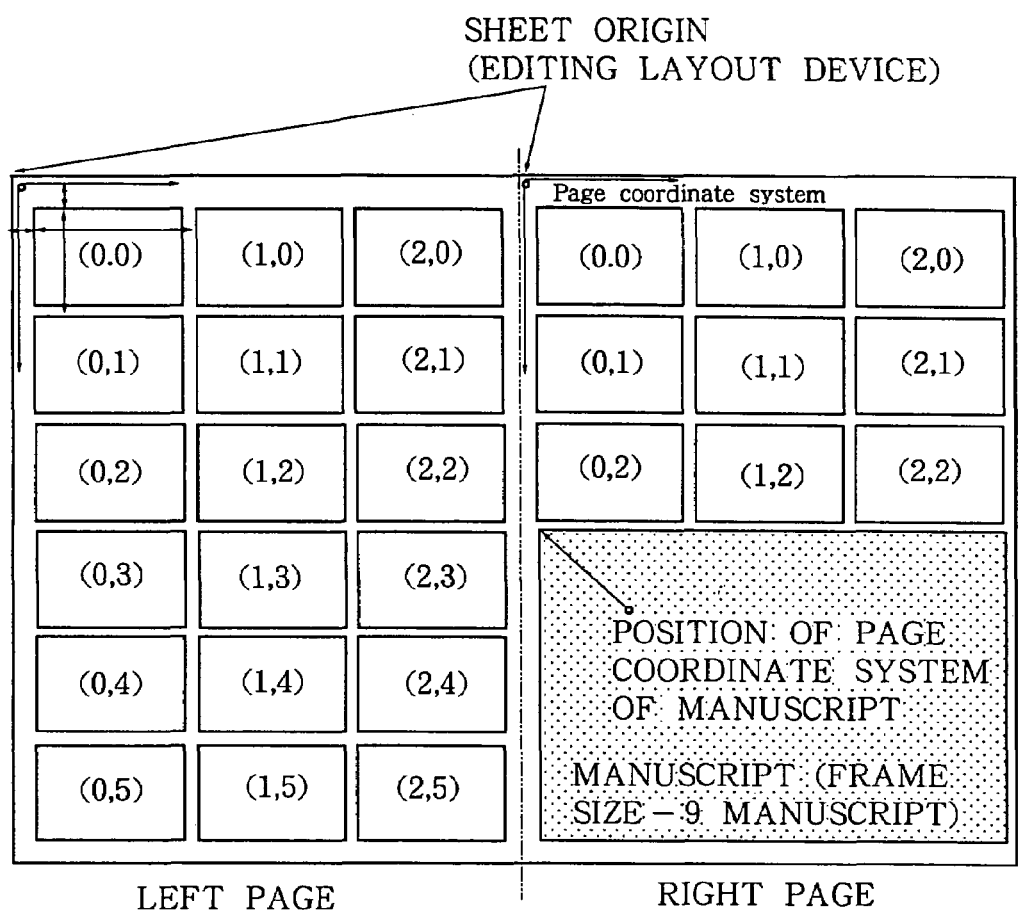
FIG. 3 shows the relationship between space layout and the manuscript origin positions and coordinate systems in an automatic editing/composition processing.

FIG. 3 shows the layout performed by the editing layout device 106. FIG. 3 shows the relationship between space layout and the manuscript origin positions and coordinate systems in an automatic editing/composition processing. A space is divided into grids with a manuscript of Format 1 set as a minimum unit, and each of the grids is allocated a page coordinate system with the upper corner position of each page as an origin. It is assumed that the position of the grid in the upper left corner of the page coordinate system is the position of the manuscript on the page coordinate system. The position of the page coordinate system of a manuscript of Format 9 is (0, 3).

The editing layout device 106 represents the distance of the manuscript to the upper left corner position thereof (distances of longitudinal and lateral direction components) by the coordinate system with the upper left corner of the sheet set as the coordinate of an origin. In the automatic editing processing and the imposition and proofread processing, the editing layout device 106 processes the position at which the manuscript appears as a page number and the page coordinate position as manuscript position data. In the page-up manuscript creation processing, only the page subjected to the imposition and proofread processing and x and y coordinates are transmitted to the system database 102 (the moving distance is calculated by the system database 102).

In this way, the present system enables holding communication between the user terminal 100 and the Web application server 101 over the Internet network 43 and enables the Web application server 101 to execute the search request or update request for each of the data from the user terminal 100 to the system database 102 and the image database 104 using the defined programs. This thereby makes it possible for a user to freely perform automatic editing through the Internet network 43.

Figure 4:
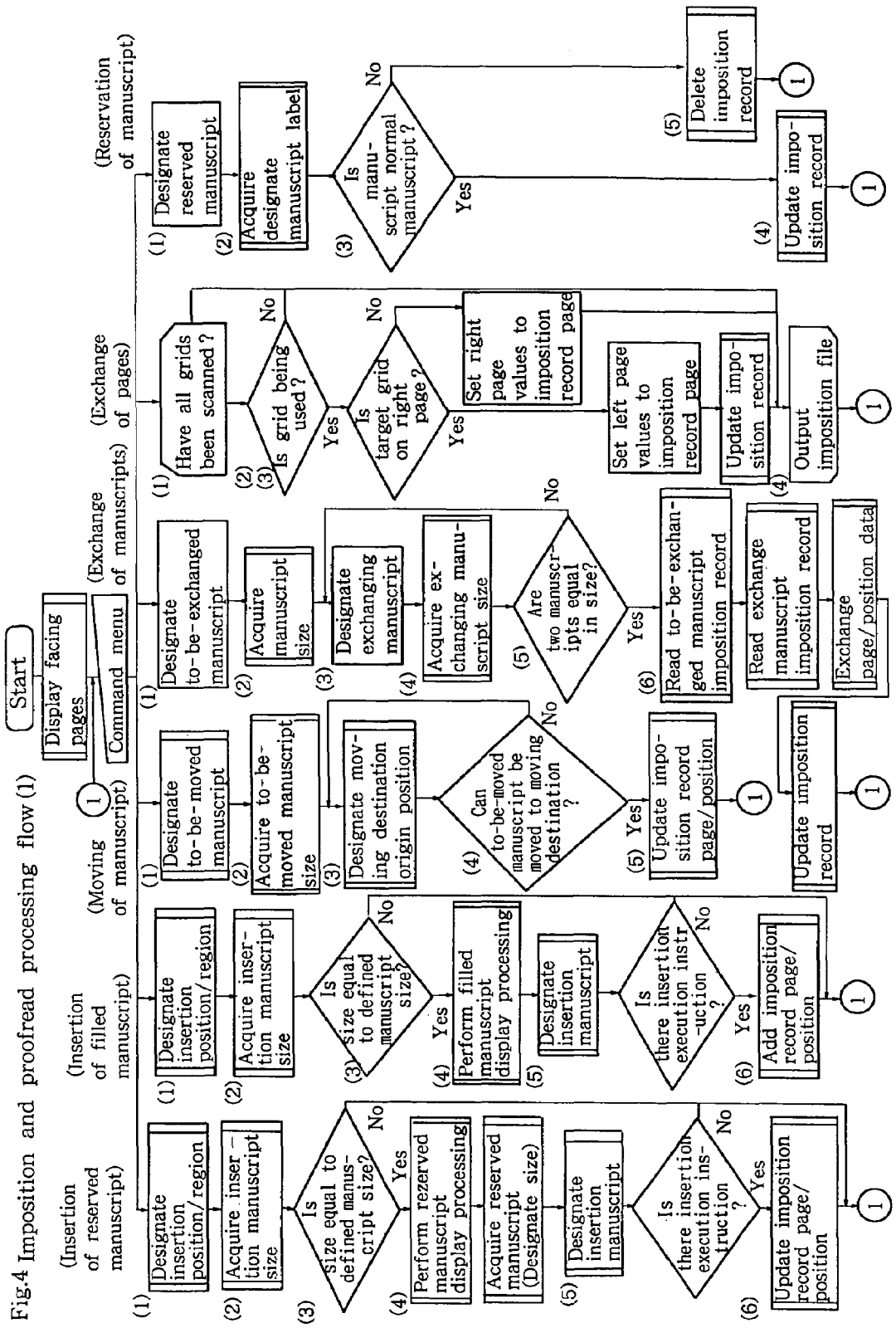
FIG. 4 is a flow chart for an imposition and proofread processing.
Figure 5:
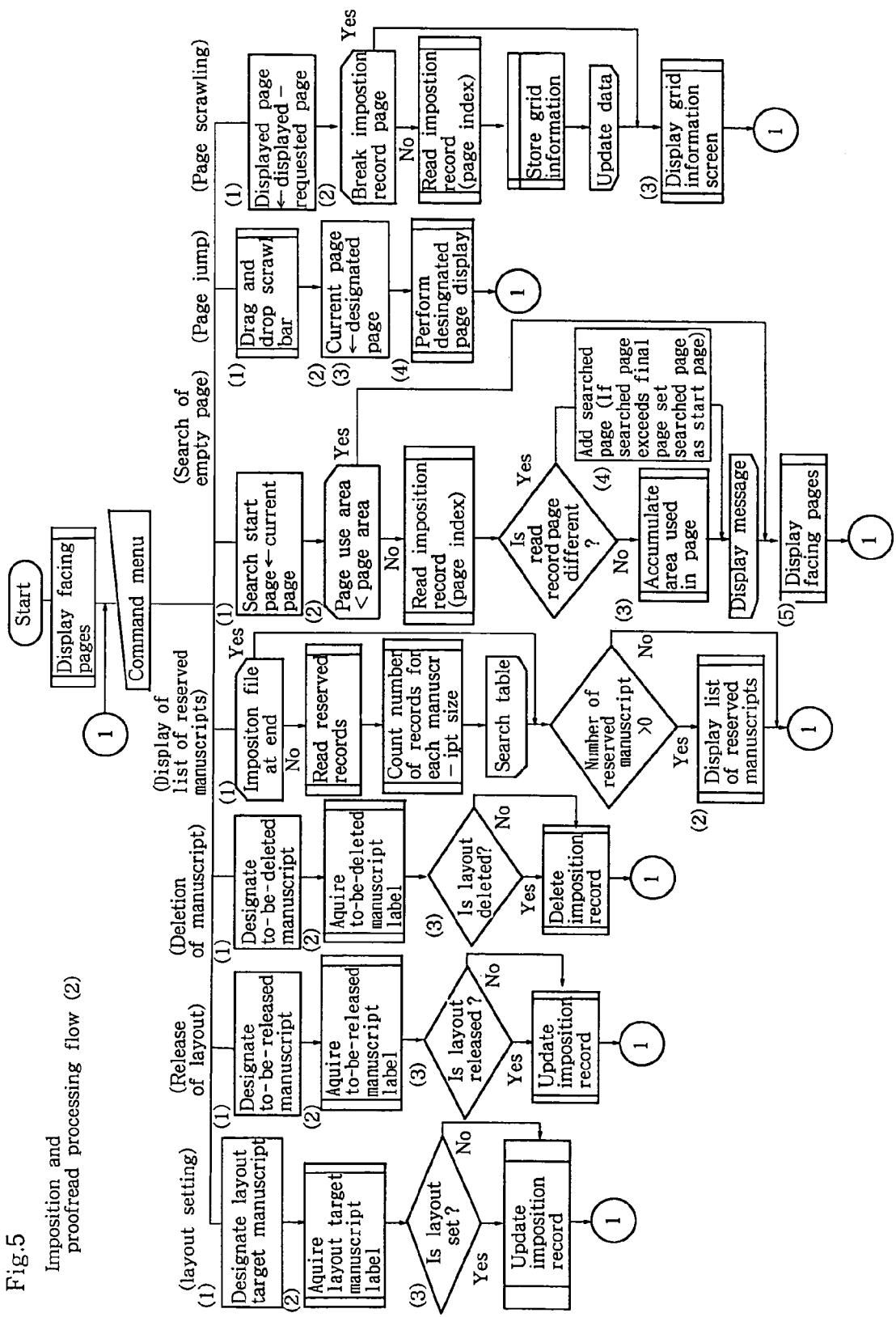
FIG. 5 is a flow chart for the imposition and proofread processing.

The imposition and proofread processing flow of the automatic editing, imposition and proofread device 105 is shown in FIGS. 4 and 5.

[Display of Facing Pages]

(1) Currently displayed pages (left and right pages) are set as a search key, the imposition file is read using a page order index, and a manuscript type, a manuscript label, a manuscript origin position coordinate, a manuscript size (width and height), a client classification 2 and the frequency of appearance are stored in each grid as grid data.

[Command Selection]

(1) An operation command is selected from a menu bar and a floating popup menu.

[Insertion of Reserved Manuscript]

(1) An operator designates the insertion position and the size of the insertion manuscript by displaying a rubber band (rectangular display).

(2) The size of the designated insertion region is acquired to check whether the size is the manuscript size that the system defines.

(3) If the size is not the defined size, the processing is returned to (1).

(4) Reserved manuscript records having the designated manuscript size are read from the imposition file to make a list of the reserved manuscript records thus read as a selection list.

(5) The operator selects a manuscript to be inserted from the list and issues an execution instruction.

(6) The page and coordinate position of the imposition record for which the insertion execution instruction is issued are updated.

[Insertion of Filled Manuscript]

(1) The operator designates the insertion position and the size of the insertion manuscript by displaying the rubber band (rectangular display).

(2) The size of the designated insertion region is acquired to check whether the size is the manuscript size that the system defines.

(3) If the size is not the defined size, the processing is returned to (1).

(4) Filled manuscript records of the designated manuscript size are read from the filled manuscript file to make a list of the filled manuscript records thus read as a selection list.

(5) The operator selects a manuscript to be inserted from the list and issues an execution instruction.

(6) An imposition record is added by adding the label, insertion page and coordinate position of the filled manuscript for which the insertion execution instruction is issued.

[Moving of Manuscript]

(1) The operator designates a manuscript to be moved.

(2) The size of the designated manuscript to be moved is acquired from the grid data.

(3) The operator designates the origin position (upper left corner) of a moving destination.

(4) It is checked whether there is another manuscript in a grid table of the width and height of the manuscript from the designated moving destination origin position. If there is another manuscript in the region, it is determined that this processing is a violation of operation and the processing is returned to (3).

(5) The page and coordinate position of the imposition record are set to moving destination position information to thereby update the imposition record.

[Exchange of Manuscripts]

(1) The operator designates a to-be-exchanged manuscript.

(2) The manuscript size of the to-be-exchanged manuscript is acquired from the grid data.

(3) The operator designates an exchanging manuscript.

(4) The manuscript size of the exchanging manuscript is acquired from the grid data.

(5) If there is no exchanging manuscript and the two designated manuscripts differ in manuscript size, it is determined that the processing is a violation of operation and the processing is returned to (3).

(6) The contents of the grid data are exchanged between the exchanged manuscript and the exchanging manuscript, and the pages and coordinate positions of the respective imposition records are exchanged to update the imposition file.

[Exchange of Pages]

(1) The position coordinate (X, Y) of the grid table is scanned to perform the following processings.

(2) The contents of the grid data are exchanged between the right and left pages.

(3) If there are manuscripts at the grids, page information on the two imposition records is exchanged.

(4) The imposition records are output to the imposition file.

[Reservation of Manuscript]

(1) The operator designates a reserved manuscript.

(2) The manuscript label of the manuscript designated by the operator is acquired from the grid table.

(3) The manuscript type (normal manuscript or filled manuscript) of the designated manuscript is determined.

(4) If the designated manuscript is a normal manuscript, the imposition record is updated.

(5) If the designated manuscript is a filled manuscript, delete the imposition record.

[Layout Setting]

(1) The operator designates a layout target manuscript.

(2) The manuscript label of the layout target manuscript is acquired from the grid table.

(3) If the operator executes a layout setting, the corresponding imposition record is updated in the imposition file.

[Release of Layout]

(1) The operator designates a manuscript to be released.

(2) The manuscript label of the to-be-released manuscript is acquired from the grid table.

(3) If the operator executes a layout release, the corresponding imposition record is updated in the imposition file.

[Deletion of Manuscript]

(1) The operator designates a manuscript to be deleted.

(2) The manuscript label of the to-be-deleted manuscript is acquired from the grid table.

(3) If the operator executes a deletion instruction, the corresponding imposition record is deleted from the imposition file.

[Display of a List of Reserved Manuscripts]

(1) The imposition file is read from the start, records in reserved states are searched from the table with manuscript labels and format number codes as classification keys, and the number of the records in reserved states is counted for each manuscript size.

(2) If there is a reserved manuscript, the content of the table on the memory is displayed on the list.

[Search of Empty Page]

(1) A currently displayed page (current page) is set as a search start page.

(2) The imposition file is read in page order, and the areas of the manuscripts to be used on the pages are accumulated until the break of page number.

(3) If the accumulated area for each page does not satisfy the total area of the page, a facing-pages display processing is called, and pages having empty regions are displayed on the screen.

(4) If the accumulated area for the page equals the total area, the searched page is added to move the processing to (2) (if the searched page exceeds the final page, the searched page is set as a start page).

(5) If there is no page having an empty region, a message is displayed.

[Page Jump]

(1) A scrawl bar is dragged and dropped.

(2) A page farthest from the scrawl bar is set as a search start page, the imposition file is read in the order of pages and coordinates, and the data of the grid table is updated.

(3) If there is an execution instruction, a requested page is set as a search start page.

(4) The manuscript label, the manuscript type, client classification 2 code, the frequency of appearance and the client name shown in the grid table are displayed on the screen.

[Page Scrawling]

(1) A key is depressed to add or subtract the requested page and a display-requested page is thereby calculated.

(2) The requested page is set as a search start page, the imposition file is read in order of pages and coordinates, and the data of the grid table is updated.

(3) The manuscript label, the manuscript type, client classification 2 code, the frequency of appearance and the client name shown in the grid table are displayed on the screen.

Figure 6:
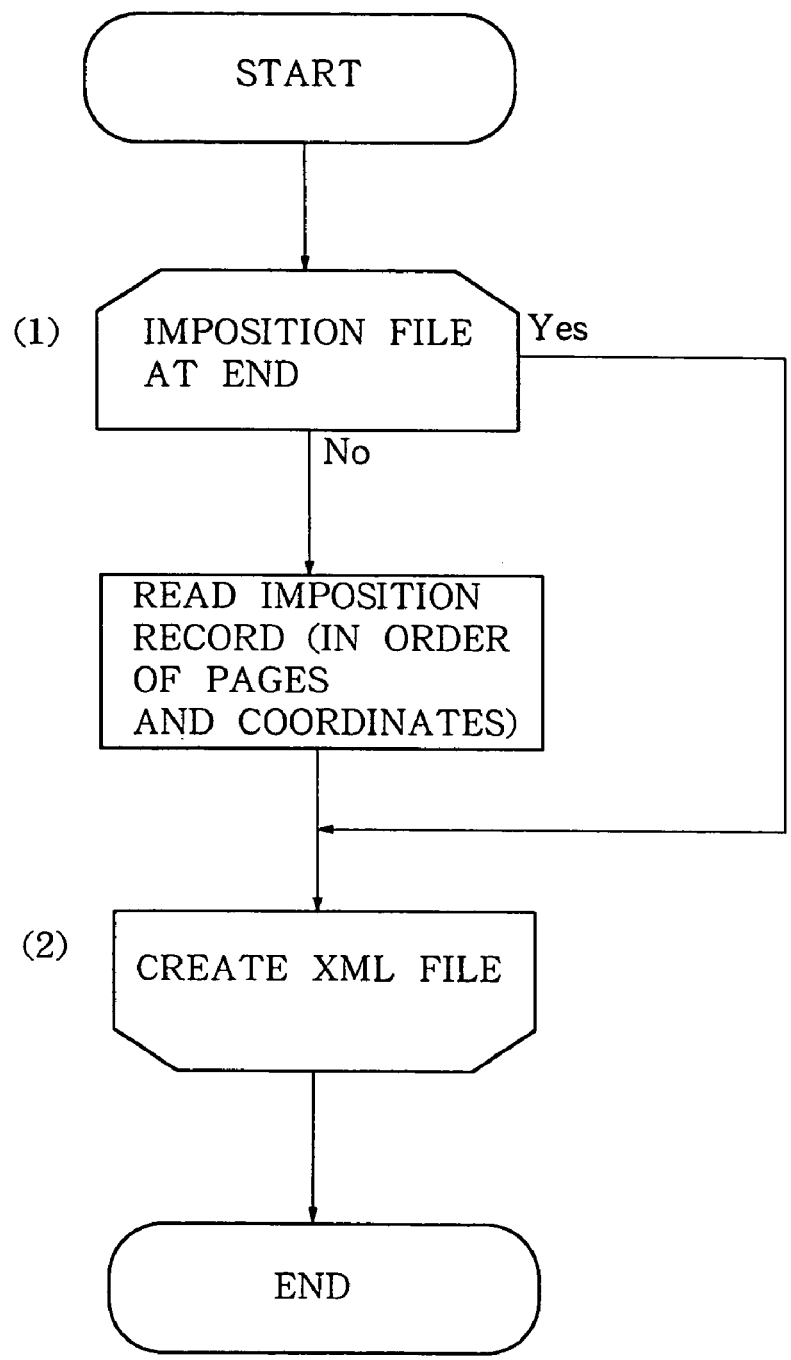
FIG. 6 is a control flow chart for a page-up manuscript creation processing.

FIG. 6 is a control flow chart for a page-up manuscript creation processing.

(1) In the page-up manuscript creation processing, the imposition file is read in order of pages and coordinates until the end of the file.

(2) Hierarchies are set for each index, and an XML file to be transmitted to the portable system is created.

Figure 7:
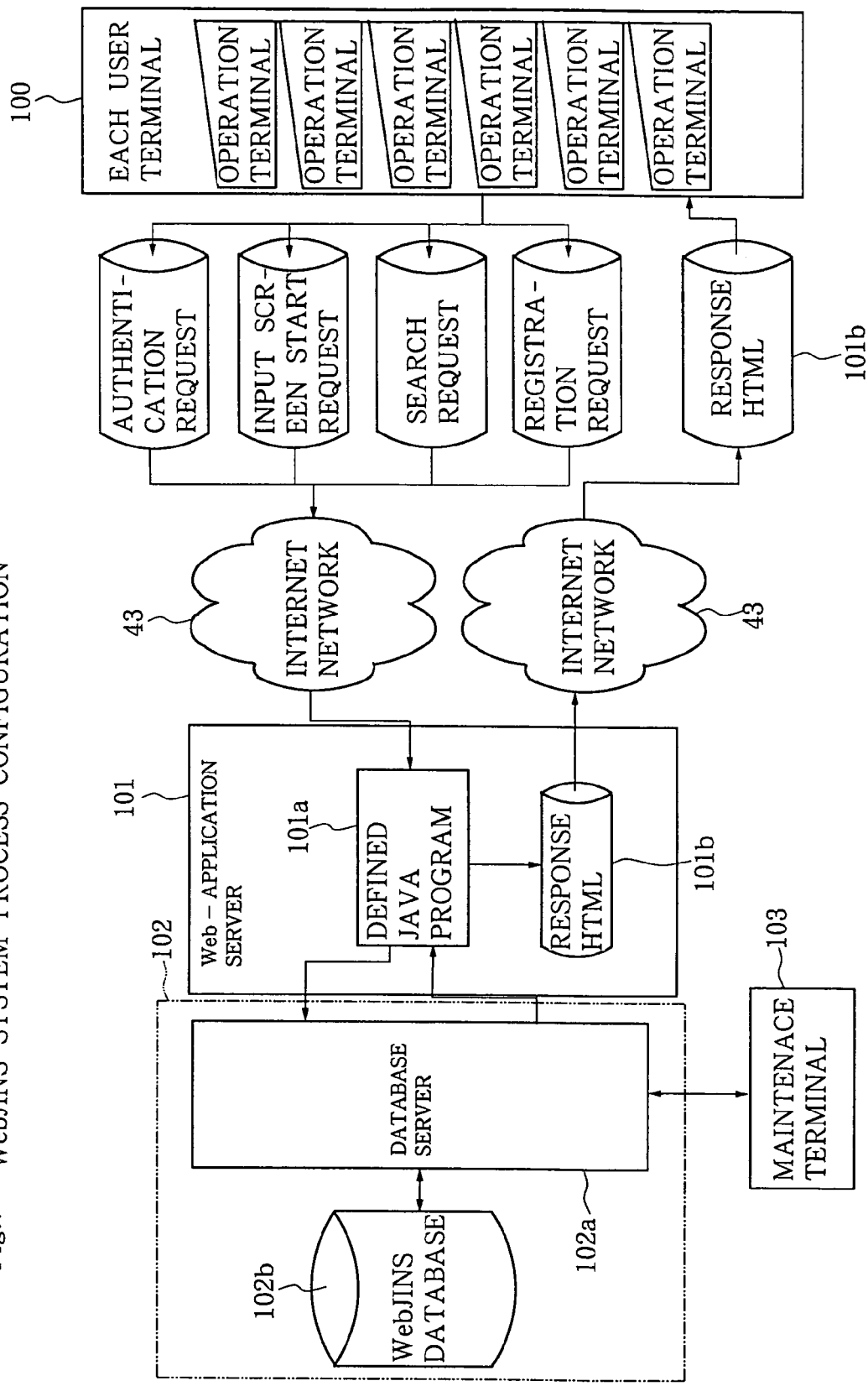
FIG. 7 is a process block diagram of a system.

FIG. 7 is a process block diagram of the WebJINS system. As shown in FIG. 7, the registration, correction, deletion processings and the like for client information, publication agreement information, manuscript text data and publication instruction information are mounted, as three hierarchy systems consisting of the user terminal 100, the Web application server 101 and the system database 102, into the various magazine automatic editing system in this embodiment. The system database 102 includes a database server 102a and a database 102b.

When each operation terminal (client) constituting the user terminal 100 issues a search request or an update request for these pieces of data, the defined JAVA (Registered trademark of Sun Microsystems, Incorporated) program 101a of the Web application server 101 is requested to start the search/input screen of this system from a client-side browser and the defined JAVA program 101a of the Web application server 101 processes the request as a browser request on the screen displayed in HTML format through a communications device such as a dedicated line, a cellular phone, a PUS or the like over the Internet network 43.

The Web application server 101 monitors an issued request. If receiving the request from an operation terminal, the Web application server 101 acquires the content of the request for the defined JAVA program 101a from the operation terminal. If receiving the search request for client information, the Web application server 101 requests the database server 102a of the system database 102 to search client information having a designated client code, creates searched client information as a response HTML 101b, and sends the created response HTML 101b to each operation terminal through the Internet network 43.

After transmitting the request, the client-side browser of the operation terminal monitors the issued request until the browser receives the response HTML 101b, displays the content of the response HTML 101b on a screen, and appropriately continues later processings.

Master codes such as a business department or client classification code, a publication index code and a person-in-charge code greatly differ according to users. The master codes are maintained by a person-in-charge authorized to have a maintenance right on the browser of this system. Changed data is designed to be registered and updated in the database server 102a through the Web application server 101.

Master codes such as company information, basic agreement information and external character data which are relatively little changed and should be managed by a management section are maintained on the maintenance terminal 103. Changed data is designed to be directly registered and updated in the database server 102.

The configuration of this magazine automatic editing system will be described in detail based on FIGS. 8 to 45.

Figure 8:
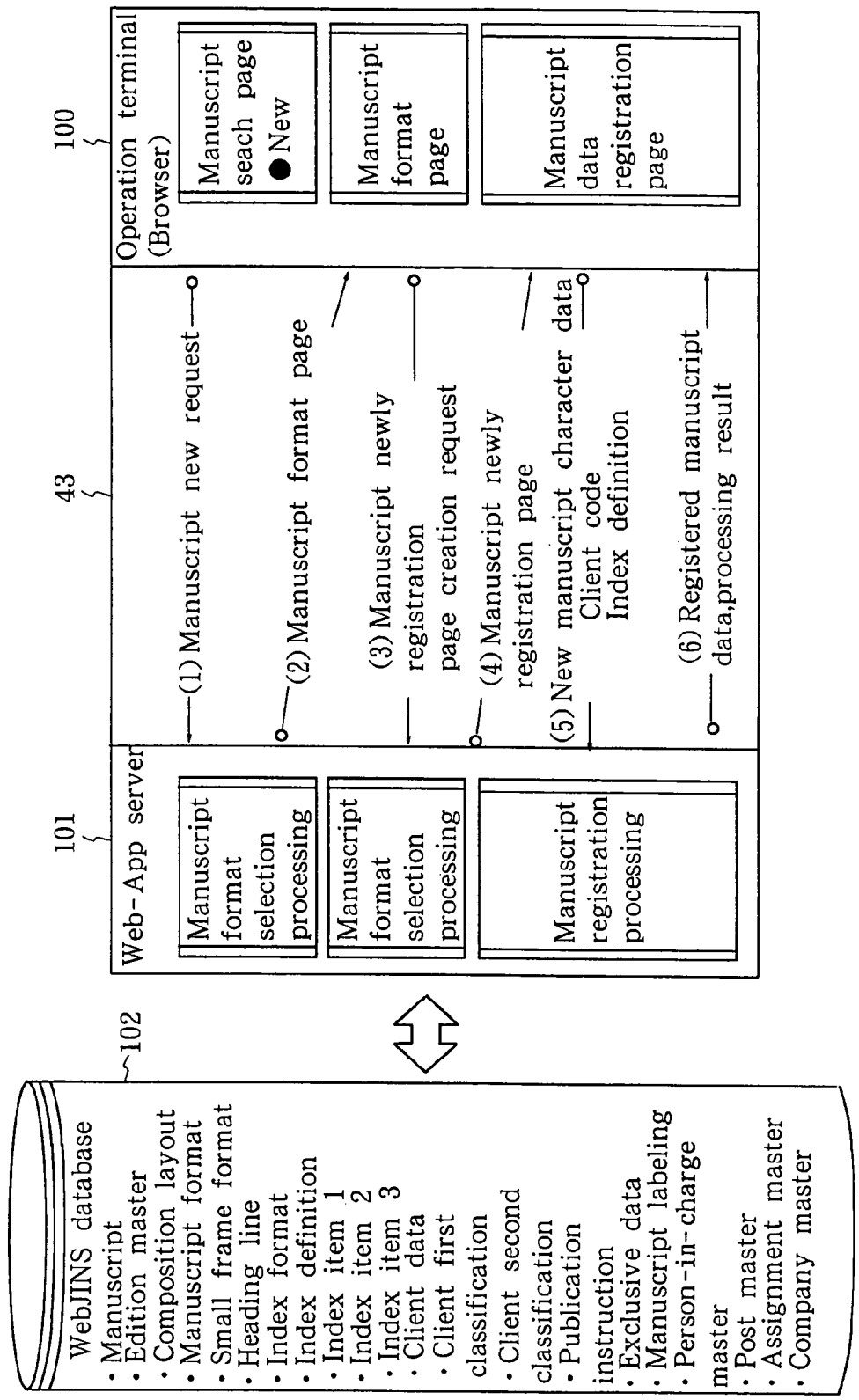
FIG. 8 is a view explaining the new registration of manuscript data.

FIG. 8 is a view explaining the new registration of manuscript data.

[Manuscript Data Registration Processing]

The operation terminal that constitutes the user terminal 100 executes a manuscript creation processing. In the manuscript data creation processing, a book which can be input (to be referred to as "edition" hereinafter) by login information is determined. By designating the editions on a top menu and an initial screen, a manuscript registration function can be utilized.

After designating the edition, manuscript information is selected, whereby already registered manuscript information search and new manuscript registration can be used.

(1) A new manuscript search request is transmitted to the Web application server 101 through the Internet network 43.

(2) The Web application server 101 transmits a new manuscript format page to the operation terminal in response to the new manuscript search request.

(3) The operation terminal selects the layout display of the transmitted new manuscript format page, whereby layout information on each edition is displayed in a tree state in WINDOWS (Registered trademark of Microsoft Corporation) Explorer form. By clicking on a tree name, a format number and a pattern are set on the upper portion of a page and a layout image on the right side is switched.

For the manuscript format information (such as the number of frames per manuscript format, the number of lines, the number of characters and the like per frame) arbitrarily designated by the new manuscript format, a format number code and a pattern number are designated and a new manuscript registration page creation request is transmitted to the Web application server 101.

(4) The Web application server 101 creates a new manuscript registration page based on the format number code and the pattern number in a manuscript definite form format table, a small frame format table, a heading line table in response to the received new manuscript registration page creation request, and transmits the created new manuscript registration page to the operation terminal.

(5) The operation terminal displays a manuscript data registration page according to the manuscript format based on manuscript management information and manuscript character data transmitted to the operation terminal.

To cancel the new registration, the page is returned to the initial screen page or the other page is started to thereby scrap the data.

To associate the registration manuscript data with a client, a client code is designated as the manuscript management information. If client information cannot be specified, the client information can be searched using a help function.

In the client search using the help function, the client code of a target client can be acquired using search functions such as client information telephone number search or client information and name search.

Index definition is made by selecting index items defined by the editions on the server from a combo box developed on the manuscript new registration page.

If the operation terminal executes a registration instruction for the client information on the manuscript data, the management data on the manuscript and the character data on the manuscript are edited on the page and the edited data is transmitted to the Web application server 101.

(6) The Web application server 101 fetches the manuscript management information and the manuscript character data from the transmitted data, executes a client code consistency check and the like, searches a manuscript labeling table by the manuscript registered year and month to label the manuscript, registers the manuscript management information, the manuscript frame number, the line number and the manuscript character data into the manuscript table, and transmits the manuscript character data including the set manuscript label to the operation terminal.

Thereafter, a registered manuscript data change processing and a duplication processing can be continuously performed.

Figure 9:
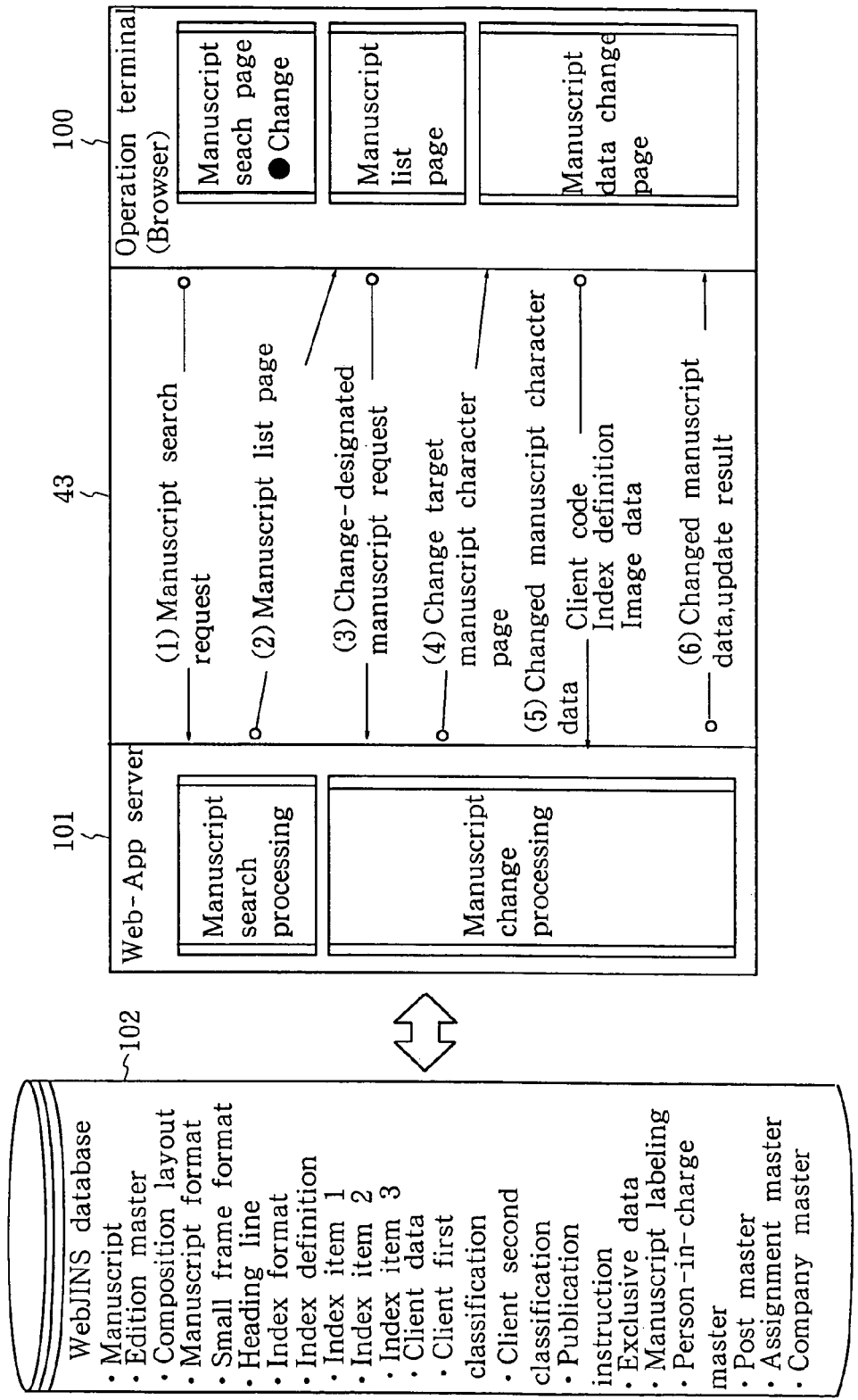
FIG. 9 is a view explaining the change of the manuscript data.

FIG. 9 is a view explaining the change of the manuscript data.

[Manuscript Data Change Processing]

(1) The operation terminal issues a search request to search information on a manuscript to be changed from the manuscript search page and transmits the search request to the Web application server 101.

On the manuscript search page, the manuscript information can be searched and acquired using a client code, a manuscript format number and pattern, a final publication day, a section to which the user belongs and a person in charge as search conditions.

The manuscript label can be searched by directly changing and designating the manuscript label of the to-be-changed manuscript from the manuscript search page.

In this case, the operation steps up to (4) can be omitted.

If a plurality of pieces of data exist in a search request range, operation is necessary according to steps (2) to (4).

(2) The Web application server 101 transmits a list of search-requested manuscripts to the operation terminal as a manuscript list page.

If the label of the to-be-changed manuscript is designated by the direct change, operation is carried out from the step (5) and the following.

(3) The operation terminal designates the to-be-changed manuscript data from the transmitted manuscript list page, and transmits the search request to the Web application server 101.

(4) The Web application server 101 searches an exclusive management table using the name of an exclusive target, the identification value of the exclusive target, a session ID and a processing ID as search conditions to thereby determine that the search-requested manuscript is not occupied by the other terminal.

If the requested manuscript is not occupied by the other terminal, the Web application server 101 outputs the name of the exclusive target, the identification value of the exclusive target, the session ID, the processing ID, a lock user company code, a post code, a person-in-charge code and lock time to the exclusive management table to occupy the manuscript data.

The Web application server 101 searches the manuscript management information and manuscript character data (frame number, line number, manuscript characters) from the manuscript data, edits the data as a response page, and transmits the response page to the operation terminal.

(5) The operation terminal displays the manuscript data changed page according to the manuscript format based on the transmitted manuscript management information and the manuscript character data.

If the change instruction is to be cancelled, the operation terminal transmits the name of the exclusive target, the identification value of the exclusive target, the session ID, the processing ID, the lock user company code, the post code, the person-in-charge code and the lock time to the Web application server 101.

Further, the operation terminal can transmit image data only if the manuscript is changed.

The image information (the name of an image entity file) is managed according to the manuscript label. During the new registration, the manuscript label is not set yet, so that the image information cannot be transmitted. However, during the registration of the change, the manuscript label is already set, so that the image data can be transmitted by giving the image entity file name according to a naming rule.

If the operation terminal issues a manuscript change instruction, the operation terminal edits the client information, the manuscript management information and the manuscript character data from the data input on the page and transmits the edited information and data to the Web application server 101.

(6) The Web application server 101 fetches the manuscript management information and the manuscript character data stored in the changed manuscript data transmitted to the server 101, executes a client code consistency check and the like, updates the manuscript table, deletes the requester terminal occupation entry from the exclusive management table, registers the change of the manuscript management information, the frame number of the manuscript, the line number of the manuscript and the manuscript character data into the manuscript table, and transmits the changed manuscript character data to the requester operation terminal as a processing result.

Thereafter, a registered manuscript data change processing and a duplication processing can be continuously performed.

Figure 10:
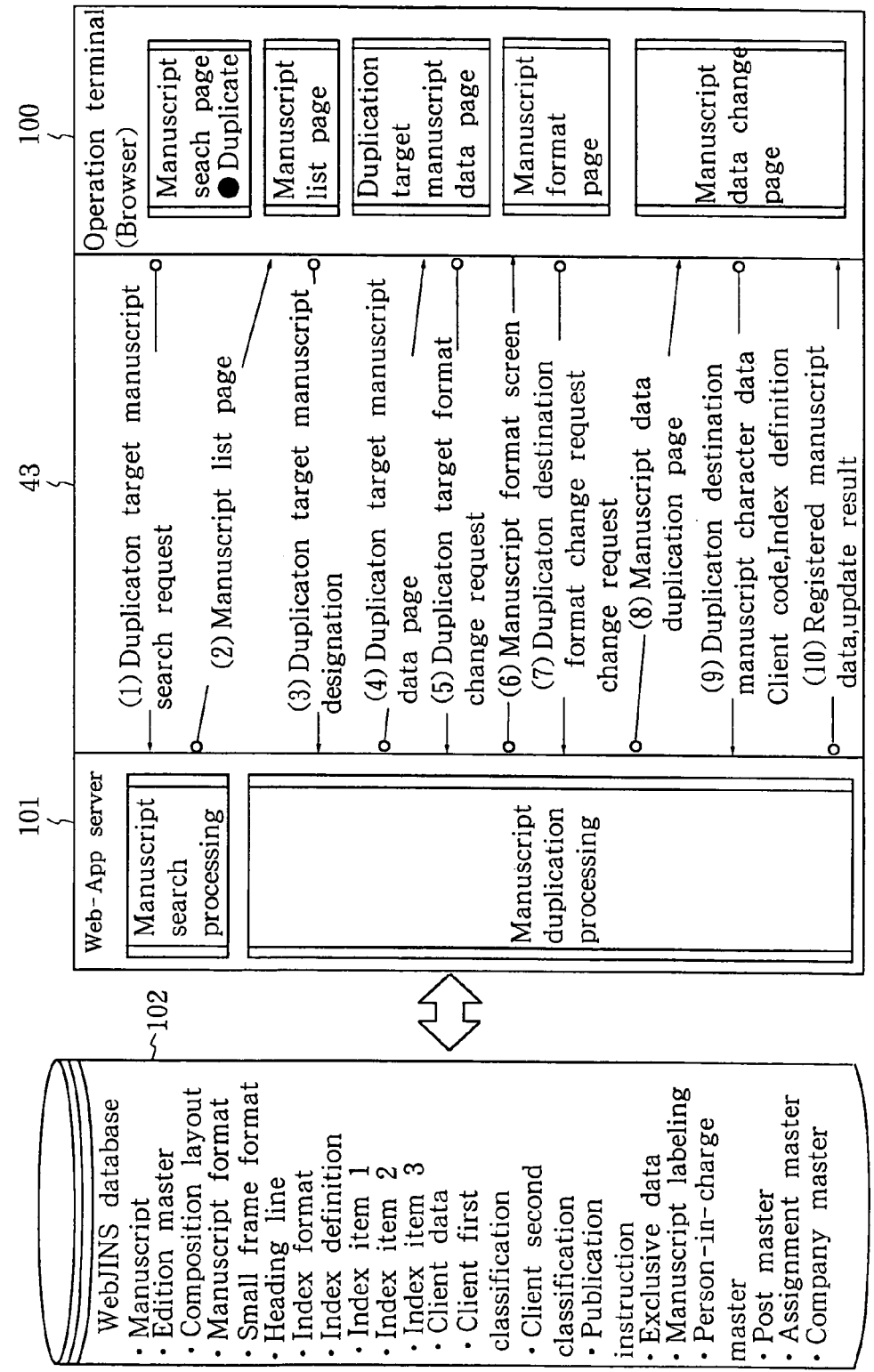
FIG. 10 is a view explaining the duplication of the manuscript data.

FIG. 10 is a view explaining the duplication of the manuscript data.

[Manuscript Data Duplication Processing]

(1) The operation terminal transmits a search request to the Web application server 101 to request duplication target manuscript information using one of the search conditions of a manuscript label, a client code, a manuscript format, a post and a person in charge by which the manuscript information can be searched from the manuscript search page.

The manuscript label can be searched by designating the manuscript label of the to-be-duplicated manuscript from the manuscript search page by direct change.

(2) The Web application server 101 transmits a list of search-requested manuscripts to the operation terminal as a manuscript list page.

(3) If the manuscript is to be duplicated in the same manuscript format, the operation terminal can directly designate the to-be-duplicated manuscript data by selecting the manuscript from the manuscript list page.

If the manuscript is to be duplicated with a changed manuscript format, the change is designated from the manuscript list page and the designated change is transmitted to the Web application server 101.

(4) The Web application server 101 searches an exclusive management table using the manuscript label as a search condition to thereby determine that the search-requested to-be-duplicated manuscript is not occupied by the other terminal.

If the requested manuscript is not occupied by the other terminal, the Web application server 101 outputs the name of the exclusive target, the identification value of the exclusive target, the session ID, the processing ID, the lock user company code, the post code, the person-in-charge code and the lock time to the exclusive management table to occupy the manuscript data.

Thereafter, the Web application server 101 creates a to-be-duplicated manuscript page based on the format number code and the pattern number in the manuscript definite form format table, the small frame format table, the heading line table in response to the received duplicated manuscript designation request, and transmits the created to-be-duplicated manuscript page to the operation terminal.

If the manuscript is duplicated in the same manuscript format, the manuscript management information and manuscript character data (frame number, line number and manuscript characters) are searched from the manuscript table in the duplication destination manuscript format, edits the searched information and data to a response message, and transmits the response message to the operation terminal.

If the manuscript is duplicated in the same manuscript format, the duplicated manuscript data is created by performing a processing of step (9) thereafter.

Further, if the manuscript is duplicated with a changed manuscript format, the to-be-duplicated manuscript management information and manuscript character data (frame number, line number and manuscript characters) are searched from the manuscript table, edits the searched information and data to a response message, and transmits the response message to the operation terminal.

If the manuscript is duplicated in the changed manuscript format, the duplicated manuscript data is created by performing processings of steps (5) to (9) thereafter.

(5) The operation terminal displays a to-be-duplicated target manuscript page according to the to-be-duplicated manuscript format from the transmitted manuscript management information and manuscript character data.

To cancel the duplication instruction, the operation terminal transmits the name of the exclusive target, the identification value of the exclusive target, the session ID, the processing ID, the lock user company code, the post code, the person-in-charge code, and the lock time to the Web application server 101.

The operation terminal transmits a to-be-duplicated manuscript page format change request and a duplication destination manuscript format change request of the duplication destination manuscript format to the Web application server 101.

(6) The Web application server 101 transmits a manuscript format page to the operation terminal in response to the duplication destination format change request.

(7) The operation terminal selects the layout display of the transmitted manuscript format page, whereby layout information on each edition is displayed in a tree state in Windows Explorer form. By clicking on a tree name, a format number and a pattern are set on the upper portion of a page and a layout image on the right side is switched.

For the manuscript format information (information such as the number of frames per manuscript format, the number of lines, the number of characters and the like per frame) arbitrarily designated by the manuscript format page, a format number code and a pattern number are designated and the duplication destination format change request is transmitted to the Web application server 101.

(8) The Web application server 101 transmits the manuscript data duplicated page developed based on the manuscript definite form format table, the small frame format table, the heading line format table, according to the to-be-duplicated manuscript data and the manuscript format information arbitrarily designated from the manuscript format page in response to the transmitted duplication destination format change request, to the operation terminal.

(9) The operation terminal displays the manuscript data duplicated page according to the manuscript format from the transmitted manuscript management information and manuscript character data.

The operation terminal corrects and changes the manuscript management information, manuscript character data, client code and index information on the transmitted manuscript data duplicated page, edits the manuscript character data, the client code and the index definition on the page, and transmits the edited data, code and definition to the Web application server 101.

(10) The Web application server 101 fetches the manuscript management information and the manuscript character data stored in the transmitted data, executes a client code consistency check and the like, searches the manuscript labeling table by the manuscript registered year and month to label the manuscript, registers the manuscript management information, the manuscript frame number, the line number and the manuscript character data into the manuscript table, and transmits the manuscript character data including the set manuscript label to the operation terminal.

Thereafter, a registered manuscript data change processing and a duplication processing can be continuously performed.

Figure 11:
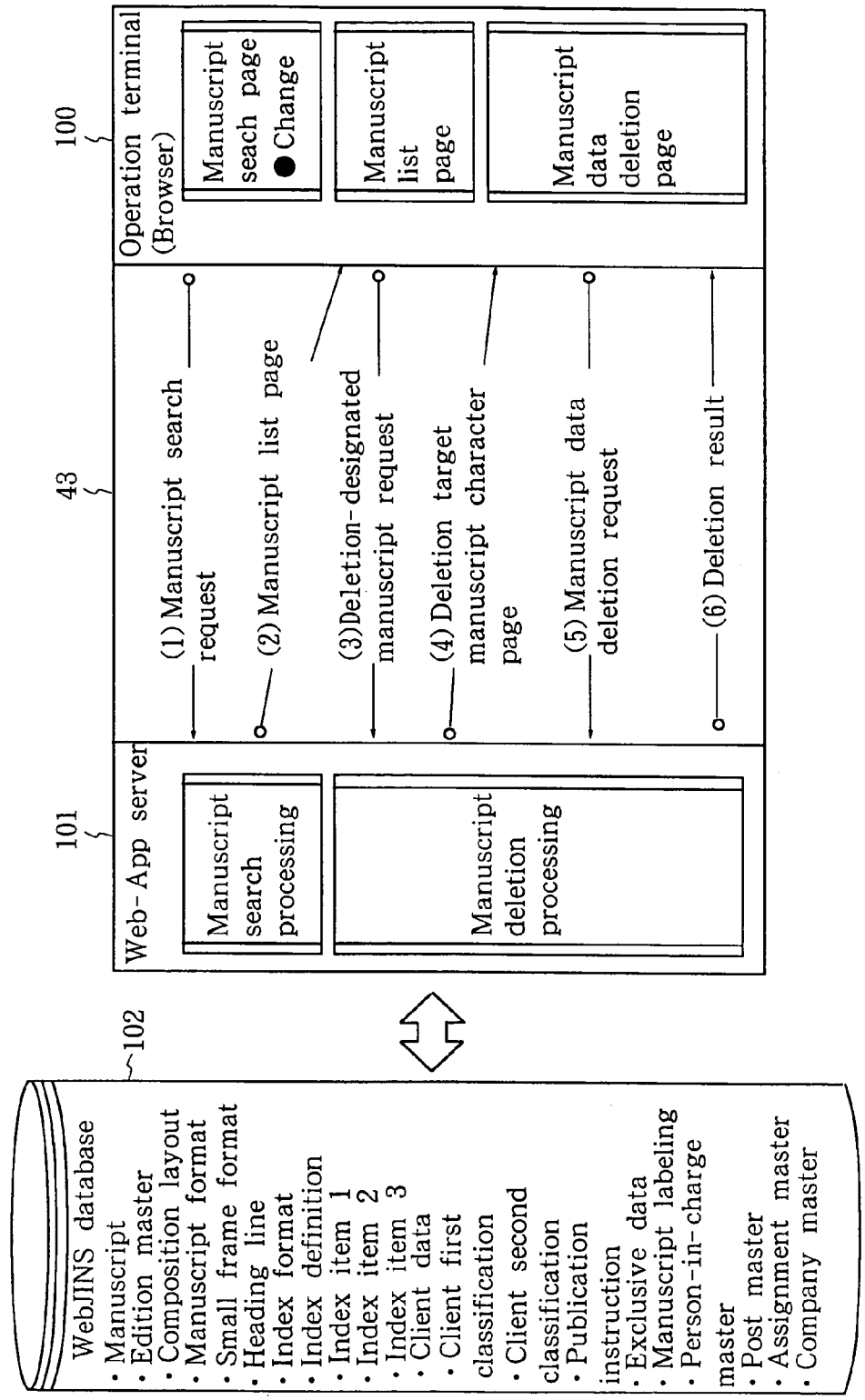
FIG. 11 is a view explaining the deletion of the manuscript data.

FIG. 11 is a view explaining the deletion of the manuscript data.

[Manuscript Data Deletion Processing]

(1) The operation terminal issues a search request to search information on a manuscript to be deleted from the manuscript search page and transmits the search request to the Web application server 101.

On the manuscript search page, the manuscript information can be searched and acquired using a client code, a manuscript format number and pattern, a final publication day, a section to which a user belongs and a person in charge as search conditions.

The manuscript label can be searched by designating the manuscript label of the to-be-deleted manuscript from the manuscript search page by direct change.

In this case, the operation steps up to (4) can be omitted.

If a plurality of pieces of data exist in a search request range, operation is necessary according to steps (2) to (4).

(2) The Web application server 101 transmits a list of search-requested manuscripts to the operation terminal as a manuscript list page.

If the label of the to-be-deleted manuscript is designated by the direct change, operation is carried out from the step (5) and the following.

(3) The operation terminal designates the to-be-deleted manuscript data from the transmitted manuscript list page, and transmits the search request to the Web application server 101.

(4) The Web application server 101 searches the exclusive management table using the name of the exclusive target, the identification value of the exclusive target, the session ID and the processing ID as search conditions to thereby determine that the search-requested manuscript is not occupied by the other terminal.

If the requested manuscript is not occupied by the other terminal, the Web application server 101 outputs the name of the exclusive target, the identification value of the exclusive target, the session ID, the processing ID, the lock user company code, the post code, the person-in-charge code and the lock time to the exclusive management table to occupy the manuscript data.

The Web application server 101 searches the manuscript management information and the manuscript character data (frame number, line number, manuscript characters) from the manuscript data, edits the data as a response page, and transmits the response page to the operation terminal.

(5) The operation terminal displays the manuscript data deleted page according to the manuscript format based on the transmitted manuscript management information and the manuscript character data.

If the deletion instruction is to be cancelled, the operation terminal sets and transmits the name of the exclusive target, the identification value of the exclusive target, the session ID, the processing ID, the lock user company code, the post code, and the person-in-charge code to the Web application server 101.

If the operator issues a deletion instruction after checking the deletion manuscript, the operation terminal creates a manuscript deletion request message with a designated manuscript label and transmits the created message to the Web application server 101.

(6) If the Web application server 101 issues the deletion instruction, the Web application server 101 searches the exclusive management data table using the manuscript label of the deletion-requested manuscript and the requester terminal ID to check whether the manuscript data is occupied.

The presence of publication instruction on the deletion-requested manuscript is checked by searching the publication instruction table using the deletion manuscript label.

If a publication instruction exists on the deletion-requested manuscript, then it is determined that this processing is a violation of operation, an error code is set to a processing result response message and the message is transmitted to the operation terminal.

The Web application server 101 deletes the deleted manuscript data using deletion-requested manuscript label, deletes the deleted manuscript data from the manuscript table and transmits the processing result to the operation terminal.

Figure 12:
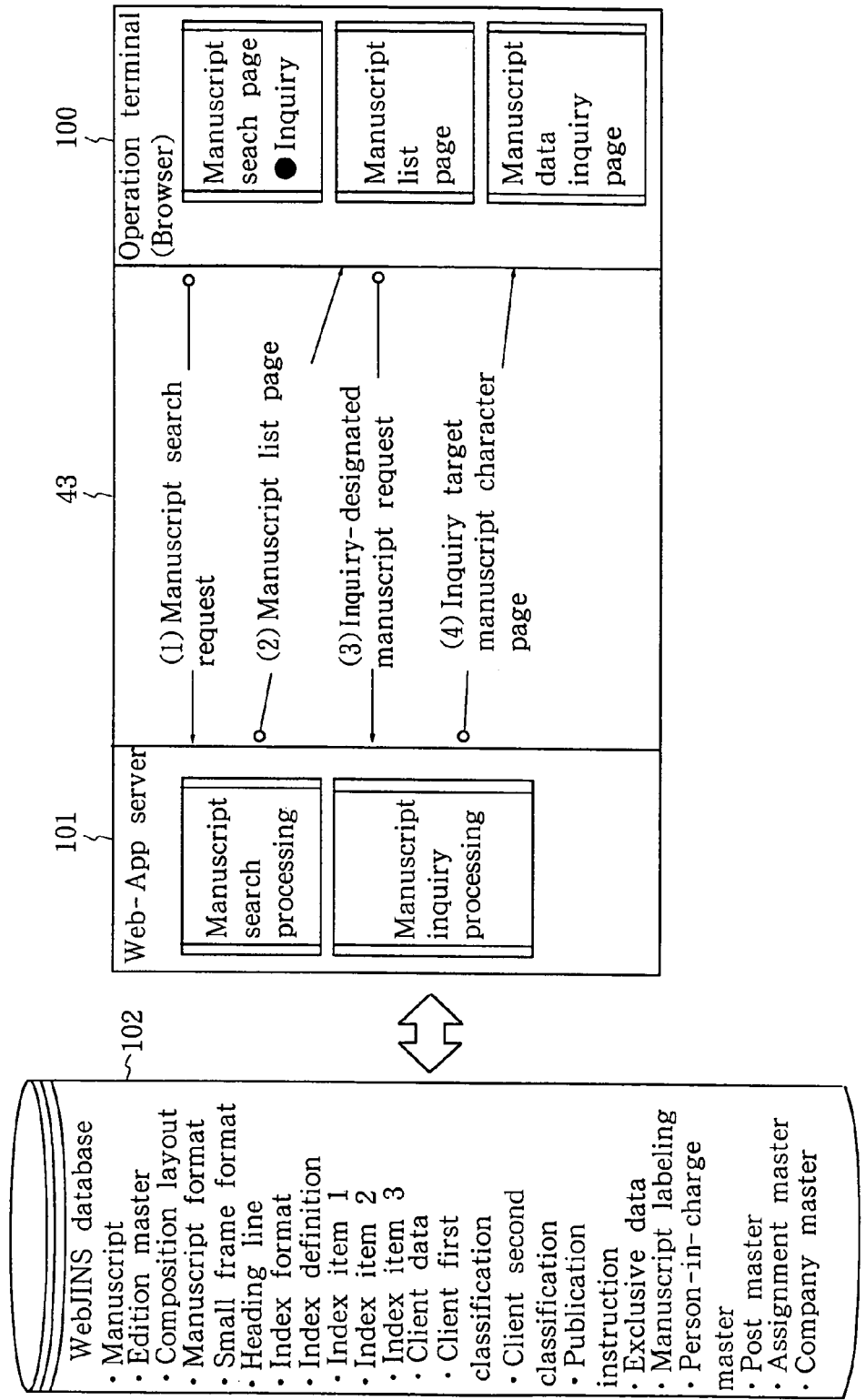
FIG. 12 is a view explaining the inquiry of the manuscript data.

FIG. 12 is a view explaining the inquiry of the manuscript data.

[Manuscript Data Inquiry Processing]

(1) The operation terminal issues a search request to search information on a manuscript to be inquired from the manuscript search page and transmits the search request to the Web application server 101.

On the manuscript search page, the manuscript information can be searched and acquired using the client code, the manuscript format number and pattern, the final publication day, the section to which the user belongs and the person in charge as search conditions.

The manuscript information can be searched by directly inquiring and designating the manuscript label of the to-be-inquired manuscript label from the manuscript search page.

In this case, the operation steps up to (4) can be omitted.

If a plurality of pieces of data exist in a search request range, operation is necessary according to steps (2) to (4).

(2) The Web application server 101 transmits a list of inquiry-requested manuscripts to the operation terminal as a manuscript list page.

If the label of the to-be-inquired manuscript is designated by direct inquiry, operation is carried out from the step (5) and the following.

(3) The operation terminal designates the to-be-inquired manuscript data from the transmitted manuscript list page, and transmits the search request to the Web application server 101.

(4) The Web application server 101 searches the manuscript management information and manuscript character data (frame number, line number, manuscript characters) from the manuscript data, creates a manuscript data inquiry page, and transmits the created inquiry page to the operation terminal.

(5) The operation terminal displays the manuscript data inquired page according to the manuscript format based on the transmitted manuscript management information and the manuscript character data.

Figure 13:
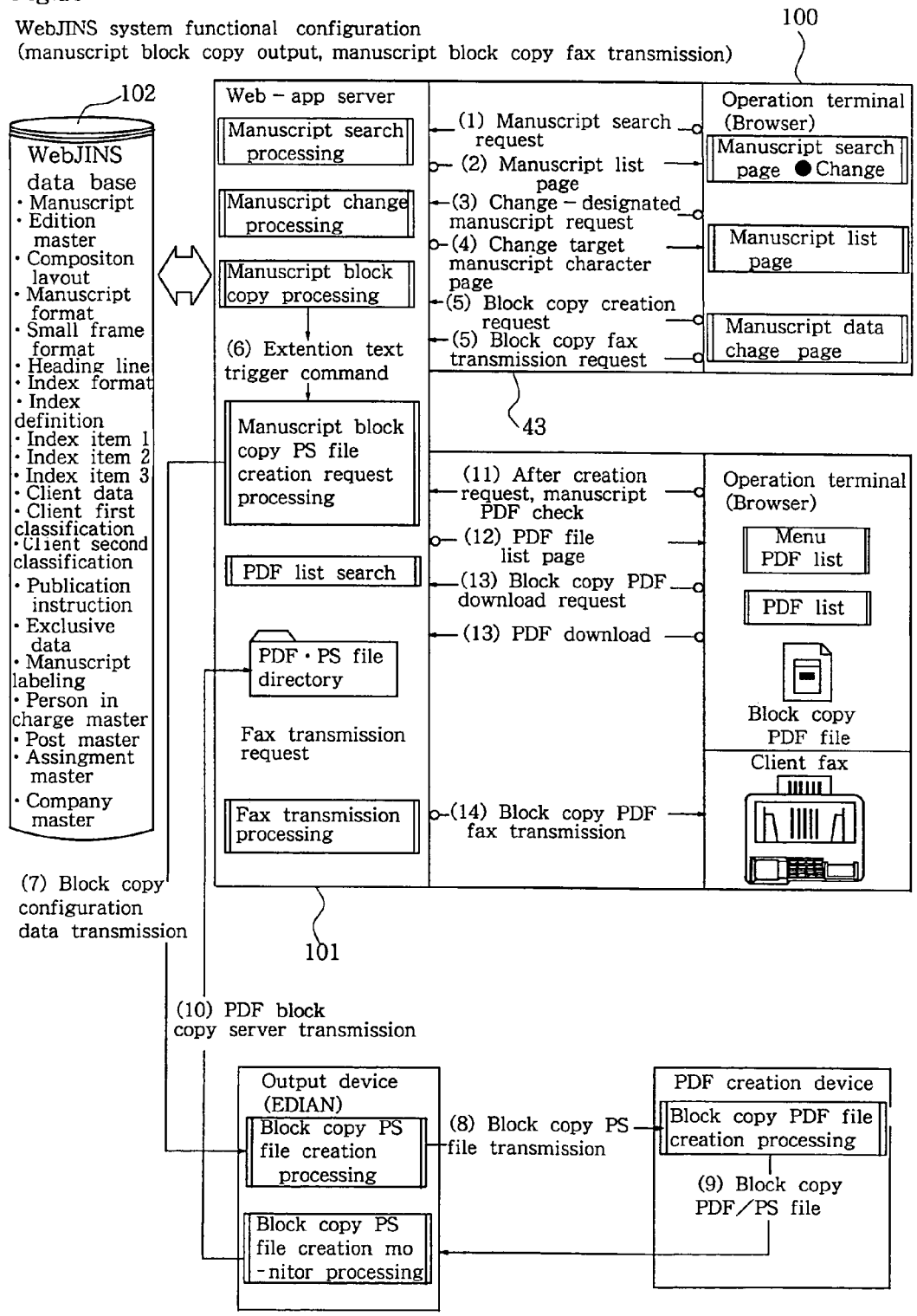
FIG. 13 is a view explaining the output of the block copy of a manuscript and the facsimile transmission thereof.

FIG. 13 is a view explaining the output of the block copy of a manuscript and the facsimile transmission thereof.

[Output of manuscript block copy and manuscript block copy facsimile transmission processing].

[PDFLIST Display Processing]

The manuscript block copy output and manuscript block copy facsimile transmission processing functions for creating a print sheet image as a PDF file for each manuscript, storing the file and transmitting the file over a facsimile. This function can be executed in the Manuscript data change processing.

In addition, the created PDF file is stored in a predetermined location on the Web application server 101 and the PDF file functions to be viewable as a list of PDF files after the creation of the PDF file.

The manuscript block copy output processing for the page-up manuscript to finally become a book is a function that only the contracted company without the output device (EDIAN) can utilize.

The manuscript block copy facsimile transmission processing is a function that only the system control and management company can utilize.

Further, the PDFLIST display processing for the page-up manuscript to finally become a book is a function that only the agreement companies without the output devices (EDIAN) can utilize.

Since steps (1) to (4) are the same processing steps as those in the Manuscript data change processing.

(5) The operation terminal displays the manuscript data changed page according to the manuscript format from the transmitted manuscript management information and manuscript character data, either outputs the block copy or depresses a facsimile transmission button, and transmits a block copy creation request or a block copy facsimile request to the Web application server 101.

The manuscript block copy can be automatically created with the same image as that of the print sheet.

(6) The Web application server 101 starts an output device gateway process processing (to be referred to as "manuscript block copy PS file creation request processing" hereinafter) in response to the transmitted request, and creates an extension text file and a trigger command according to the output device (EDIAN) (block copy information).

(7) The Web application server 101 transmits the created block copy information to the output device through the output device gateway process processing.

(8) The output device creates a PostScript file (to be referred to as "PS file" hereinafter) based on the received block copy information, and supplies the created PS file to PDF creation device.

(9) A PDF file is created from the received PS file using the PDF creation device, and the PS file and the PDF file are stored in a predetermined location so that the output device can receive the files.

(10) The output device monitors the creation of the PDF and PS files by the PDF creation device, and stores the PDF and PS files in the predetermined location of the Web application server 101 whenever these files are created.

(11) To check whether the PDF file has been created, the operation terminal actuates a "PDF list" button on the menu and transmits a request of a list of manuscript PDF files for which block copy output is requested, to the Web application server 101.

(12) The Web application server 101 searches the names, types, file sizes and creation dates of the created PDF files from the storage location in response to the transmitted request, creates a PDF file list page, and transmits the created list page to the operation terminal.

(13) The operation terminal displays the received PDF file list page.

By clicking on the PDF file name on the displayed PDF file list page, the operation terminal can download the created block copy PDF file to the operation terminal itself.

(14) If the facsimile transmission request is issued, a list of facsimile-transmitted PDF files is displayed on the PDF file list.

FIG. 14 shows an example of the definition of the manuscript format.

The manuscript format can be variably created according to a book to be published (to be referred to as "editions" hereinafter).

The manuscript format is classified into a fixed frame for grouping sub-frames, a character frame consisting of text data, and an image frame consisting of image data.

These configurations are defined for each manuscript format. Frame definition information such as positional information from the fixed frame origin, frame attributes (attributes of the character frame and the image frame), width, height, the number of input characters per line and the number of lines of the character frame are created and stored on the database to be used in the creation of an input area, input check and the like during a manuscript input processing.

These manuscript format attributes used in the manuscript input processing are made minimum when the character data is input. Information such as the font used in each sub-frame and grade as well as composition rules are created as a frame library for each manuscript format and stored in the editing layout device.

The image data is created as a frame library in advance by a specialized operator using the image input and editing device and stored.

The page-up manuscript is created as an extension command text with a frame library name corresponding to the manuscript format designated and the moving quantity from the sheet origin, the manuscript character data and the image library name designated. The editing layout device fetches this extension command text, whereby the page-up manuscript is input as the block copy manuscript.

Figure 15:
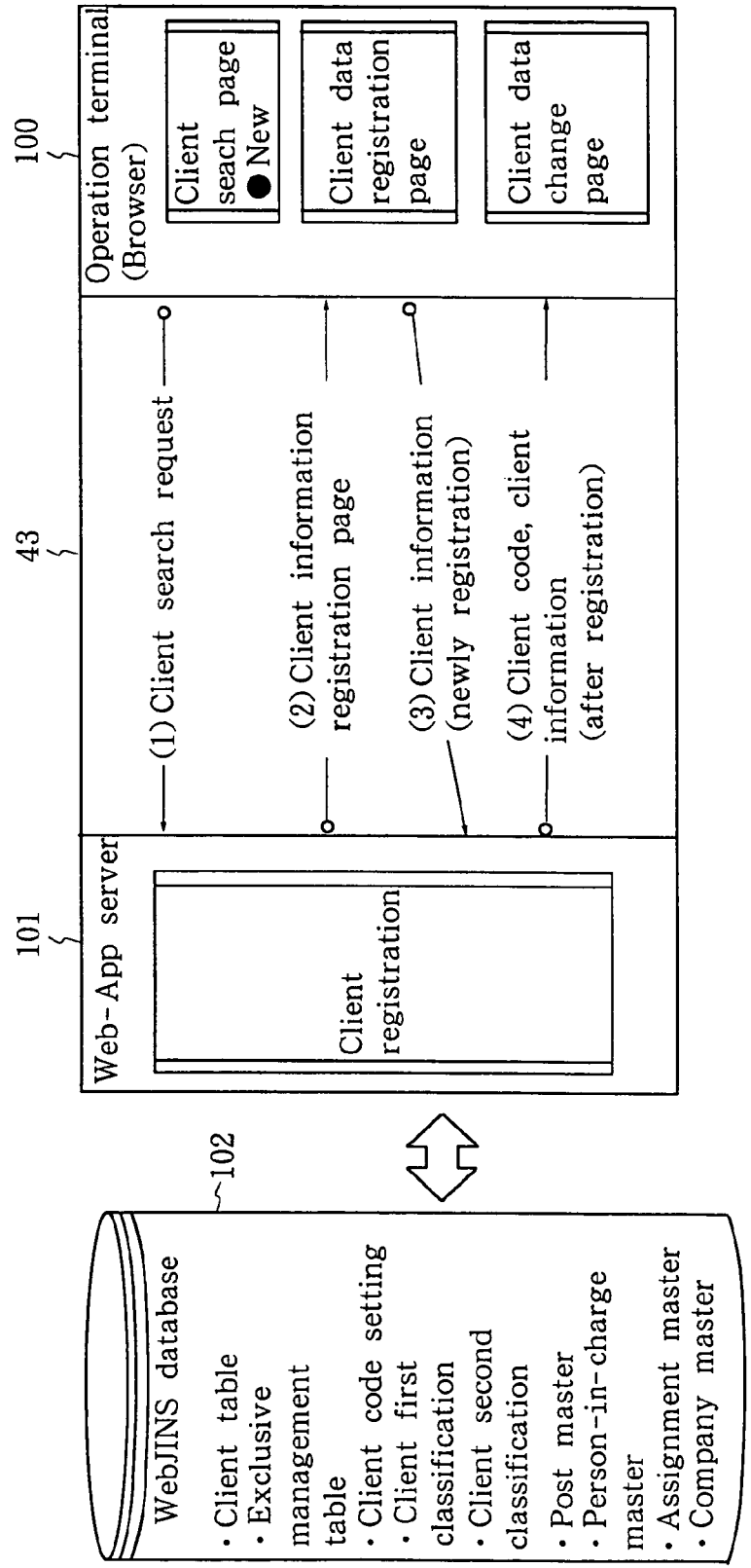
FIG. 15 is a view explaining the registration of client information.

FIG. 15 is a view explaining the registration of client information.

[Client Information New Registration]

The operation terminal executes a client information creation processing. The client information creation processing is determined as client information on the company to which a login user belongs by user's login.

Soon after the login, the registered client information can be used.

(1) The operation terminal depress 'new client search page', and transmits a client information registration page request to the Web application server 101.

(2) The Web application server 101 transmits a client data registration page to the operation terminal in response to the client search request.

(3) The operation terminal displays the transmitted client data registration page.

To cancel the new registration, the operation terminal returns the page to the initial screen page or starts the other page to thereby scrap the data.

The operation terminal inputs and edits client information such as the client first classification code and the client second classification code of a client to be newly registered, the name of the client (Chinese characters and kanas), the postal code, address, telephone number, facsimile number, mail address, DM (direct mail) necessary/unnecessary classification, post in charge and person in charge of the client, edits the client information on a page for newly registering the client information, and transmits the edited client information to the Web application server 101.

As for the client first classification and the client second classification, the names of classification can be appropriately designated by each company.

(4) The Web application server 101 searches a client code setting table from the client first classification code and the client second classification code of the client to automatically set a client code, adds the client information to the client data, and transmits the automatically set client code and the registered client information to the operation terminal.

Figure 16:
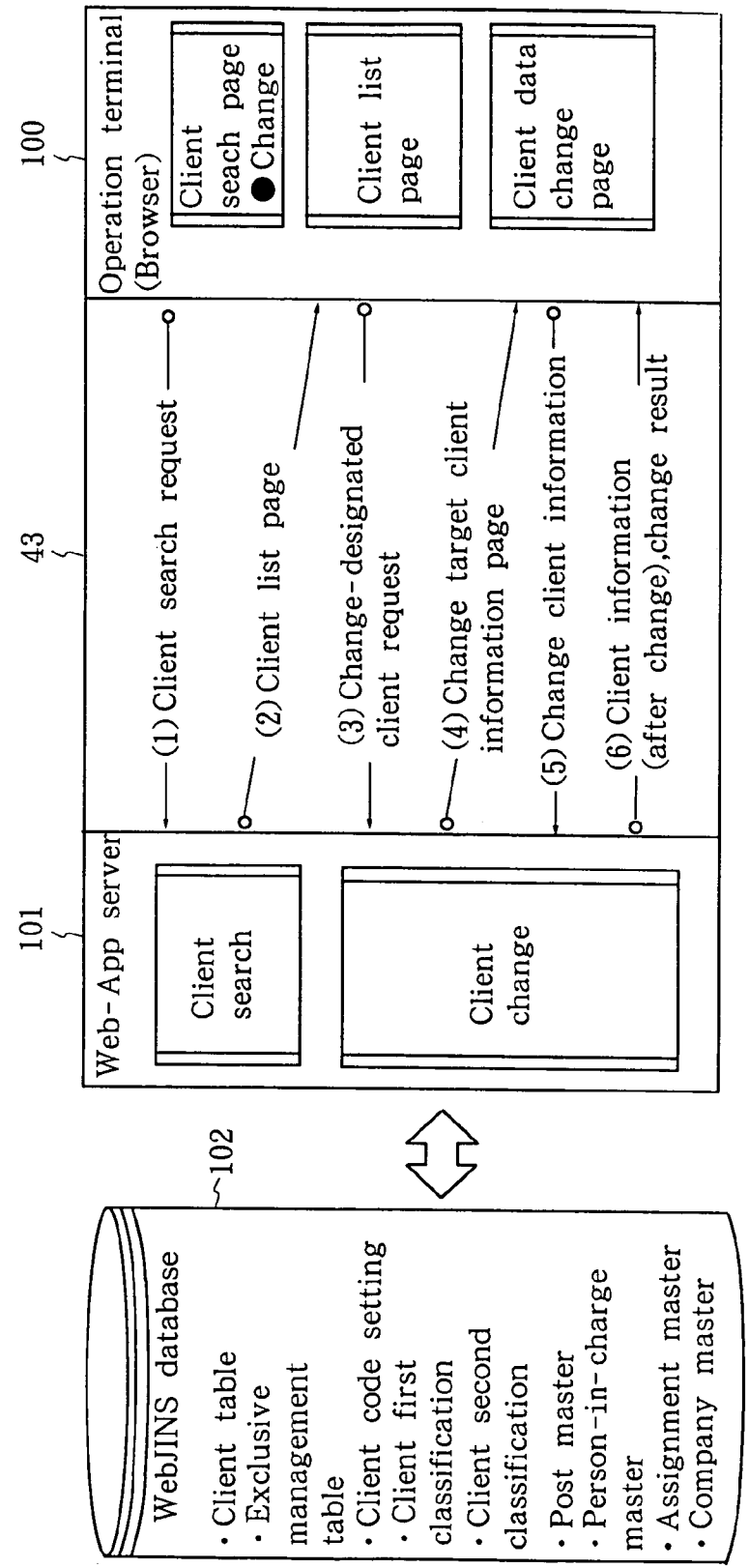
FIG. 16 is a view explaining the change of the client information.

FIG. 16 is a view explaining the change of the client information.

[Client Information Change Processing]

(1) The operation terminal inputs search conditions from the client search page, and transmits a client search request to the Web application server 101.

On the client search page, the client information can be searched and acquired while using the client codes (client first classification code, client second classification code), client name (kanas), telephone number, DM (direct mail)

necessary/unnecessary classification, the post in charge and the person in charge as the search conditions.

The to-be-changed client code can be searched by directly designating the change of the client code from the client search page.

In this case, the operation steps up to (4) can be omitted.

If a plurality of pieces of data exist in a search request range, operation is necessary according to steps (2) to (4).

(2) The Web application server 101 transmits a list of search-requested clients to the operation terminal as a client list page.

If the to-be-changed client code is designated by direct change, operation is carried out from the step (5) and the following.

(3) The operation terminal designates the to-be-changed client information from the transmitted client list page, and transmits the search request to the Web application server 101.

(4) The Web application server 101 searches the exclusive management table using the name of an exclusive target, the identification value of the exclusive target, the session ID and the processing ID as search conditions to thereby determine that the search-requested client is not occupied by the other terminal.

If the requested client is not occupied by the other terminal, the Web application server 101 outputs the name of the exclusive target, the identification value of the exclusive target, the session ID, the processing ID, the lock user company code, the post code, the person-in-charge code and the lock time to the exclusive management table to occupy the client data.

The Web application server 101 searches the client information from the client data, edits the data as a response page, and transmits the response page to the operation terminal.

(5) The operation terminal displays the client information changed page from the transmitted client information.

If the change instruction is to be cancelled, the operation terminal transmits the name of the exclusive target, the identification value of the exclusive target, the session ID, the processing ID, the lock user company code, the post code, the person-in-charge code and the lock time to the Web application server 101.

If the operation terminal issues a client change instruction, the operation terminal edits the client information from the data input onto the page and transmits the edited client information to the Web application server 101.

(6) The Web application server 101 fetches the client information stored in the changed client information transmitted to the server 101, executes a client code consistency check and the like, updates the client data, deletes the requester terminal occupation entry from the exclusive management table, and transmits the changed client information to the requester operation terminal as a processing result.

Thereafter, a registered client information change processing can be continuously performed.

Figure 17:
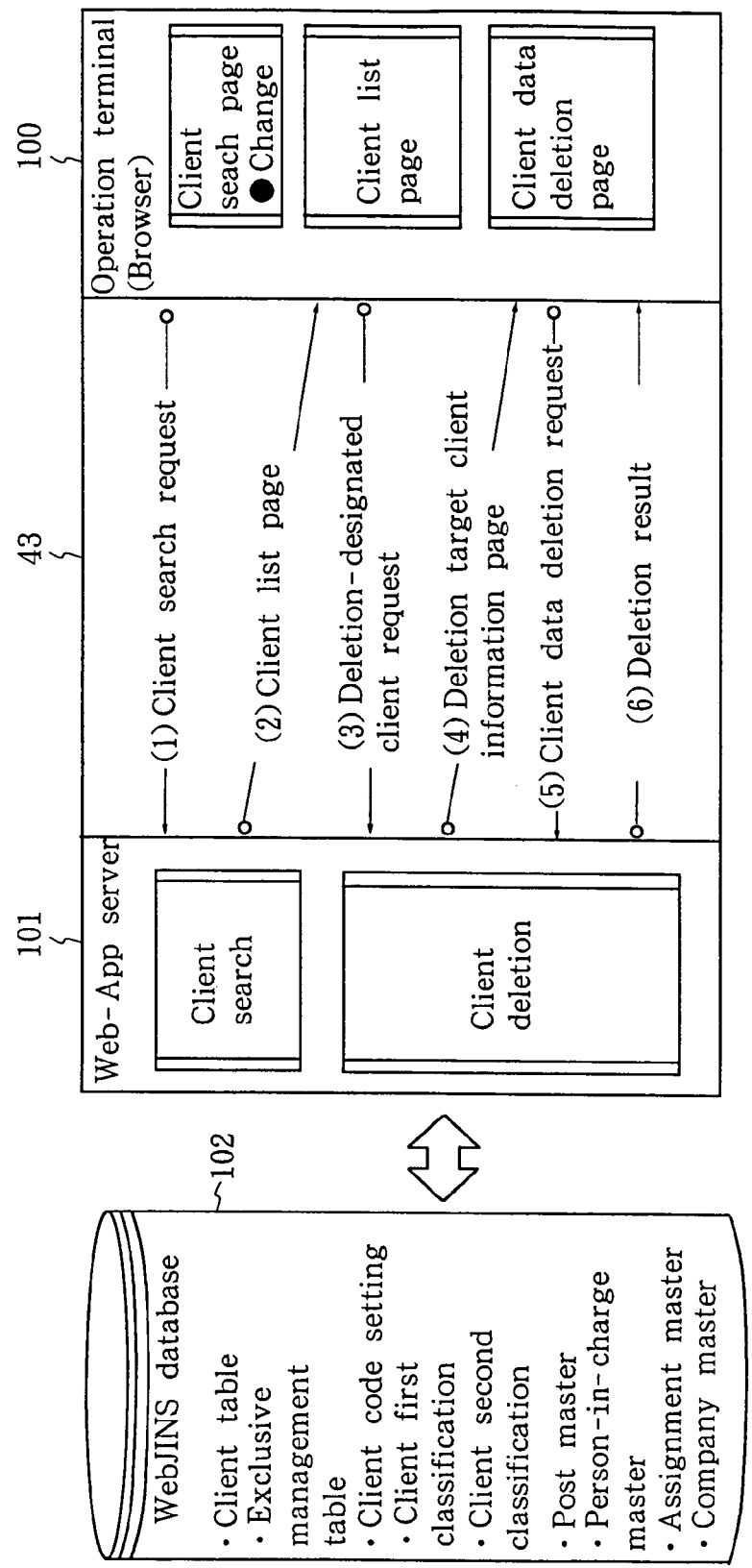
FIG. 17 is a view explaining the deletion of the client information.

FIG. 17 is a view explaining the deletion of the client information.

[Client Information Deletion Processing]

(1) The operation terminal inputs search conditions from the client search page, and transmits a client search request to the Web application server 101.

On the client search page, the client information can be searched and acquired while using the client codes (client first classification code, client second classification code), client name (kanas), telephone number, DM (direct mail) necessary/unnecessary classification, the post in charge and the person in charge as the search conditions.

The to-be-deleted client code can be searched by directly designating the change of the client code from the client search page.

In this case, the operation steps up to (4) can be omitted.

If a plurality of pieces of data exist in a search request range, operation is necessary according to steps (2) to (4).

(2) The Web application server 101 transmits a list of search-requested clients to the operation terminal as a client list page.

If the to-be-changed client code is designated by direct change, operation is carried out from the step (5) and the following.

(3) The operation terminal designates the to-be-deleted client information from the transmitted client list page, and transmits the search request to the Web application server 101.

(4) The Web application server 101 searches the exclusive management table using the name of the exclusive target, the identification value of the exclusive target, the session ID and the processing ID as search conditions to thereby determine that the search-requested client is not occupied by the other terminal.

If the requested client is not occupied by the other terminal, the Web application server 101 outputs the name of the exclusive target, the identification value of the exclusive target, the session ID, the processing ID, the lock user company code, the post code, the person-in-charge code and the lock time to the exclusive management table to occupy the manuscript data.

The Web application server 101 searches the client information from the client data, edits the data as a response page, and transmits the response page to the operation terminal.

(5) The operation terminal displays the client information deleted page from the transmitted client information.

If the deletion instruction is to be cancelled, the operation terminal transmits the name of the exclusive target, the identification value of the exclusive target, the session ID, the processing ID, the lock user company code, the post code, the person-in-charge code and the lock time to the Web application server 101.

If the operation terminal issues a client deletion instruction, the operation terminal edits the client information from the data input onto the page and transmits the edited client information to the Web application server 101.

(6) The Web application server 101 fetches the client information stored in the deleted client information transmitted to the server 101, executes a client code consistency check and the like, deletes the client data, deletes the requester terminal occupation entry from the exclusive management table, and transmits the deleted client information to the requester operation terminal as a processing result.

Figure 18:
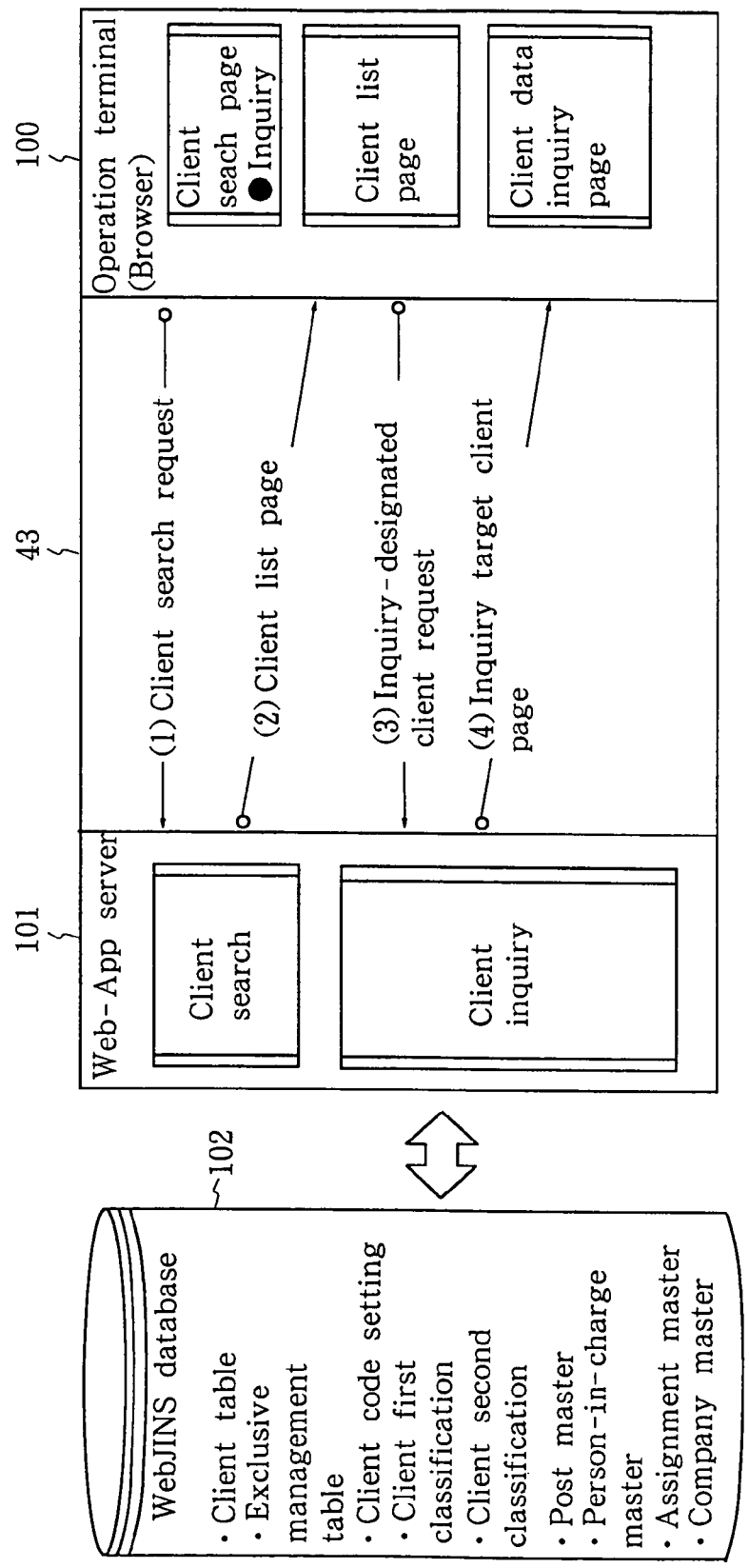
FIG. 18 is a view explaining the inquiry of the client information.

FIG. 18 is a view explaining the inquiry of the client information.

[Client Data Inquiry Processing]

(1) The operation terminal issues a search request to search information on a client to be inquired from the client search page, and transmits the search request to the Web application server 101.

On the client search page, the client information can be searched and acquired while using the client codes (client first classification code, client second classification code), client name (kanas), telephone number, DM (direct mail) necessary/unnecessary classification, the post in charge and the person in charge as the search conditions.

The to-be-inquired client label can be searched by directly designating the inquiry of the client label from the client search page.

In this case, the operation steps up to (4) can be omitted.

If a plurality of pieces of data exist in a search request range, operation is necessary according to steps (2) to (4).

(2) The Web application server 101 transmits a list of search-requested clients to the operation terminal as a clients list page.

If the to-be-inquired client code is designated by direct inquiry, operation is carried out from the step (5) and the following.

(3) The operation terminal designates the to-be-inquired client information from the transmitted client list page, and transmits the search request to the Web application server 101.

(4) The Web application server 101 searches the client information from the client data, creates a client data inquiry page, and transmits the created client data inquiry page to the operation terminal.

(5) The operation terminal displays the client data inquiry page from the transmitted client information.

Figure 19:
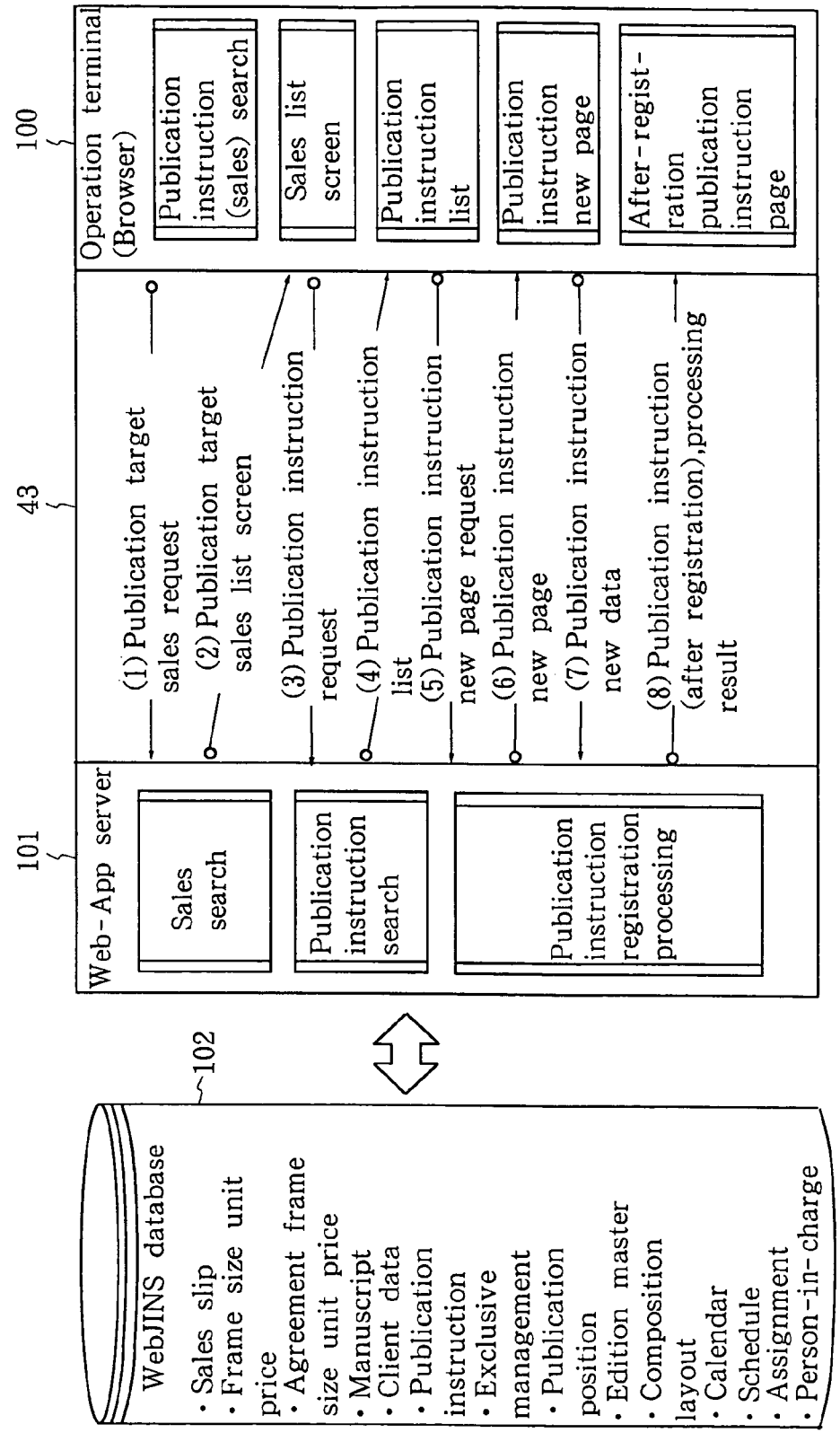
FIG. 19 is a view explaining the new registration of a publication instruction.

FIG. 19 is a view explaining the new registration of a publication instruction.

[Publication Instruction New Registration Processing]

The operation terminal executes a publication instruction creation processing. The publication instruction creation processing is determined according to the agreement type of the company to which a login user belongs by user's login.

Soon after the login, the publication instruction creation processing can be used by designating editions.

(1) The operation terminal transmits a data search request for the sales (agreement) of a publication target to the Web application server 101 from the publication instruction (sales) search page.

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

(5) The operation terminal checks whether manuscript information for which a publication instruction is to be issued is already published from the transmitted publication instruction list page, selects 'new' if the manuscript information is not published yet, and transmits a publication instruction new page request to the Web application server 101.

If the publication instruction number exceeds the publication number of remaining issues of publication, the publication instruction cannot be issued.

(6) The Web application server 101 receives the publication instruction new page request, creates sales basic information (a sales slip number, a publication period, the number of agreed issues, the number of actual issues of publication, the number of issues according to publication instruction, the number of remaining issues of publication) and a publication instruction new page, and transmits the new page to the operation terminal.

(7) The operation terminal inputs the publication instruction data (a client code, a publication position, a manuscript label, publication type, advertisement proof necessary/unnecessary, publication period, weekly publication schedule, a post in charge, and a person in charge) in the transmitted publication instruction new page, and transmits a publication instruction data registration request to the Web application server 101.

If the number of issues according to publication instruction exceeds the number of remaining issues of publication, the publication instruction cannot be issued.

The client code, publication position, manuscript label and the person in charge that the operation terminal newly registers can be arbitrarily searched by the help function.

To cancel the new registration, the operation terminal returns the page to the publication instruction list page or the initial screen page, or starts the other page to thereby scrap the data.

(8) The Web application server 101 fetches the above-mentioned publication instruction data from the publication instruction data registration request transmitted from the operation terminal, executes consistency checks including a client information existence check to a client table, a publication manuscript existence check to a manuscript table and a total issue number check to a sales slip table, registers the data into the publication instruction table, calculates the number of issues according to the publication instruction on the sales slip, and transmits registered publication instruction data and a processing result to the operation terminal.

If the consistency checks indicate that there is an error, the Web application server determines that the processing is a violation of operation and transmits before-registration data to which the portion and content of the error is allocated to the operation terminal.

Figure 20:
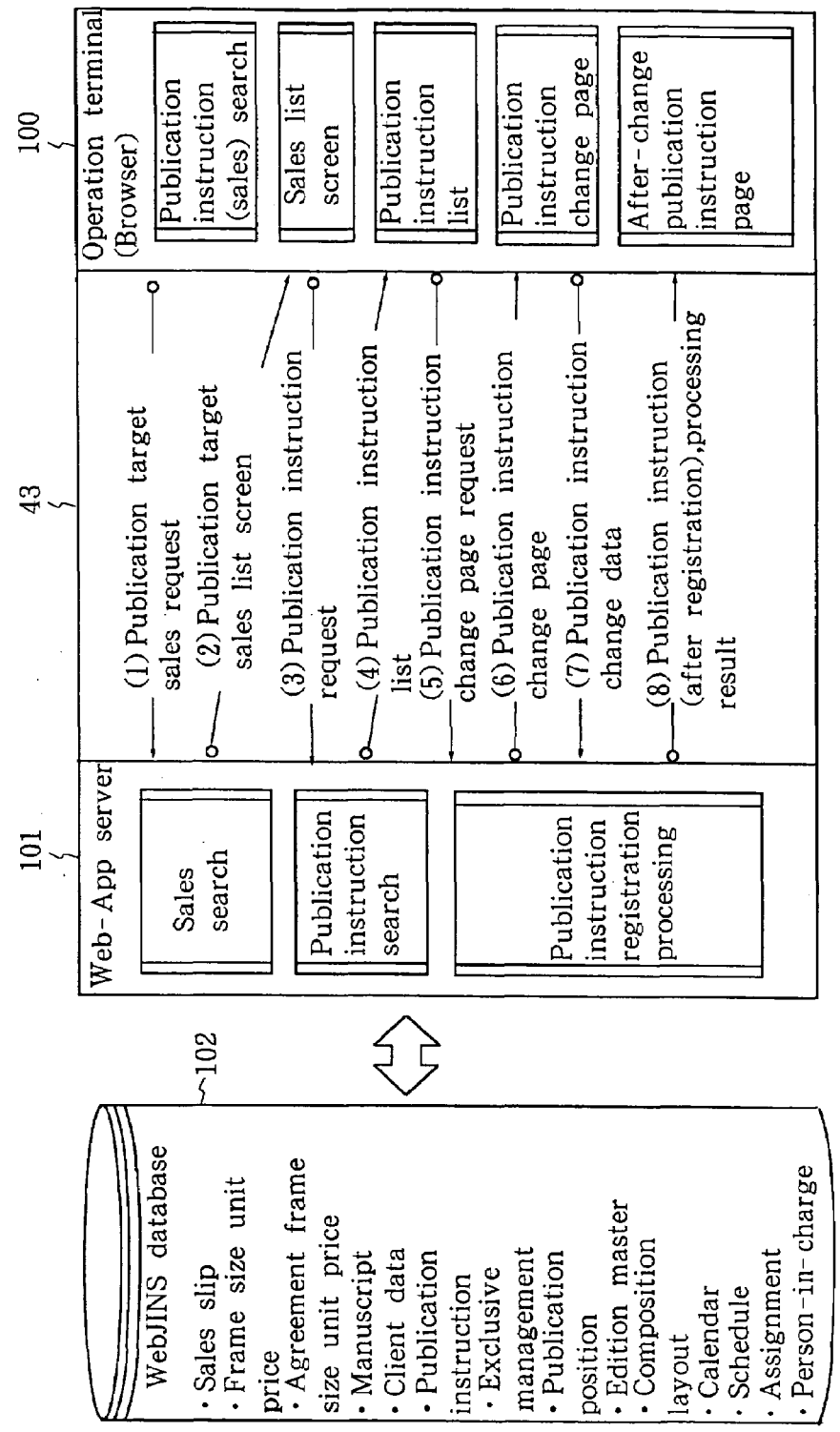
FIG. 20 is a view explaining the registration of the change of the publication instruction.

FIG. 20 is a view explaining the registration of the change of the publication instruction.

[Publication Instruction Change Processing]

(1) The operation terminal transmits a data search request for the sales (agreement) of a publication change target to the Web application server 101 from the publication instruction (sales) search page.

The publication instruction number to be changed can be searched by directly designating the change thereof from the publication instruction (sales) search page.

In this case, operation steps up to (4) can be omitted.

If a plurality of data exist in a search request range, operation is necessary according to steps (2) to (6).

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

(5) The operation terminal checks and selects publication instruction data to be changed from the transmitted publication instruction list page, and transmits a publication instruction change page request to the Web application server 101.

(6) The Web application server 101 receives the publication instruction change page request from the operation terminal, and checks that the change target publication instruction data is not occupied by the other terminal by searching the exclusive management table using the name of the exclusive target, the identification value of the exclusive target, the session ID and the processing ID as search conditions.

If the requested sales slip and publication instruction data are not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip and publication instruction data to be occupied by the requester terminal.

The Web application server 101 searches the publication instruction table according to the manuscript label, creates sales basic information (the sales slip number, the publication period, the number of agreed issues, the number of actual issues of publication, the number of issues according to publication instruction, the number of remaining issues of publication) and a publication instruction change page, and transmits the change page to the operation terminal.

(7) The operation terminal inputs the to-be-changed publication instruction data (the client code, the publication position, the manuscript label, publication type, advertisement proof necessary/unnecessary, publication period, weekly publication schedule, the post in charge, and the person in charge) in the transmitted publication instruction change page, and transmits a publication instruction data change request to the Web application server 101.

If the number of issues according to publication instruction exceeds the number of remaining issues of publication, the publication instruction cannot be issued.

The client code, publication position, manuscript label and the person in charge that the operation terminal changes can be arbitrarily searched by the help function.

To cancel the change, the operation terminal returns the page to the publication instruction list page or the initial screen page, or starts the other page to thereby scrap the data.

(8) The Web application server 101 fetches the above-mentioned publication instruction data from the publication instruction data change request transmitted from the operation terminal, executes consistency checks including a client information existence check to the client table, a publication manuscript existence check to the manuscript table and a total issue number check to the sales slip table, registers the data into the publication instruction table, calculates the number of issues according to the publication instruction on the sales slip, deletes the requester terminal occupation entry from the exclusive management table, and transmits the changed publication instruction data and a processing result to the operation terminal.

If the consistency checks indicate that there is an error, the Web application server determines that the processing is a violation of operation and transmits before-change data to which the portion and content of the error is allocated to the operation terminal.

Figure 21:
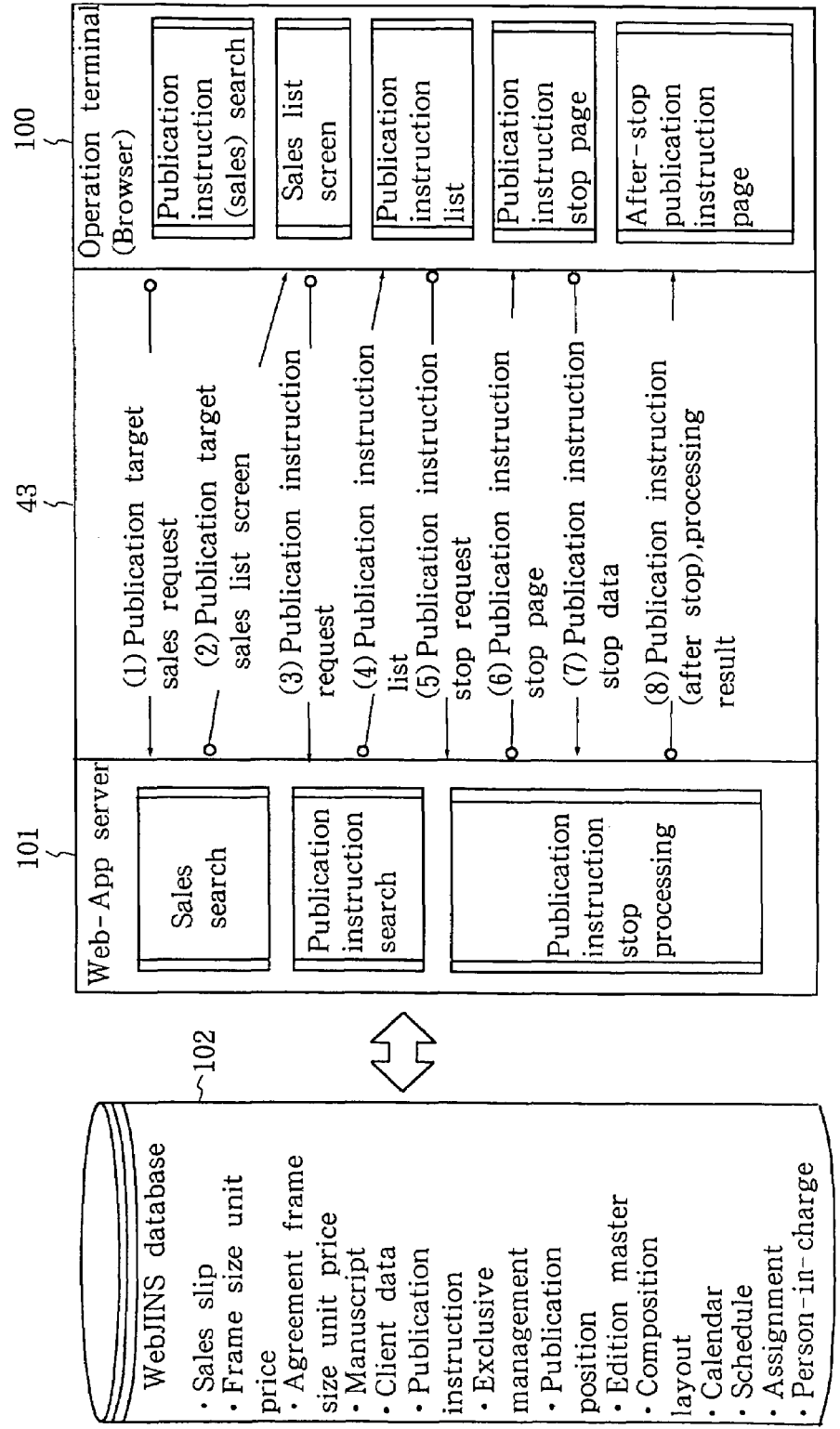
FIG. 21 is a view explaining the stop of the publication instruction.

FIG. 21 is a view explaining the stop of the publication instruction.

[Publication Instruction Stop Processing]

(1) The operation terminal transmits a data search request for the sales (agreement) of a publication stop target to the Web application server 101 from the publication instruction (sales) search page.

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

(5) The operation terminal checks and selects publication instruction data to be stopped from the transmitted publication instruction list page, and transmits a publication instruction stop page request to the Web application server 101.

(6) The Web application server 101 receives the publication instruction stop page request from the operation terminal, and checks that the stop target publication instruction data is not occupied by the other terminal by searching the exclusive management table using the name of the exclusive target, the identification value of the exclusive target, the session ID and the processing ID as search conditions.

If the requested sales slip and publication instruction data are not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip and publication instruction data to be occupied by the requester terminal.

The Web application server 101 searches the publication instruction table according to the manuscript label, creates sales basic information (the sales slip number, the publication period, the number of agreed issues, the number of actual issues of publication, the number of issues according to publication instruction, the number of remaining issues of publication) and a publication instruction stop page, and transmits the change page to the operation terminal.

(7) The operation terminal inputs the to-be-stopped publication instruction data (the client code, the publication position, the manuscript label, publication type, advertisement proof necessary/unnecessary, publication period, weekly publication schedule, the post in charge, and the person in charge) in the transmitted publication instruction stop page, and transmits a publication instruction data stop request to the Web application server 101.

The client code, publication position, manuscript label and the person in charge that the operation terminal stops can be arbitrarily searched by the help function.

To cancel the stop, the operation terminal returns the page to the publication instruction list page or the initial screen page, or starts the other page to thereby scrap the data.

(8) The Web application server 101 fetches the above-mentioned publication instruction data from the publication instruction data stop request transmitted from the operation terminal, executes consistency checks including a client information existence check to the client table, a publication manuscript existence check to the manuscript table, an issue number consumption processing due to the stop of the sales slip table, and a total issue number check, registers the data into the publication instruction table, calculates the number of issues according to the publication instruction on the sales slip, deletes the requester terminal occupation entry from the exclusive management table, and transmits the stopped publication instruction data and a processing result to the operation terminal.

If the consistency checks indicate that there is an error, the Web application server determines that the processing is a violation of operation and transmits before-stop data to which the portion and content of the error is allocated to the operation terminal.

Figure 22:
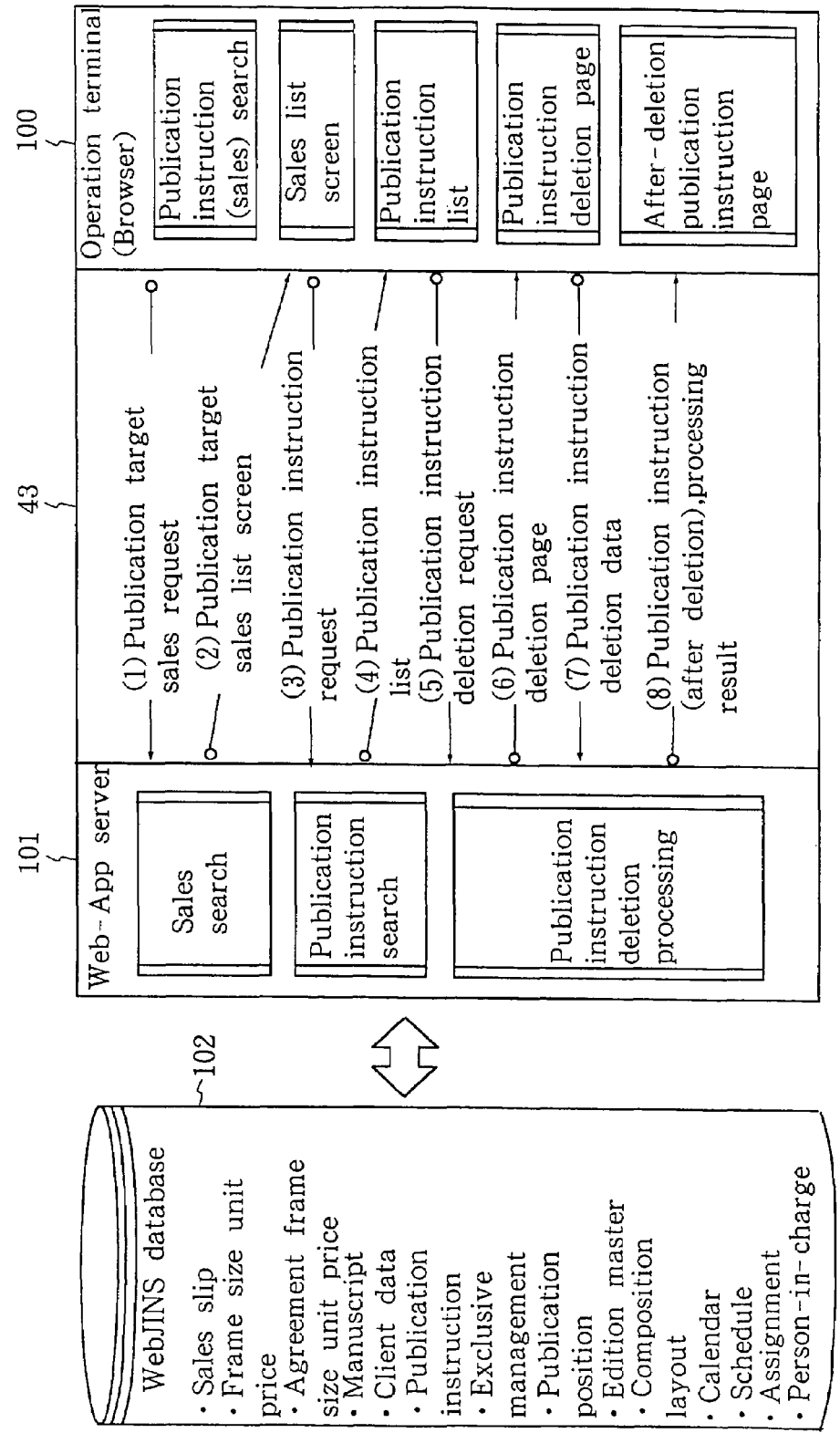
FIG. 22 is a view explaining the deletion of the publication instruction.

FIG. 22 is a view explaining the deletion of the publication instruction.

[Publication Instruction Deletion Processing]

(1) The operation terminal transmits a data search request for the sales (agreement) of a publication deletion target to the Web application server 101 from the publication instruction (sales) search page.

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

If the publication target appears even once according to the registered publication instruction, the instruction cannot be deleted.

(5) The operation terminal checks and selects publication instruction data to be deleted from the transmitted publication instruction list page, and transmits a publication instruction deletion page request to the Web application server 101.

(6) The Web application server 101 receives the publication instruction deletion page request from the operation terminal, and checks that the deletion target publication instruction data is not occupied by the other terminal by searching the exclusive management table using the name of the exclusive target, the identification value of the exclusive target, the session ID and the processing ID as search conditions.

If the requested sales slip and publication instruction data are not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip and publication instruction data to be occupied by the requester terminal.

The Web application server 101 searches the publication instruction table according to the manuscript label, creates sales basic information (the sales slip number, the publication period, the number of agreed issues, the number of actual issues of publication, the number of issues according to publication instruction, the number of remaining issues of publication) and a publication instruction deletion page, and transmits them to the operation terminal.

(7) The operation terminal inputs the to-be-deleted publication instruction data (the client code, the publication position, the manuscript label, publication type, advertisement proof necessary/unnecessary, publication period, weekly publication schedule, the post in charge, and the person in charge) in the transmitted publication instruction deletion page, and transmits a publication instruction data deletion request to the Web application server 101.

The client code, publication position, manuscript label and the person in charge that the operation terminal deletes can be arbitrarily searched by the help function.

To cancel the deletion, the operation terminal returns the page to the publication instruction list page or the initial screen page, or starts the other page to thereby scrap the data.

(8) The Web application server 101 fetches the above-mentioned publication instruction data from the publication instruction data deletion request transmitted from the operation terminal, executes consistency checks including a publication instruction frame size return processing due to the deletion of the sales slip table, and a total frame size check, registers the data into the publication instruction table, calculates the number of issues according to the publication instruction on the sales slip, deletes the requester terminal occupation entry from the exclusive management table, and transmits the deleted publication instruction data and a processing result to the operation terminal.

If the consistency checks indicate that there is an error, the Web application server determines that the processing is a violation of operation and transmits before-deletion data to which the portion and content of the error is allocated to the operation terminal.

Figure 23:
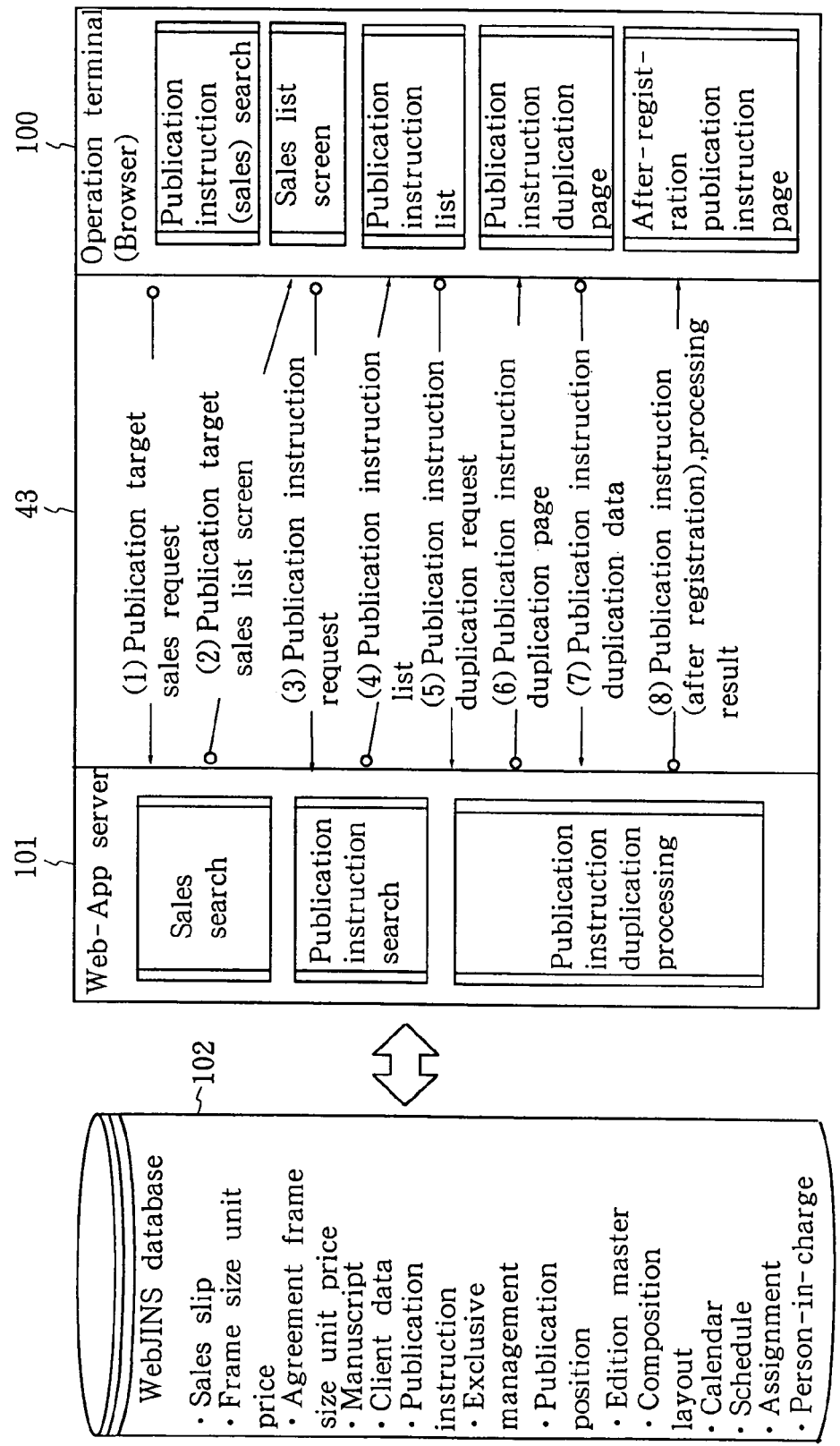
FIG. 23 is a view explaining the duplication of the publication instruction.

FIG. 23 is a view explaining the duplication of the publication instruction.

[Publication Instruction Duplication Processing]

(1) The operation terminal transmits a data search request for the sales (agreement) of a publication target to the Web application server 101 from the publication instruction (sales) search page.

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

(5) The operation terminal selects publication instruction to be duplicated from the transmitted publication instruction list page, and transmits a publication instruction duplication page request to the Web application server 101.

(6) The Web application server 101 receives the publication instruction duplication page request from the operation terminal, and creates sales basic information (the sales slip number, the publication period, the number of agreed issues, the number of actual issues of publication, the number of issues according to publication instruction, the number of remaining issues of publication) on a publication instruction duplication page, and transmits them to the operation terminal.

(7) The operation terminal inputs the publication instruction data (the client code, the publication position, the manuscript label, publication type, advertisement proof necessary/unnecessary, publication period, weekly publication schedule, the post in charge, and the person in charge) in the transmitted publication instruction duplication page, and transmits a publication instruction data registration request to the Web application server 101.

If the number of issues according to the publication instruction exceeds the number of remaining issues, the publication instruction cannot be performed.

The client code, publication position, manuscript label and the person in charge that the operation terminal duplicates can be arbitrarily searched by the help function.

To cancel the duplication, the operation terminal returns the page to the publication instruction list page or the initial screen page, or starts the other page to thereby scrap the data.

(8) The Web application server 101 fetches the above-mentioned publication instruction data from the publication instruction data duplication request transmitted from the operation terminal, executes consistency checks including a client information existence check to the client table, a publication manuscript existence check to the manuscript table and a total issue number check to the sales slip table, registers the data into the publication instruction table, calculates the number of issues according to the publication instruction on the sales slip, and transmits the duplicated publication instruction data and a processing result to the operation terminal.

If the consistency checks indicate that there is an error, the Web application server determines that the processing is a violation of operation and transmits before-duplication data to which the portion and content of the error is allocated to the operation terminal.

Figure 24:
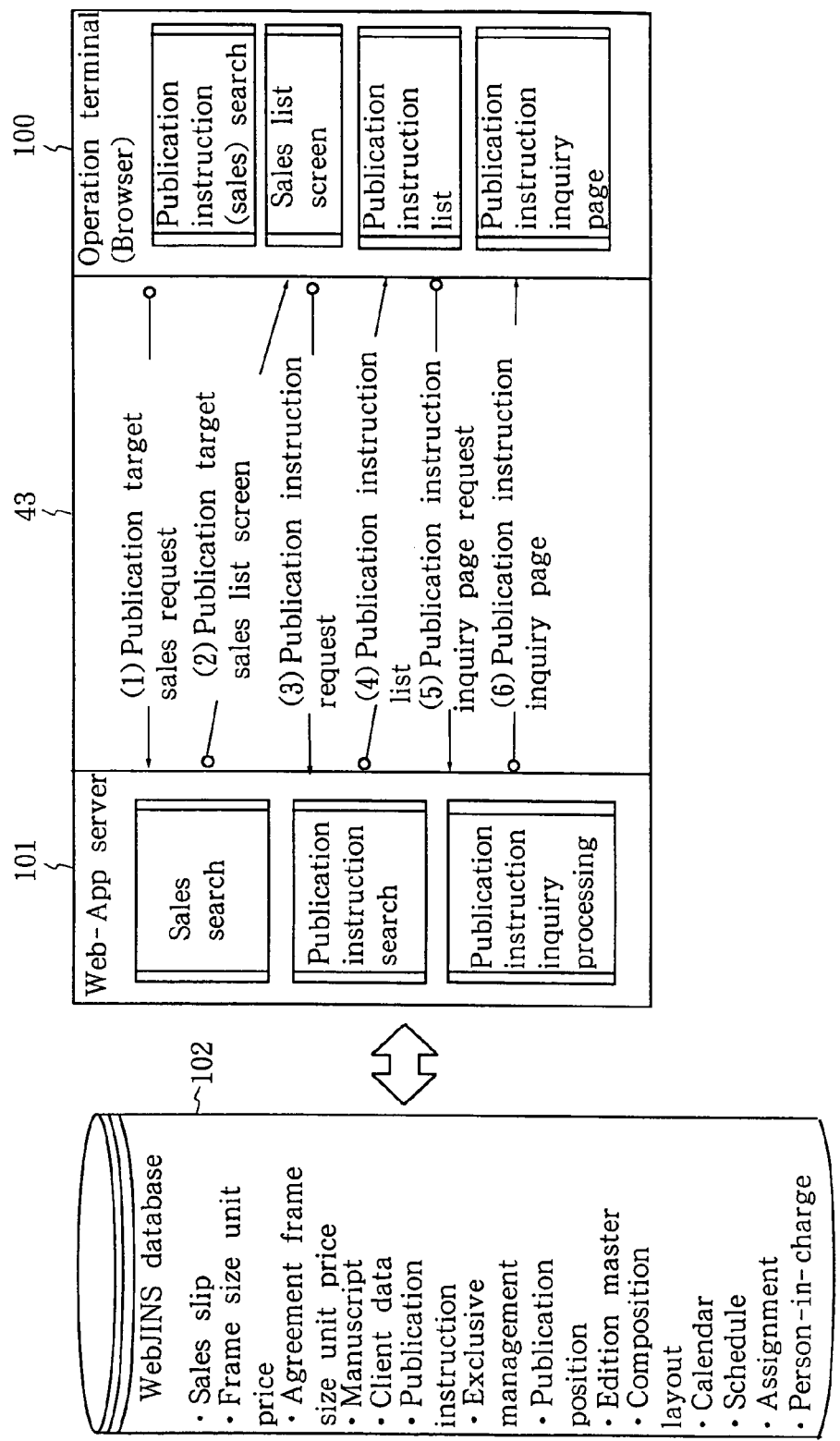
FIG. 24 is a view explaining the inquiry of the publication instruction.

FIG. 24 is a view explaining the inquiry of the publication instruction.

[Publication Instruction Inquiry Processing]

(1) The operation terminal transmits a data search request for the sales (agreement) of a publication target to the Web application server 101 from the publication instruction (sales) search page.

A publication instruction number for an inquiry target can be searched by directly designating inquiry from the publication instruction (sales) search page.

In this case, operation steps up to (6) can be omitted.

If a plurality of data exist in a search request range, operation is necessary according to steps (2) to (6).

(2) The Web application server 101 transmits a publication target sales list screen page to the operation terminal in response to the search request.

(3) The operation terminal displays the transmitted publication target sales list screen page.

Sales information on the publication target is displayed in the form of a list. The operation terminal selects sales (agreement) information on the publication target and transmits the selected information to the Web application server 101.

(4) The Web application server 101 searches publication instruction data tied to the publication target sales (agreement) information, creates a publication instruction list page, and transmits the created list page to the operation terminal.

(5) The operation terminal selects a publication instruction to be inquired from the transmitted publication instruction list page, and transmits a publication instruction inquiry page request to the Web application server 101.

(6) The Web application server 101 receives the publication instruction inquiry page request from the operation terminal, and creates sales basic information (the sales slip number, the publication period, the number of agreed issues, the number of actual issues of publication, the number of issues according to publication instruction, the number of remaining issues of publication) on a publication instruction duplication page, and transmits them to the operation terminal.

(7) The operation terminal displays the transmitted publication instruction inquiry page in a different window.

Figure 25:
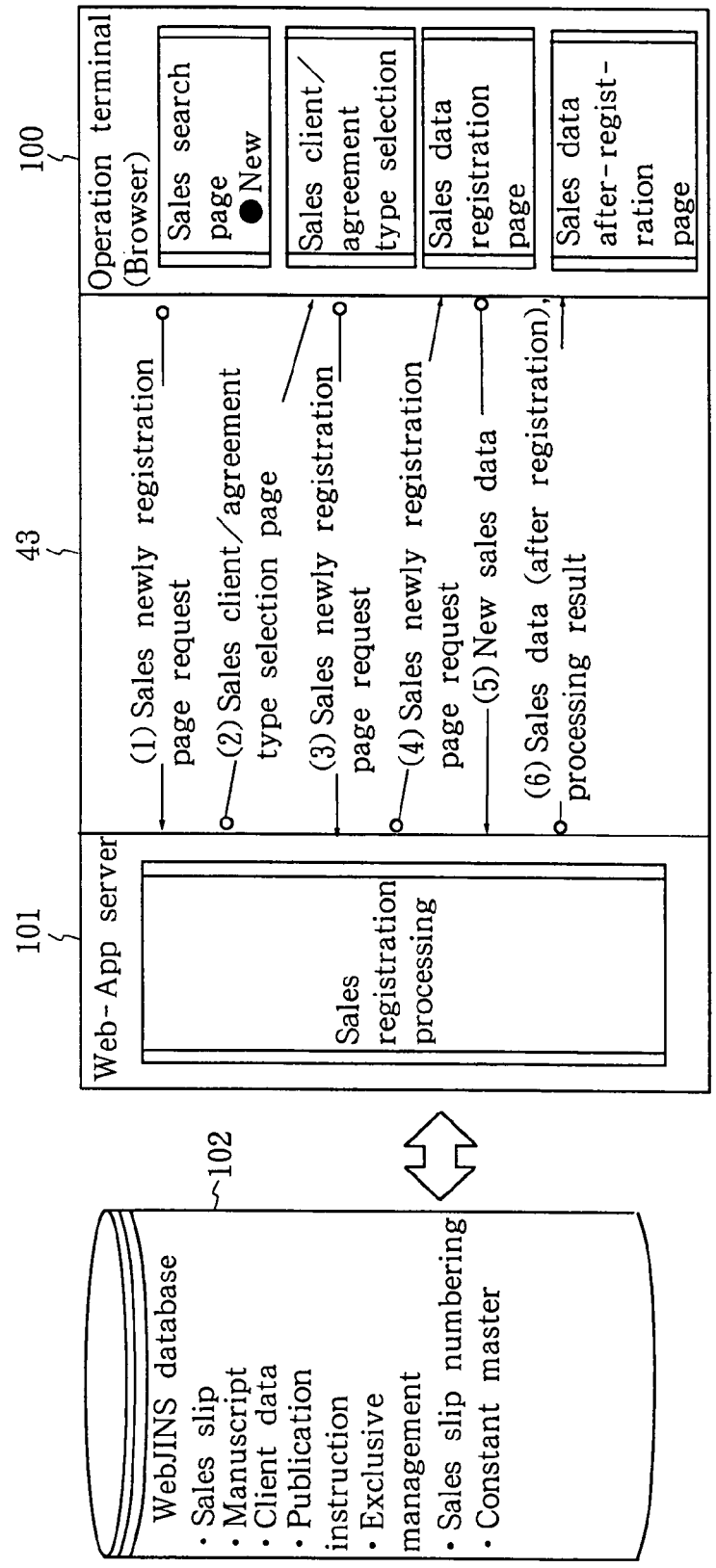
FIG. 25 is a view explaining the new registration of sales.

FIG. 25 is a view explaining the registration of new sales.

[New Sale Registration Processing]

The operation terminal executes a sales data (agreement) creation processing. The sales data creation processing depends on the type of the agreement of the company to which a login user belongs by user's login.

After the login, the sales data registration can be used.

In addition, the system management company is required to perform a sales data registration processing as a site owner. If a company holds an advertisement agent/good client agreement with the system management company, the system management company as the site owner, is responsible for the registration of agreement data and sales data.

The ASP user can, depending on the agreement type, arbitrarily determine whether agreement data and sales data are of the agreement type which the ASP can register.

(1) The operation terminal depresses 'new' for a new sales search page, and transmits a sales client and agreement type selection page request to the Web application server 101.

(2) The Web application server 101 transmits a sales client and an agreement type selection page to the operation terminal in response to the sales new registration page request.

(3) The operation terminal displays the transmitted sales client and agreement type selection page.

On this page, the operation terminal selects a client code for a client the sales data on which is registered and an agreement type, and transmits a sales new page registration page request to the Web application server 101.

The client code can be arbitrarily searched by the help function.

(4) The Web application server 101 receives the sales new registration page request, edits the name of the client from the client code and the name of the agreement type from the constant master to create a sales new registration page, and transmits the created page to the operation terminal.

(5) The operation terminal inputs sales data (contents of the agreement with the client such as slip classification, an edition code, a manuscript label, a format number code, the number of times of agreement, the number of issues according to agreement (normal), the number of issues according to agreement (service), an advertisement fee, a consumption tax, a publication period (agreement), mail classification, payment classification, agreement date, payment date, a bill issuing post, a section to which a person in charge belongs, the person in charge) to the sales new registration page. If executing a registration instruction, the operation terminal transmits a sales new data registration request with the page having the above-mentioned contents to the Web application server 101.

(6) The Web application server 101 receives the sales new data registration request from the operation terminal, fetches data with the above-mentioned sales (agreement) contents, conducts consistency checks including the automatic calculation of the advertisement fee to a sales table, the automatic calculation of the number of issues according to agreement and a check whether the same sales exist, numbers the sales slip from a sales slip numbering table, registers the sales data in a sales table, and transmits the automatically numbered sales slip number and the registered sales data to the operation terminal.

Figure 26:
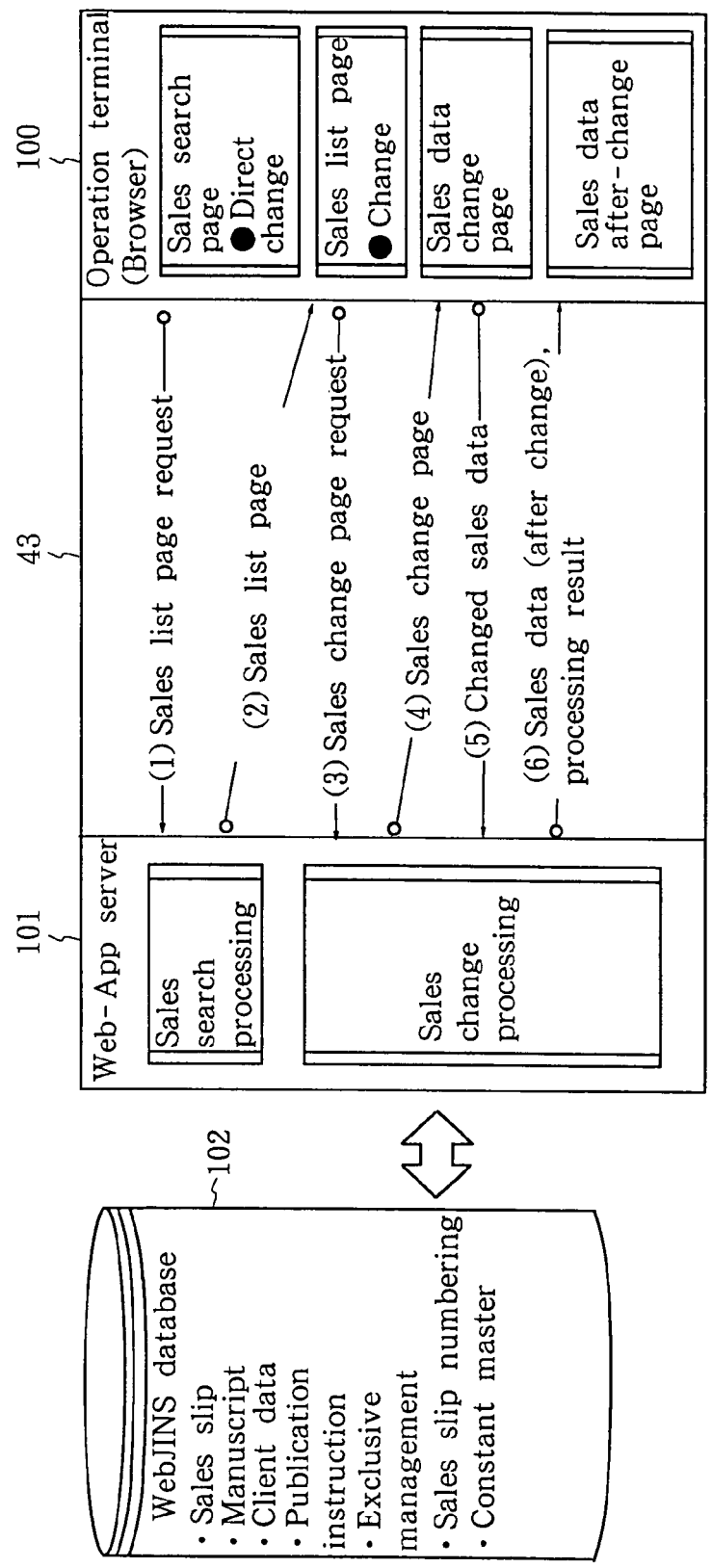
FIG. 26 is a view explaining the change of the sales.

FIG. 26 is a view explaining the change of the sales.

[Sales Change Processing]

(1) The operation terminal arbitrarily designates search conditions (slip number-branch number, client code, agreement type, edition code and the like) from the sales search page, and transmits a sales list page request to the Web application server 101.

The slip number-branch number to be changed can be searched by directly designating the change thereof from the sales search page.

In this case, operation steps up to (4) can be omitted.

If a plurality of data exist in a search request range, operation is necessary according to steps (2) to (4).

(2) The Web application server 101 extracts sales data consistent with the search conditions and creates a sales list page in response to the sales list page request, and transmits the sales list page to the operation terminal.

(3) The operation terminal displays the transmitted sales list page.

Sales data to be changed can be selected on this page. However, data to which a summing processing has been already executed and data having publication results and published cannot be changed. Therefore, only the sales data before the summing processing can be changed.

The operation terminal selects sales data to be changed from the sales list page, and transmits a sales change page request to the Web application server 101.

(4) The Web application server 101 receives the sales change page request, and checks that the change target sales data is not occupied by the other terminal by searching the exclusive management table using the name of the exclusive target, the identification value of the exclusive target, the session ID and the processing ID as search conditions.

If the requested sales slip is not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip to be occupied by the requester terminal.

The Web application server 101 searches the sales slip table according to the sales slip number-branch number, creates a sales change page, and transmits the sales change page to the operation terminal.

(5) The operation terminal inputs the sales data (contents of the agreement with the client such as the slip classification, the edition code, the manuscript label, the format number code, the number of times of agreement, the number of issues according to agreement (normal), the number of issues according to agreement (service), the advertisement fee, the consumption tax, the publication period (agreement), the mail classification, the payment classification, the agreement date, the sales date, the payment date, the bill issuing post, the section to which the person in charge belongs, the person in charge) to the sales change page. If executing a change instruction, the operation terminal transmits the sales change data registration request with the page having the above-mentioned contents to the Web application server 101.

(6) The Web application server 101 receives the sales change data registration request from the operation terminal, fetches data with the above-mentioned sales (agreement) contents, conducts consistency check including the automatic calculation of the advertisement fee to the sales table, the automatic calculation of the number of issues according to agreement and a check whether the same sales exist, numbers the sales slip from the sales slip numbering table, registers the sales data in the sales table, and transmits the changed sales data to the operation terminal.

If the consistency checks indicate that there is an error, the Web application server determines that the processing is a violation of operation and transmits before-change data to which the portion and content of the error is allocated to the operation terminal.

Figure 27:
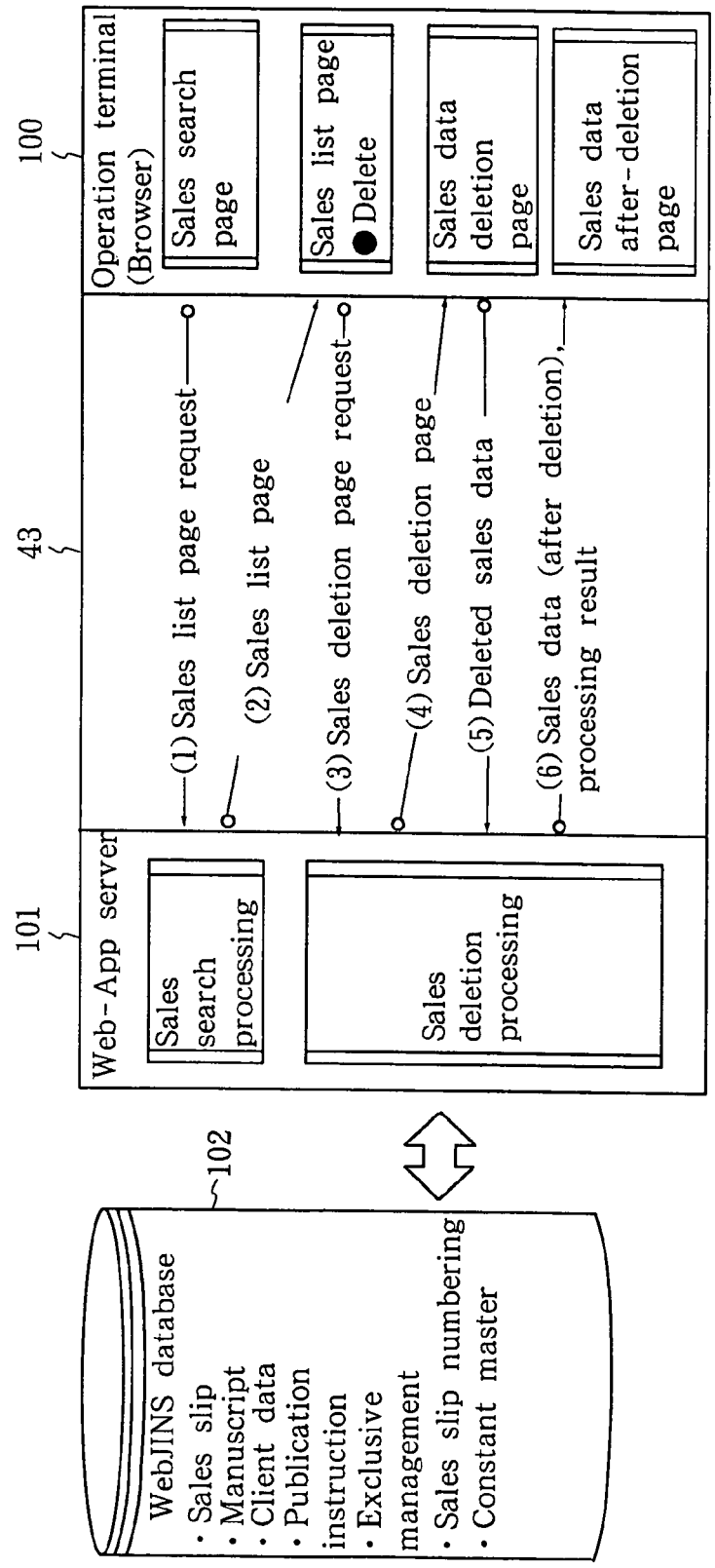
FIG. 27 is a view explaining the deletion of the sales.

FIG. 27 is a view explaining the deletion of the sales.

[Sales Deletion Processing]

(1) The operation terminal arbitrarily designates search conditions (slip number-branch number, client code, agreement type, edition code and the like) from the sales search page, and transmits a sales list page request to the Web application server 101.

(2) The Web application server 101 extracts sales data consistent with the search conditions and creates a sales list page in response to the sales list page request, and transmits the sales list page to the operation terminal.

(3) The operation terminal displays the transmitted sales list page.

Sales data to be deleted can be selected on this page. However, data to which a summing processing has been already executed and data having publication results and published cannot be deleted. Therefore, only the sales data before the summing processing can be deleted.

The operation terminal selects sales data to be deleted from the sales list page, and transmits a sales deletion page request to the Web application server 101.

(4) The Web application server 101 receives the sales deletion page request, and checks that the deletion target sales data is not occupied by the other terminal by searching the exclusive management table using the name of the exclusive target, the identification value of the exclusive target, the session ID and the processing ID as search conditions.

If the requested sales slip is not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip to be occupied by the requester terminal.

The Web application server 101 searches the sales slip table according to the sales slip number-branch number, creates a sales change page, and transmits the sales change page to the operation terminal.

(5) The operation terminal inputs the sales data (contents of the agreement with the client such as the slip classification, the edition code, the manuscript label, the format number code, the number of times of agreement, the number of issues according to agreement (normal), the number of issues according to agreement (service), the advertisement fee, the consumption tax, the publication period (agreement), the mail classification, the payment classification, the agreement date, the sales date, the payment date, the bill issuing post, the section to which the person in charge belongs, the person in charge) to the sales change page. If executing a change instruction, the operation terminal transmits the sales deletion data registration request with the page having the above-mentioned contents to the Web application server 101.

(6) The Web application server 101 receives the sales deletion data registration request from the operation terminal, fetches data with the above-mentioned sales (agreement) contents, and transmits the deleted sales data to the operation terminal.

Figure 28:
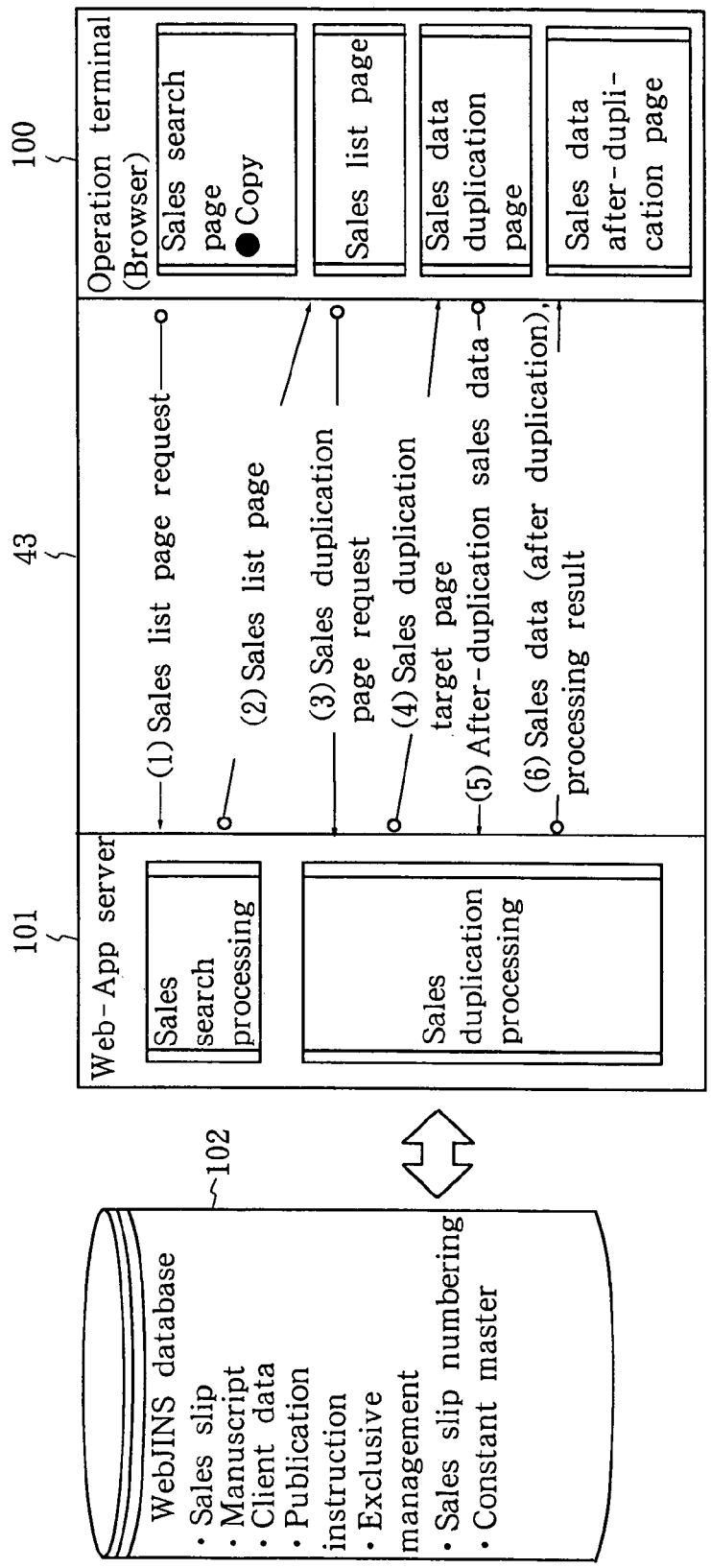
FIG. 28 is a view explaining the duplication of the sales.

FIG. 28 is a view explaining the duplication of the sales.

[Sales Duplication Processing]

(1) The operation terminal arbitrarily designates search conditions (slip number-branch number, client code, agreement type, edition code and the like) from the sales search page, and transmits a sales list page request to the Web application server 101.

(2) The Web application server 101 extracts sales data consistent with the search conditions and creates a sales list page in response to the sales list page request, and transmits the sales list page to the operation terminal.

(3) The operation terminal displays the transmitted sales list page.

If sales data is to be duplicated on this page, any sales data can be selected in whatever state the data is.

The operation terminal selects sales data to be duplicated from the sales list page, and transmits a sales duplication page request to the Web application server 101.

(4) The Web application server 101 receives the sales duplication page request, and checks that the duplication target sales data is not occupied by the other terminal by searching the exclusive management table using the name of the exclusive target, the identification value of the exclusive target, the session ID and the processing ID as search conditions.

If the requested sales slip is not occupied by the other terminal, the Web application server 101 outputs the name of the exclusive target, the identification value of the exclusive target, the session ID, the processing ID, the lock user company code, the post code, the person-in-charge code and the lock time to the exclusive management table to allow the search-requested sales slip to be occupied by the requester terminal.

The Web application server 101 searches the sales slip table according to the sales slip number-branch number, creates a sales duplication page, and transmits the sales duplication page to the operation terminal.

(5) The operation terminal inputs the sales data (contents of the agreement with the client such as the slip classification, the edition code, the manuscript label, the format number code, the number of times of agreement, the number of issues according to agreement (normal), the number of issues according to agreement (service), the advertisement fee, the consumption tax, the publication period (agreement), the mail classification, the payment classification, the agreement date, the sales date, the payment date, the bill issuing post, the section to which the person in charge belongs, the person in charge) to the sales duplication page. If executing a duplication instruction, the operation terminal transmits the sales duplication data registration request with the page having the above-mentioned contents to the Web application server 101.

(6) The Web application server 101 receives the sales duplication data registration request from the operation terminal, fetches data with the above-mentioned sales (agreement) contents, conducts consistency check including the automatic calculation of the advertisement fee to the sales table, the automatic calculation of the number of issues according to agreement and a check whether the same sales exist, numbers the sales slip from the sales slip numbering table, registers the sales data in the sales table, and transmits the automatically numbered sales slip number and the registered sales data to the operation terminal.

If the consistency checks indicate that there is an error, the Web application server determines that the processing is a violation of operation and transmits before-change data to which the portion and content of the error is allocated to the operation terminal.

Figure 29:
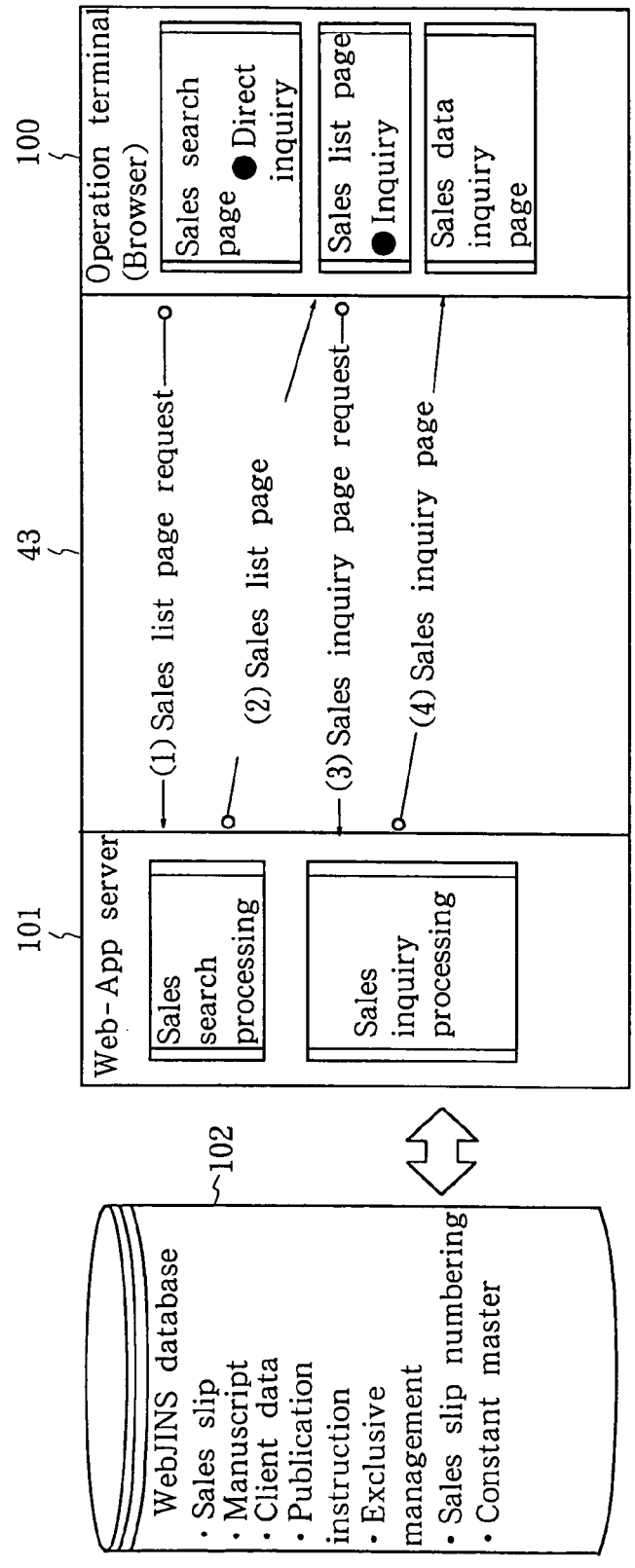
FIG. 29 is a view explaining the inquiry of the sales.

FIG. 29 is a view explaining the inquiry of the sales.

[Sales Inquiry Processing]

(1) The operation terminal arbitrarily designates search conditions (slip number-branch number, client code, agreement type, edition code and the like) from the sales search page, and transmits a sales list page request to the Web application server 101.

The slip number-branch number to be inquired can be searched by directly designating the inquiry thereof from the sales search page.

In this case, operation steps up to (4) can be omitted.

If a plurality of data exist in a search request range, operation is necessary according to steps (2) to (6).

(2) The Web application server 101 extracts sales data consistent with the search conditions and creates a sales list page in response to the sales list page request, and transmits the sales list page to the operation terminal.

(3) The operation terminal displays the transmitted sales list page.

If sales data is to be inquired on this page, any sales data can be selected in whatever state the data is.

The operation terminal selects sales data to be inquired from the sales list page, and transmits a sales inquiry page request to the Web application server 101.

(4) The Web application server 101 receives the sales inquiry page request, searches the sales slip table according to the sales slip number-branch number, creates a sales inquiry page, and transmits the created sales inquiry page to the operation terminal.

(5) The operation terminal displays the transmitted sales inquiry page in a different window.

Figure 30:
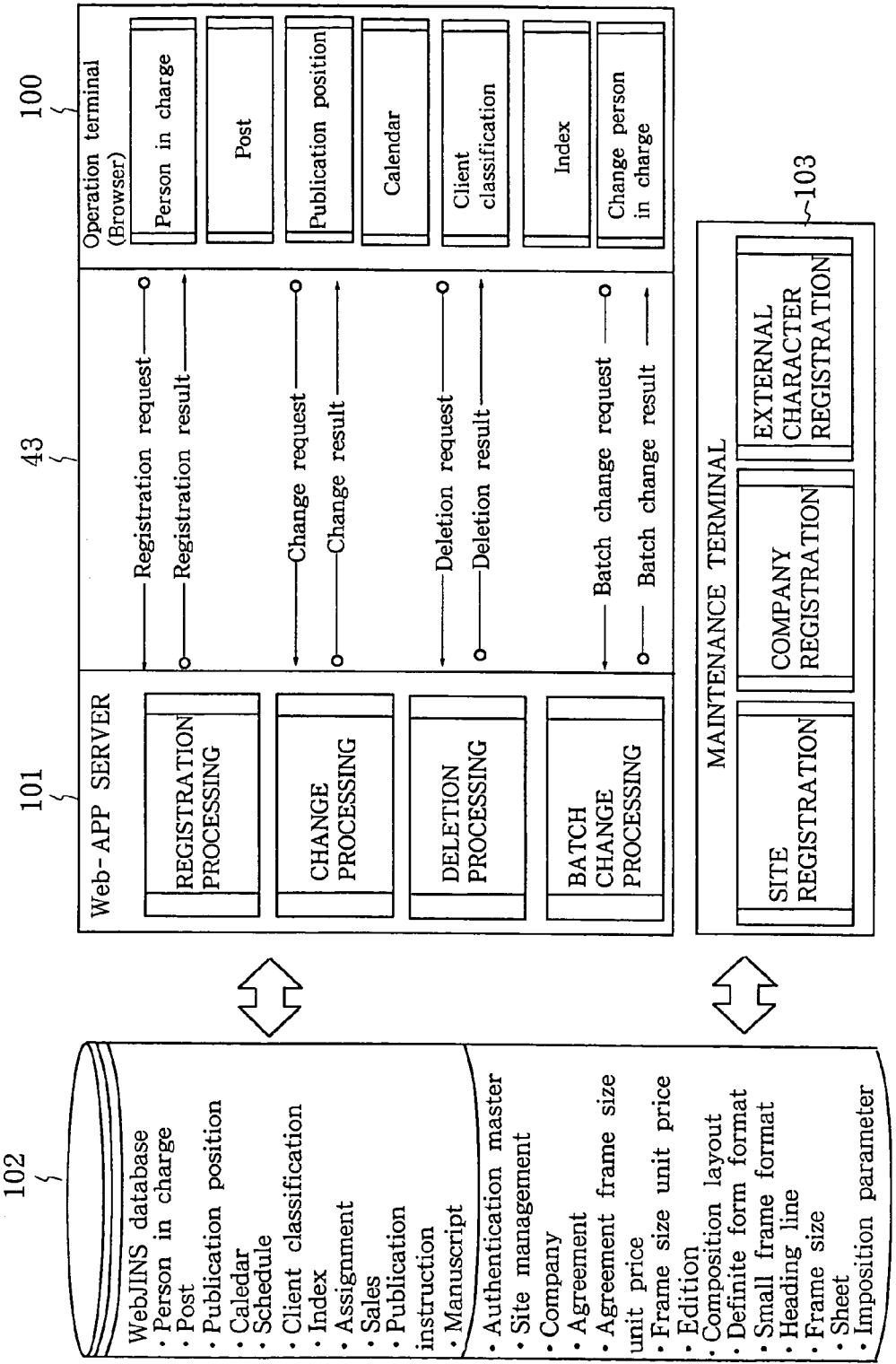
FIG. 30 is a view explaining a maintenance function.
Figure 31:
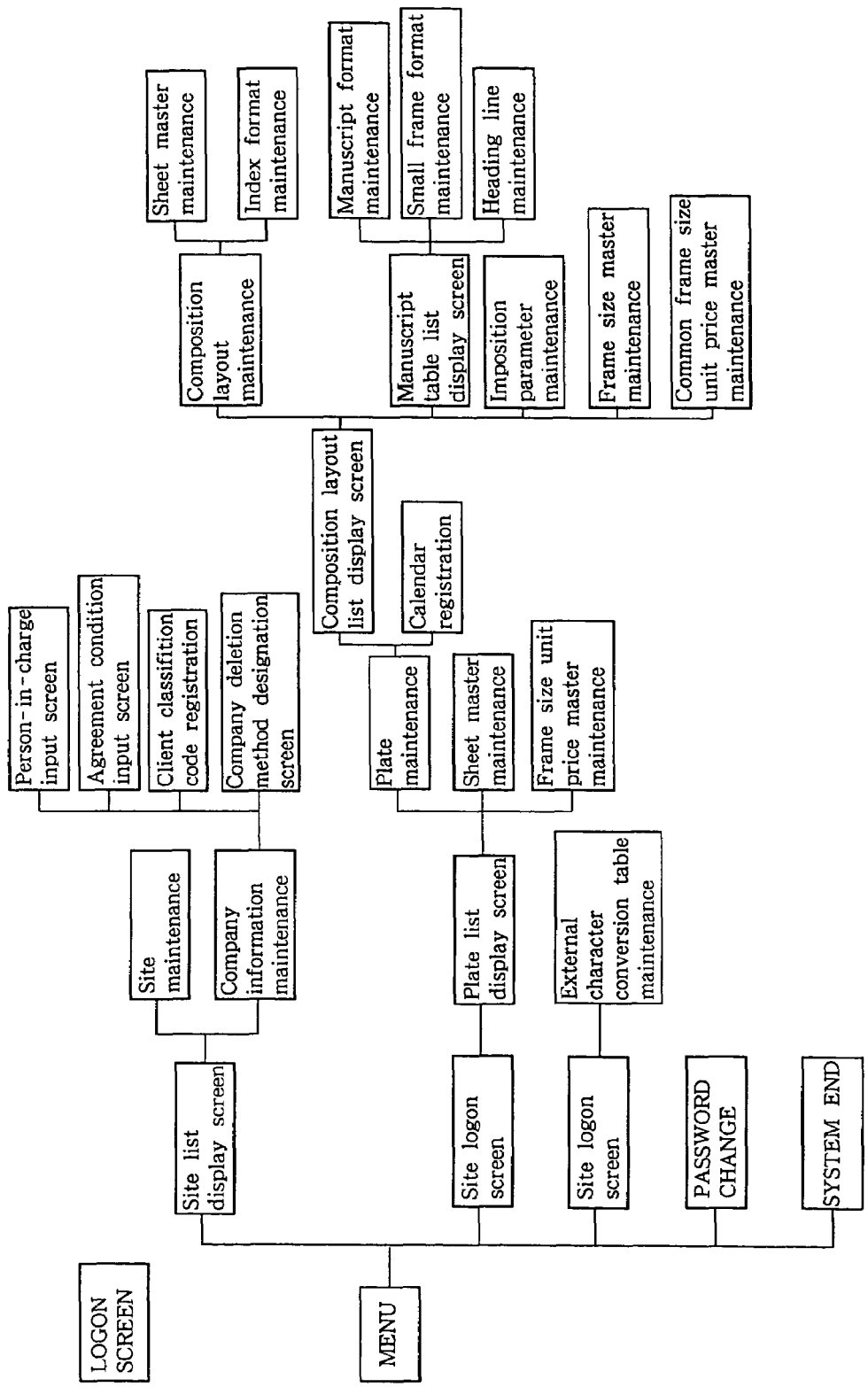
FIGS. 31 and 32 are maintenance operation system screen transition views.
Figure 32:
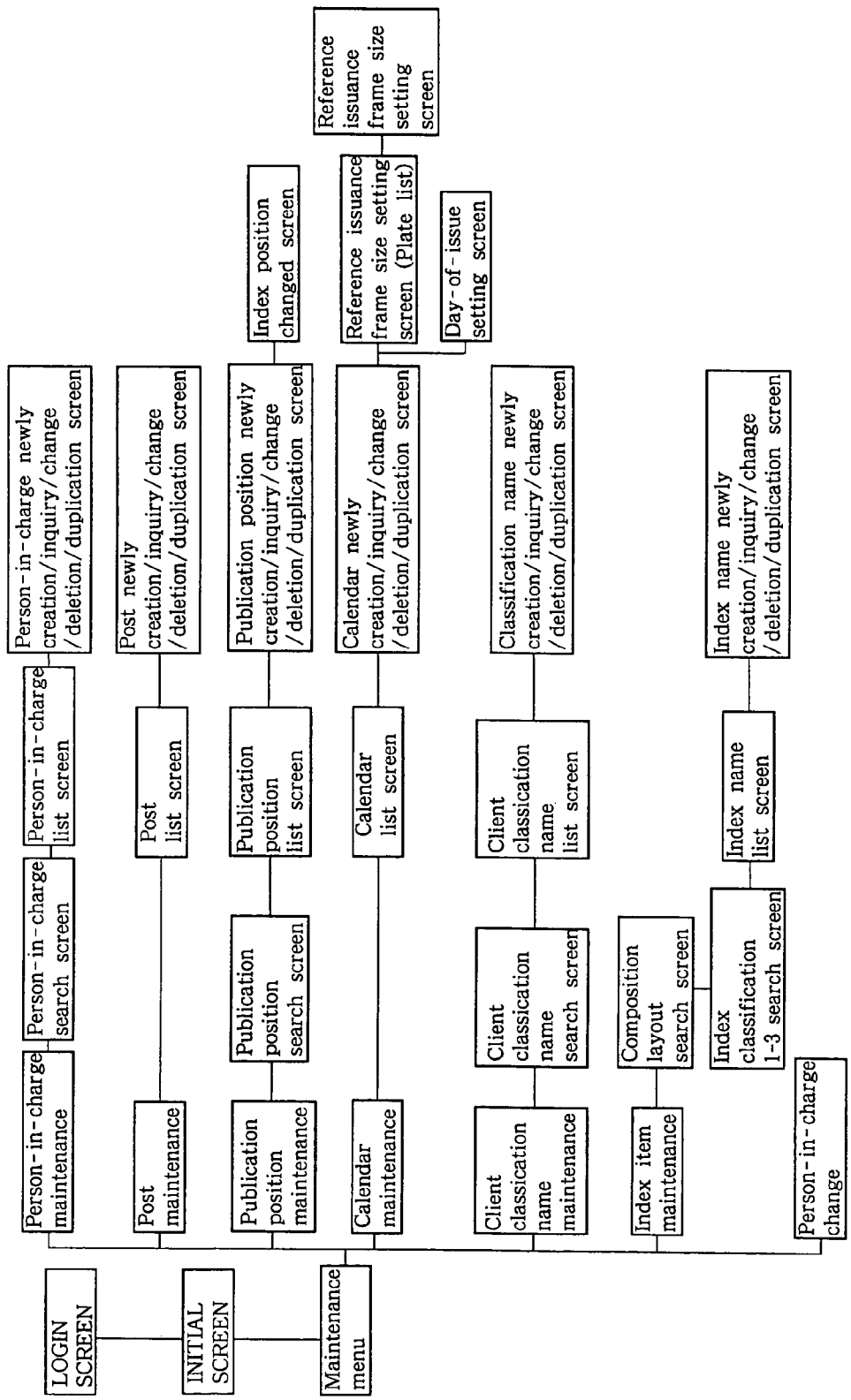

FIG. 30 is a view explaining a maintenance function, and FIGS. 31 and 32 are maintenance operation system screen transition views.

[Maintenance Function Processing]

The various information magazine automatic editing system has two functions: a maintenance function of creating a database and registering information magazine layout information for each company; and a maintenance function of registering information and data on the publication of a book and on the elements that constitute the book such as a person in charge, a post, a publication position, a calendar and an index for each registered company. The former function will be referred to as "VB maintenance function" and the latter as "WEB maintenance function". The function that only a person responsible for system control and management can utilize is a "VB maintenance system" and the function by which a registered ASP company can arbitrarily designate and create information is a "WEB maintenance system".

Function of VB Maintenance System

1. A DB region (data storage) for each ASP company is defined in the system database and the ASP company is registered.

2. After the registration of the ASP company, the person in charge of system control and management newly registers information on the system manager (person in charge of company, agreement, system management) of the ASP company.

3. The definition of a book to be published (sheet, editions, layout, frame size, definite form format, small frame format, heading line, imposition parameters) is newly registered.

This processing can be executed at any timing. However, if actual manuscript data is registered, the existing manuscript data cannot be secured during the change of the defined data on this book to be published. If data is added, the addition of data does not influence the processing even if the manuscript data already exists.

Function of WEB Maintenance System

1. After the VB maintenance system completes the registration of the ASP company, the ASP company system manager arbitrarily registers information on the post, the person in charge and the section to which the person belongs, the index setting (publication position, index) and publication schedule (calendar schedule) of the book to be published, and the classification codes of the client.

2. This function can be executed at any time. However, after actual data (manuscript, sales, publication instruction) is registered, the actual data cannot be secured during the change of this defined data. If data is added, the addition of data does not influence the processing even if the actual data already exists.

3. To change the data due to the retirement or change of the person in charge in the processing of 2, the system has a function of being capable of making change by batch change of the related data according to the change of the person in charge.

Figure 33:
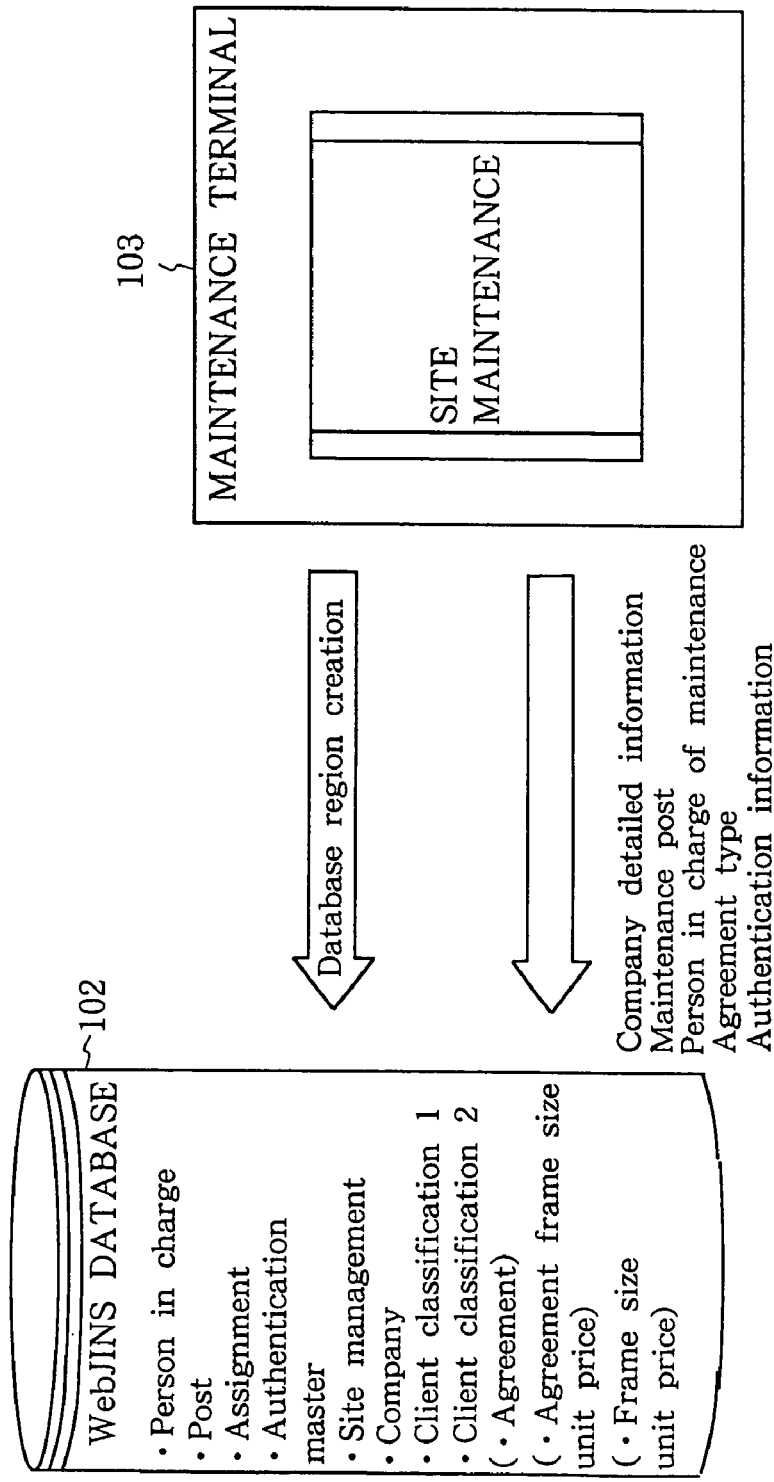
FIG. 33 is a view explaining the registration of an ASP company in a maintenance function configuration.

FIG. 33 is a view explaining the registration of the ASP company in the maintenance function configuration.

[VB Maintenance Function Processing]

In the system, since a database is created for each company, the system control manager registers agreement information on the agreement between the host company and each contracted company (to be referred to as "ASP company" hereinafter) such as the registration of the company, the agreement type, editions, layout, unit price of the size according to the agreement, the unit price of the size, the size number as well as information on the book (edition) of each company. Only the system control manager can execute the registration operation.

Further, after the completion of the agreement procedures, information data on the publication of the book and information on elements that constitute the book such as the person in charge, the post, the publication position, calendar/schedule/client classification and index on each registered ASP company is arbitrarily designated and created for each ASP company through the WEB maintenance function. Initial authentication information on the ASP company at this time is only the information created through this site maintenance.

1. A data storage region (table space region) for a newly registered company is created from the site maintenance and a new site is created.

The information set herein includes information on the login user and password (unchangeable after registration) of a database and browser display templates (which can be arbitrarily created in advance and changed after registration).

2. After the completion of this processing, the site (data storage region) is created, and information on each company that uses this site is registered on the site company maintenance.

The information set herein includes newly registered company basic information (a site logon user name, a site client code, an address, a telephone number, sales calculation information and the like), information on the presence/absence of the output device (manuscript definition layout creation device), that on a maintenance post and a person in charge of maintenance for this site, that on classification general names of a client classification 1 master and a client classification 2 master (changeable after registration) and that on agreement conditions (an agreement type, an agreement unit price and the like).

As for the setting of the agreement conditions, they can be reset after creating information on the book to be published if information on the book is not created yet.

However, after the use of the information starts on this site, this agreement information cannot be changed for one month. Due to this, agreement change timing is basically at one-month interval. If there is no agreement change, the agreement automatically continues.

Agreement Type

Flat-rate plan agreement is a Publication agreement with a monthly fixed rate.

Flexible agreement is a Publication agreement which has an effective period and under which a rate is charged according to the actually published frame size at the end of each month.

Month-end result-basis agreement is a Publication agreement which has no effective period and under which a rate is charged according to actual publication size at the end of each month.

Figure 34:
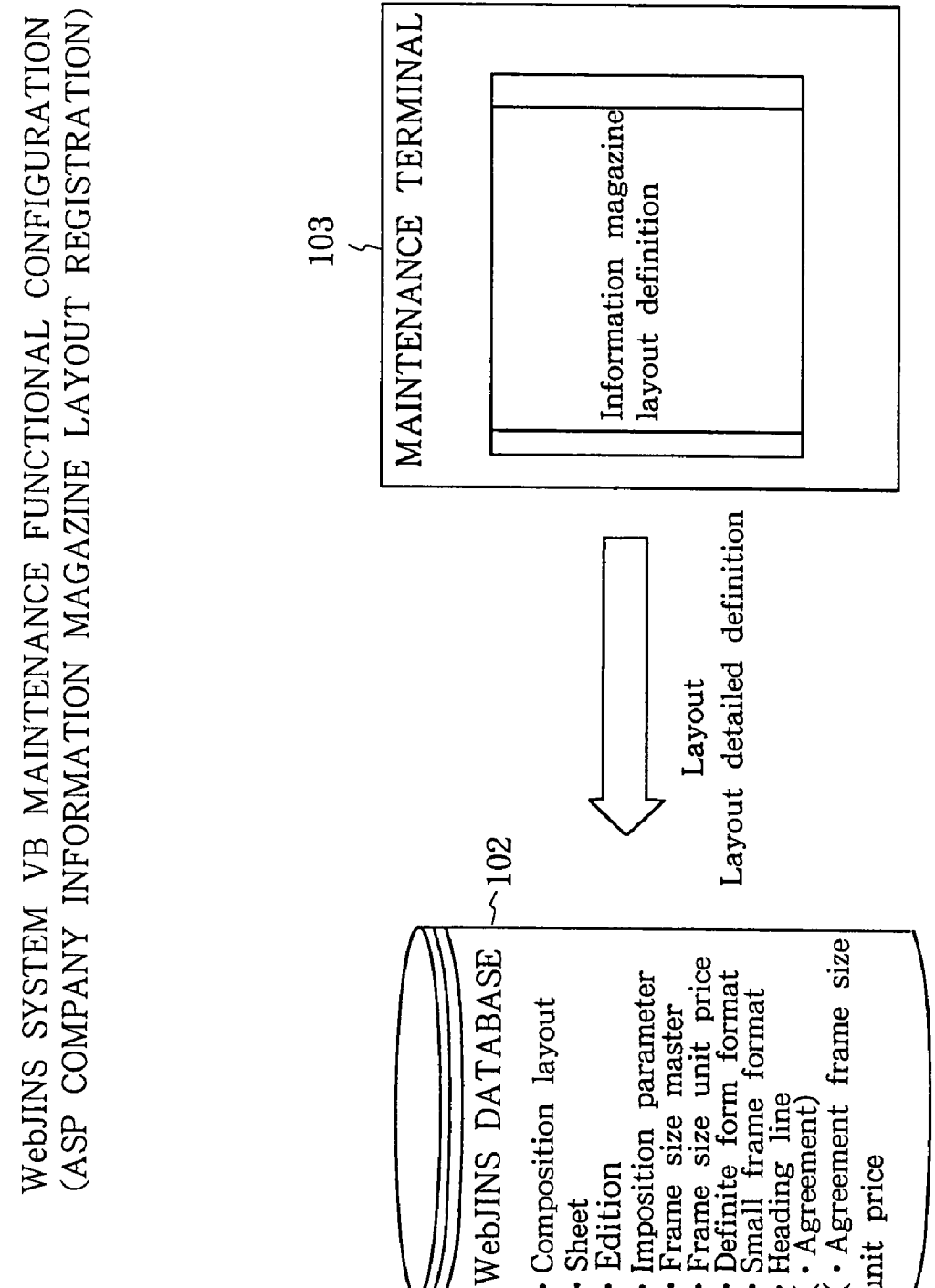
FIG. 34 is a view explaining the registration of the layout of an ASP company information magazine in the maintenance function configuration.

FIG. 34 is a view explaining Application service provider company information magazine layout registration in the maintenance function configuration.

[VB Maintenance Function Processing, Application Service Provided Company Information Magazine Layout Registration]

The editing system can create the configuration of a book for each company. This means that any book which each company wants can be published.

The ASP company, the site of which is created, creates the configuration of a book in cooperation with the system control manager and defines the space manuscript frame on the output device (to be referred to as "EDIAN" hereinafter) owned by the system control manager, thereby making it possible to register manuscript data for each frame definition on the manuscript data input screen. In addition, if the ASP company owns the output device, a PostScript file can be separately provided not to the output device (EDIAN) owned by the system control manager but the output device owned by the ASP company. This information can be set during the registration of the site company.

1. Define Edition

An edition maintenance screen is displayed and an edition code, an edition name, turnaround frequency, composition layout, a composition layout publication calendar (to be referred to as "calendar" hereinafter) are set on the edition maintenance screen.

If the composition layout and the calendar are not registered, they can be set on each maintenance screen branched from the maintenance screen.

The information set herein is limited to that on the function of creating master data with a book to be published set as edition data. Later manuscript data input information and publication instruction data input information from the Internet are all constituted based on the master data of the space information set herein.

2. Define Composition Layout

The composition layout is a function for defining basic configuration information on the space of the book to be published.

Therefore, the information defined herein is information on the names of composition layout parts, a book binding method, a paper size, definite form manuscript width and height, the number of frames in width and height directions, X and Y coordinates of the origin of the paper, and the number of pages for plate planning.

Further, if the index layout is not defined depending on the presence/absence of the index, the system has a function of creating new index layout to make it possible to define the index layout similarly to the composition layout. Up to three index items can be arbitrarily set.

By registering these pieces of information, it is possible to define the composition layout in the configuration of the space.

3. Define Calendar

The name of the composition layout publication basic calendar, a calendar creation period, and a weekly day-of-issue pattern are defined.

By registering them, basic publication calendar data is created under the above-mentioned conditions.

Since this calendar definition function is based on a daily magazine, data is created based on the weekly day of issue.

In case of a weekly magazine, only a target day of the week of issue can be set and registered. In case of a monthly magazine, however, after setting only a target issue day of the week, it is required to make designation and change in more detail using the calendar maintenance function in the Web maintenance function.

The setting of a day of no issue due to a holiday and the setting of a holiday due to a company calendar can be made by the calendar maintenance function in the Web maintenance function.

4. The VB maintenance function includes a function of registering master data for defining a frame which constitutes this layout (to be referred to as "frame size" hereinafter), and defining and constituting the unit price of the frame size and the manuscript definite form format imposition parameters for the frame size after the completion of the definition of the composition layout.

5. Define Frame Size

The definition of the frame size can be set by frame size number master maintenance.

Such information as an arbitrary frame size number code, a frame size number name, a frame size number abbreviation, the number of frames in the width direction, the number of frames in the height direction and whether the frame size number corresponds to a composition target frame size number can be set.

The area of a manuscript per frame size is determined by the number of frames in the width direction and that of the frames in the height direction included in the composition layout registration information. Therefore, by setting this frame size, it is possible to determine the constitution of the manuscript definite form format and that of the frame definition of the output device.

For example, the number of frames of a daily job-placement magazine "Yellow Book (Registered trademark of Joho Service Corporation)" published by the control managing company of this system, is 3×6=18 on all pages. The definition of this frame size is defined for composing paper space by frame sizes such as frame size 1 (1×1), frame size 2 (1×2), frame size 3 (1×3), frame size 6 (1×6), frame size 9 (3×3) and frame size 18 (3×6).

6. Define Frame Size Unit Price

By creating the frame size number master, it is possible to set the unit price of the frame size.

This frame size unit price can be obtained by setting a unit price per frame size tied to the edition according to the registered frame size.

If the site utilization agreement with the ASP company is the agreement of flexible, month-end payment according to actually published frame size, the amount claimed is calculated by multiplying this frame size unit price by the number of times of actual publication.

7. Define Manuscript Format

The VB maintenance function includes a function of setting the manuscript format for the frame size set in 5 above as master data.

The master data constituting the manuscript format consists of three pieces of master data; manuscript definite form master data; definite form small frame master data; and small frame heading line master data.

In the manuscript definite form, it is possible to define one or a plurality of patterns for a frame size.

In the definite form small frame, it is possible to set frame attributes, the number of input lines, the number of input columns and the like for each small frame in the frame definition for each frame size and pattern set to the manuscript definite form.

In the small frame heading, a different name is given to each small frame line and a heading line is developed based on this name information when lines are developed on the manuscript data input screen.

In the definite form small frame, since image data such as a map can be set, it is also possible to set X and Y coordinate positions.

8. Define Imposition Parameters

On the imposition screen of the composition system (automatic editing/imposition system), it is possible to arbitrarily set the manuscript label, the client classification 2 code, the position of the display of rotational display manuscript title and font on the screen.

9. By defining and setting these pieces of master data, it is possible to input the manuscript data and publication instruction data.

Figure 35:
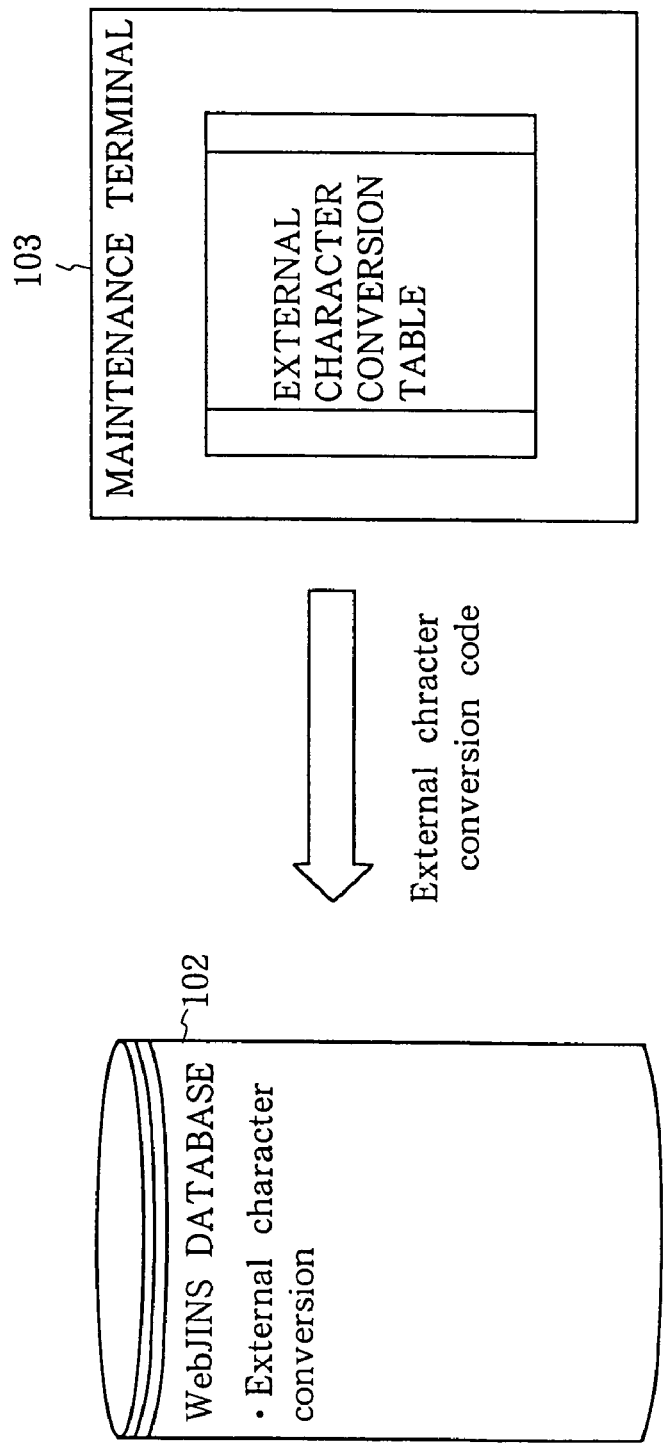
FIG. 35 is a view explaining the registration of the external character conversion table of the ASP company in the maintenance function configuration.

FIG. 35 is a view explaining the registration of the external character conversion table of the ASP company in the maintenance function configuration.

[VB Maintenance Function Processing, ASP Company External Character Conversion Table Registration]

The system can create the constitution of a book for each ASP company. The system includes a function of adding external characters to a currently registered external character file and using the file at the time of registering external characters used in the output device in each ASP company.

1. A code formed by external characters is registered in the external character empty area of the operating PC by setting the external character mapping code of the output device (EDIAN). By doing so, master data synchronized with the data of the external character file of the output device (EDIAN) owned by the system control management company is registered.

2. By registering external character code data in the external character conversion table, the master data is synchronized with the data of the external character file of the output device (EDIAN) to allow the output device side to automatically perform external character conversion.

Figure 36:
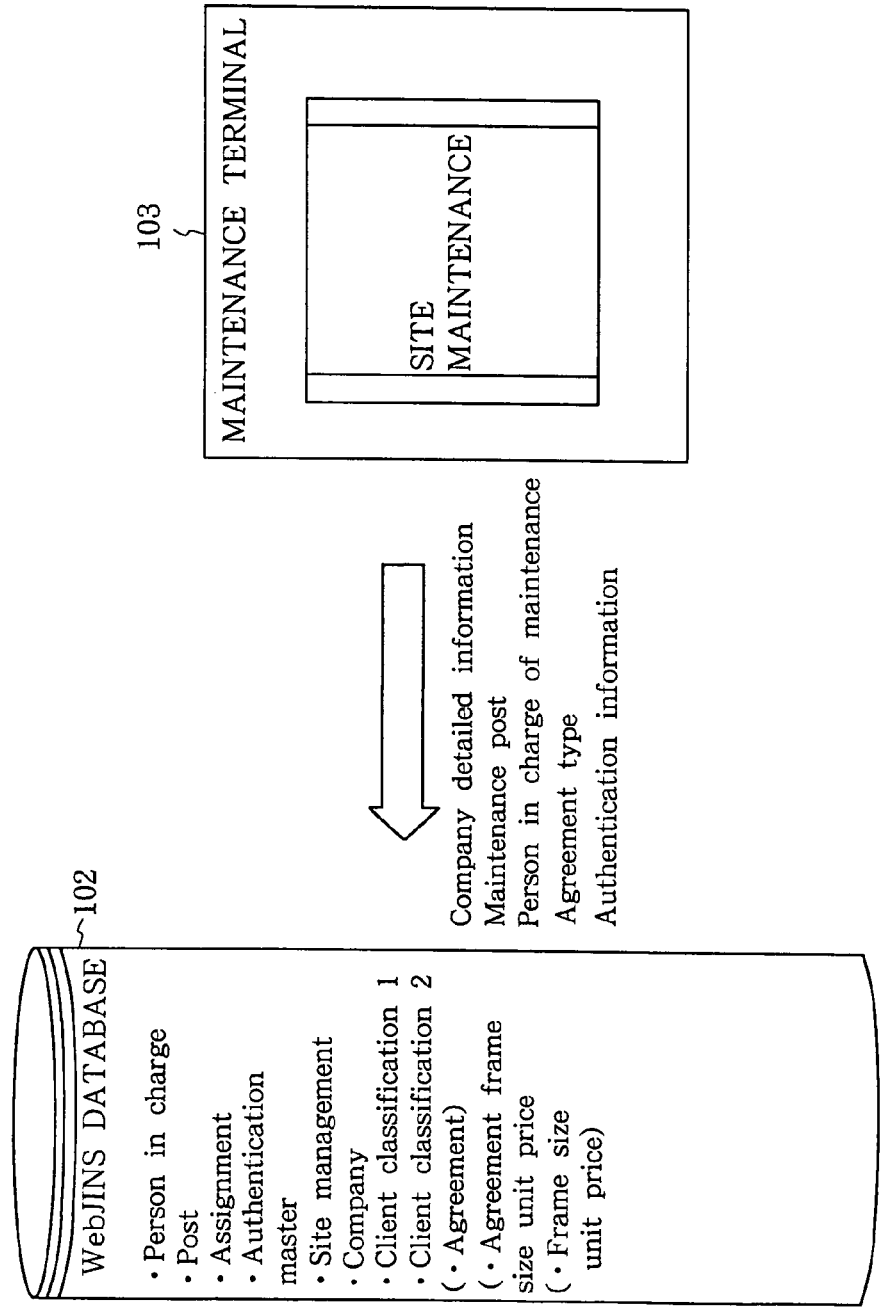
FIG. 36 is a view explaining the registration of advertisement agents and good clients of the registered company in the maintenance function configuration.

FIG. 36 is a view explaining the registration of advertisement agents and good clients of the registered company in the maintenance function configuration.

[VB Maintenance Function, Registration of Advertisement Agents and Good Clients]

1. A data storage region (table space region) for newly registered companies can be created from the site maintenance but a new site for the advertisement agents and good clients of each ASP company cannot be created.

The information set herein is client information on advertisement agents for each site which is registered (client registration). If the ASP company holds an agreement with a client so that the client becomes an agent of the company, the VB maintenance system enables the registration of the client as an advertisement agent or a good client.

2. Information on each company which uses the site is registered as information on the advertisement agent or good client of the company from the site company maintenance.

As the information set herein, company basic information (a site logon user name, a site client code, an address, a telephone number, sales calculation information and the like) on each of the advertisement agents and good clients is newly registered, and information on the maintenance post, person in charge of maintenance and agreement conditions (agreement type, agreement unit price and the like) of this site is set.

In the setting of the agreement conditions, the unit price of a book to be published can be set.

However, this agreement information cannot be changed for one month after the agreement starts on this site. Due to this, agreement change timing is basically at one-month intervals. If there is no agreement change, the agreement automatically continues.

Agreement Type

Flat-rate plan agreement . is a Publication agreement with a monthly fixed rate.

Flexible agreement is a Publication agreement which has an effective period and under which a rate is charged according to actually published frame size at the end of each month.

Month-end result-basis agreement is a Publication agreement which has no effective period and under which a rate is charged according to actually published size at the end of each month.

3. After the conclusion of the agreement, only the site company which belongs to the site can input manuscript data and publication instruction data to the published book owned by the company and the calculation of the amount claimed for each input differs according to the agreement type.

Figure 37:
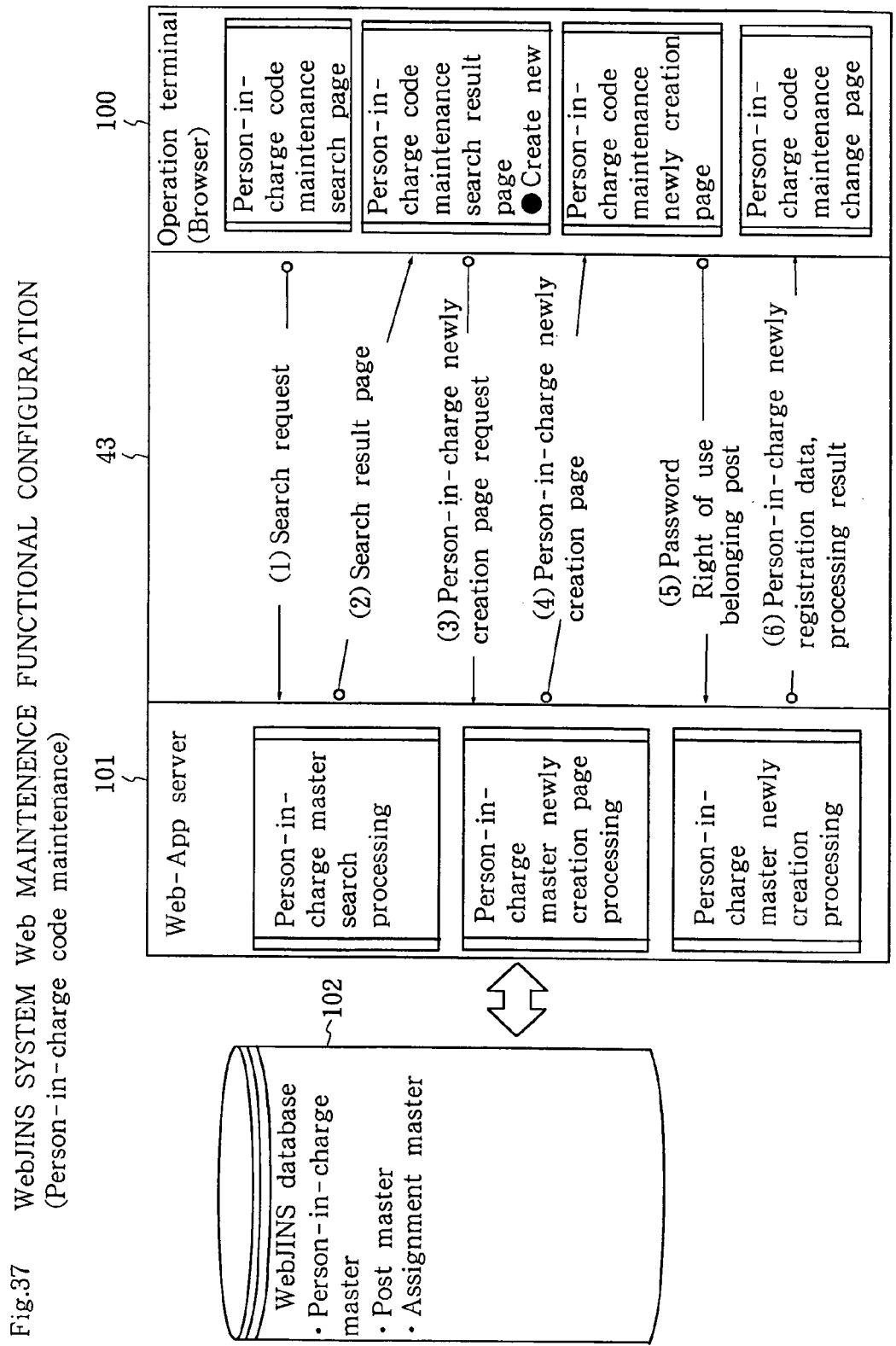
FIG. 37 is a view explaining the maintenance of a person-in-charge code in the maintenance function configuration.

FIG. 37 is a view explaining the maintenance of a person-in-charge code in the maintenance function configuration.

[WEB Maintenance Function Processing]

The WEB maintenance system can set master data such as a post, a person in charge, a calendar and client classification for each company in response to the contents of the master data transmitted from the VB maintenance system.

This WEB maintenance function can be executed only by the person in charge of maintenance who is registered in the VB maintenance system in each ASP company.

[Person-In-Charge Code Maintenance]

The operation terminal executes a person-in-charge creation processing. In the person-in-charge master data creation processing, a company which can be registered is determined by login information.

Further, the right of use authorized only to the person in charge of system maintenance is determined and registered at the time of the registration of the person-in-charge code maintenance, whereby this function can be used by the person in charge.

(1) The operation terminal transmits a search request to the Web application server 101 on a person-in-charge code maintenance search page.

(2) The Web application server 101 transmits a person-in-charge code maintenance search result page to the operation terminal in response to the search request.

(3) The operation terminal can execute the inquiry, change or deletion, and duplication of data on the transmitted person-in-charge code maintenance search result page. By depressing "Create New" button in the lower left of the search result page, the operation terminal transmits a person-in-charge code maintenance new creation page request to the Web application server 101.

(4) The Web application server 101 creates a person-in-charge code maintenance new creation page based on the login company information in response to the received person-in-charge code maintenance newly creation page request, and transmits the created page to the operation terminal.

(5) The operation terminal displays the transmitted person-in-charge code maintenance newly creation page.

On the newly created page, a person-in-charge code is automatically set by acquiring the maximum code number given to the company+1.

Further, on this page, a password, the right of use and a post in charge can be input and selected and thereby newly registered data can be input.

In this case, the following respect should be taken into account. Since the system control manager shares data with its own sales management system, there are more rights of use than those of the other companies and the rights are determined during the registration of the person in charge.

There are four rights of use as follows:

1. Data maintenance right

2. Image data upload right

3. Right of use of business support

4. Right of use of sales management.

As the post in charge, all the contents of the assignment master existing in the login company are displayed. The person in charge of business activity and office work over a plurality of posts can be registered while selecting a plurality of posts, and searched according to the same person-in-charge code at any post.

The operation terminal inputs and selects the above-mentioned input/selection items on the person-in-charge code maintenance new creation page, and transmits the data to the Web application server 101.

(6) The Web application server 101 fetches person-in-charge data from the transmitted data, conducts a consistency check and the like, registers the person-in-charge data in the person-in-charge master, gives a code to the person-in-charge data, registers the person-in-charge code, and transmits the master data after the registration to the operation terminal.

Figure 38:
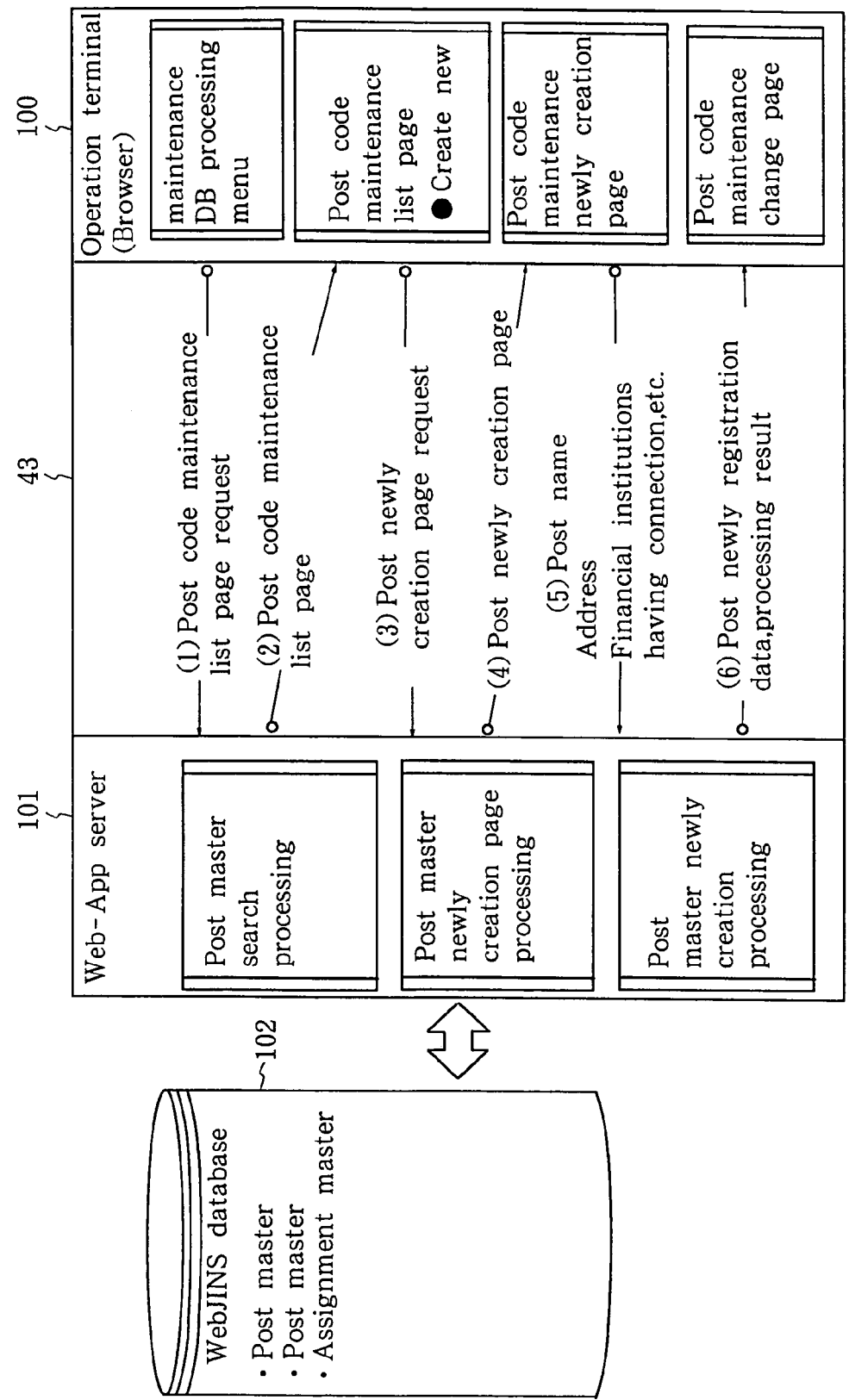
FIG. 38 is a view explaining the maintenance of a post code in the maintenance function configuration.

FIG. 38 is a view explaining the maintenance of a post code in the maintenance function configuration.

[Post Code Maintenance]

The operation terminal executes a post creation processing. If a person in charge of data input extends over a plurality of posts in a registered company, post master data is created. Even if the posts are managed without separating them, at least one post is registered when the company is registered.

This function can be used only by the person in charge of the system.

(1) The operation terminal transmits a post code maintenance list page request to the Web application server 101.

(2) The Web application server 101 transmits a post code maintenance list page to the operation terminal in response to the list page request.

(3) The operation terminal can execute the inquiry, change or deletion, and duplication of data on the transmitted post code maintenance list page. By depressing "Create New" button in the lower left of the search result page, the operation terminal transmits a post code maintenance new creation page request to the Web application server 101.

(4) The Web application server 101 creates a post code maintenance new creation page based on the login company information in response to the received post code maintenance new creation page request, and transmits the created page to the operation terminal.

(5) The operation terminal displays the transmitted post code maintenance new creation page.

On the new creation page, a post code, a post name, a postal code, an address, a telephone number, a facsimile number and financial institutions 1 to 3 having a connection to the company can be input as newly registered data.

In this case, the following respects should be taken into account. The system control manager shares data with its own sales management system. Due to this, even if data is deleted, the data is deleted logically and information including the deleted data can be displayed in a later display processing or the like.

The operation terminal inputs above-mentioned input items on the post code maintenance newly creation page, and transmits the data to the Web application server 101.

(6) The Web application server 101 fetches post data from the transmitted data, conducts a consistency check and the like, registers the post data in the post master, and transmits the master data after the registration to the operation terminal.

Figure 39:
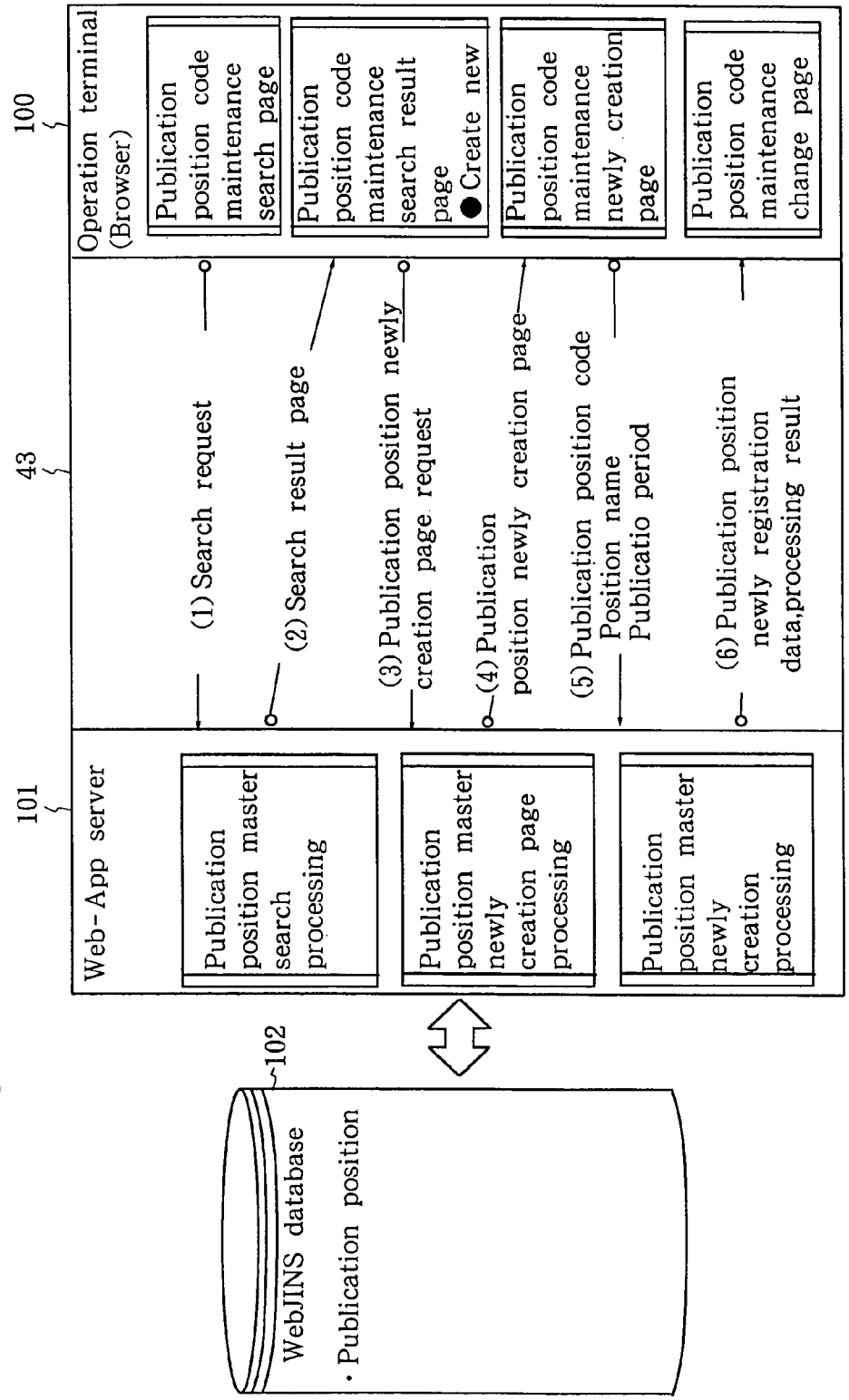
FIG. 39 is a view explaining the maintenance of a publication position in the maintenance function configuration.

FIG. 39 is a view explaining the maintenance of a publication position in the maintenance function configuration.

[Publication Position Maintenance]

The operation terminal executes a publication position creation processing. In the publication position master data creation processing, a publication position is determined while the position is tied to a edition (layout).

By designating a specific position on a specific edition as the publication position, this publication position serves as a standard for outputting the same manuscript to a plurality of editions.

Further, this function can be used only by the person in charge of the system.

(1) The operation terminal transmits a search request to the Web application server 101 on a publication position maintenance search page.

(2) The Web application server 101 transmits a publication position maintenance search result page to the operation terminal in response to the search request.

(3) The operation terminal can execute the inquiry, change or deletion, and duplication of data on the transmitted publication position search result page. By depressing "Create New" button in the lower left of the search result page, the operation terminal transmits a publication position maintenance new creation page request to the Web application server 101.

(4) The Web application server 101 creates a publication position maintenance new creation page based on the login company information in response to the received publication position maintenance new creation page request, and transmits the created page to the operation terminal.

(5) The operation terminal displays the transmitted publication position maintenance new creation page.

On the newly created page, an arbitrary code tied to a edition is designated as the publication position code, a name, a publication start day, a publication end day, a front page, non-editing target information (information on the use of data already used in the other parts), a processing method during the creation of index and the number of times of actual publication can be input as newly registered data.

In this case, the following respects should be taken into account. Data deletion should be carried out while recognizing that if publication instruction data already exists on the edition and the data is deleted, a book cannot be created. Normally, if the publication position is determined once and is used, contents other than that of the code can be changed arbitrarily according to purpose. However, the data itself must not be deleted.

Further, if a campaign such as a feature article of part-time jobs or the like is broaden on a magazine, the WEB maintenance system can cooperate with the composition system to automatically switch frame change by designating the publication start day and the publication end day in this publication position information.

The operation terminal inputs and selects the above-mentioned input/selection items on the publication position maintenance newly created page, and transmits the data to the Web application server 101.

(6) The Web application server 101 fetches publication position data from the transmitted data, conducts a consistency check and the like, registers the publication position data in the publication position master, and transmits the publication position master data after the registration to the operation terminal.

Figure 40:
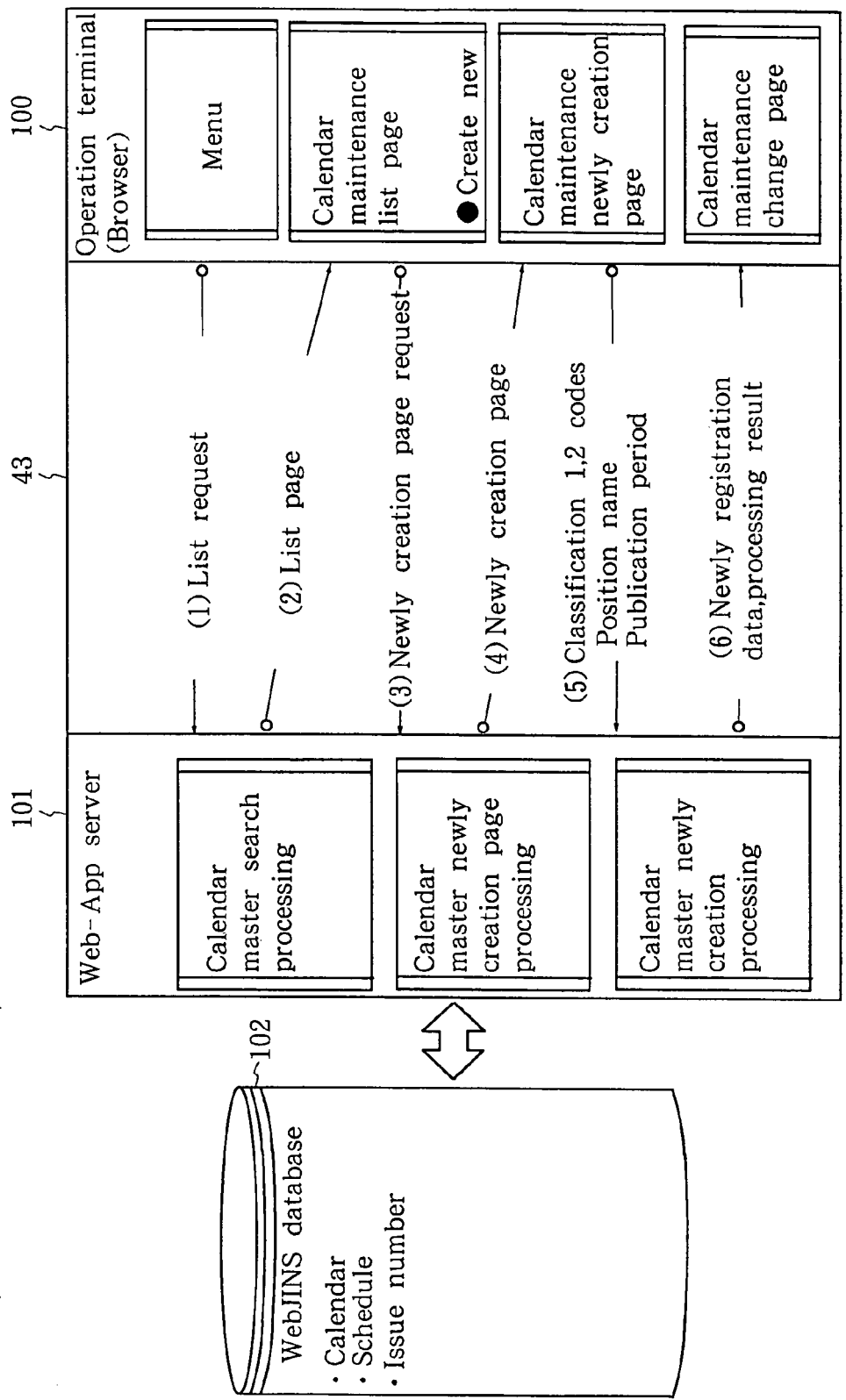
FIG. 40 is a view explaining the maintenance of a calendar in the maintenance function configuration.

FIG. 40 is a view explaining the calendar maintenance in the maintenance function configuration.

[Calendar Maintenance]

The operation terminal can execute a calendar master creation processing. The calendar master creation processing can be set for each edition (book) at the time of the registration of company information.

On this calendar, the publication schedule (publication day) of a book to be published by a company is set. Due to this, this calendar maintenance function is set by a person in charge of editing or system maintenance of the company. This function can be used only by the person authorized a right of system maintenance in the rights of use in the person-in-charge master maintenance.

(1) Based on information on a company which logs in from the operation terminal side, the operation terminal transmits a request of edition information owned by this company and calendar information attached to the edition information to the Web application server 101.

(2) The Web application server 101 transmits a calendar list page to the operation terminal in response to the list request.

(3) The operation terminal can execute the inquiry, change or deletion, and duplication of the calendar and the designation of a reference issuance size number and a day of issue on the transmitted calendar list page. By depressing "Create New" button in the lower left of the list page, the operation terminal transmits a calendar maintenance new creation page request to the Web application server 101.

The change or deletion of the calendar data should be carried out carefully. If the publication instruction and the sales information are already registered and the calendar information is changed or deleted, a book often cannot be published. Due to this, the person in charge of the maintenance of the system in which the calendar is to be changed or deleted should notify relevant persons of the change or deletion in advance and indicate them to put the data in good condition.

(4) The Web application server 101 sets the maximum calendar number given to the company+1 as a calendar number to create a calendar maintenance newly creation page based on the login company information in response to the received calendar maintenance newly creation page request, and transmits the created page to the operation terminal.

(5) The operation terminal displays the transmitted calendar maintenance new creation page.

On the newly created page, the operation terminal inputs a calendar name, a calendar creation period (year), a weekly day-of-issue pattern as newly registered data, and transmits a calendar new creation request to the Web application server 101.

(6) The Web application server 101 conducts a consistency check to the transmitted data and the like, registers the calendar master equal to the input values, and transmits the calendar master data to the operation terminal.

Figure 41:
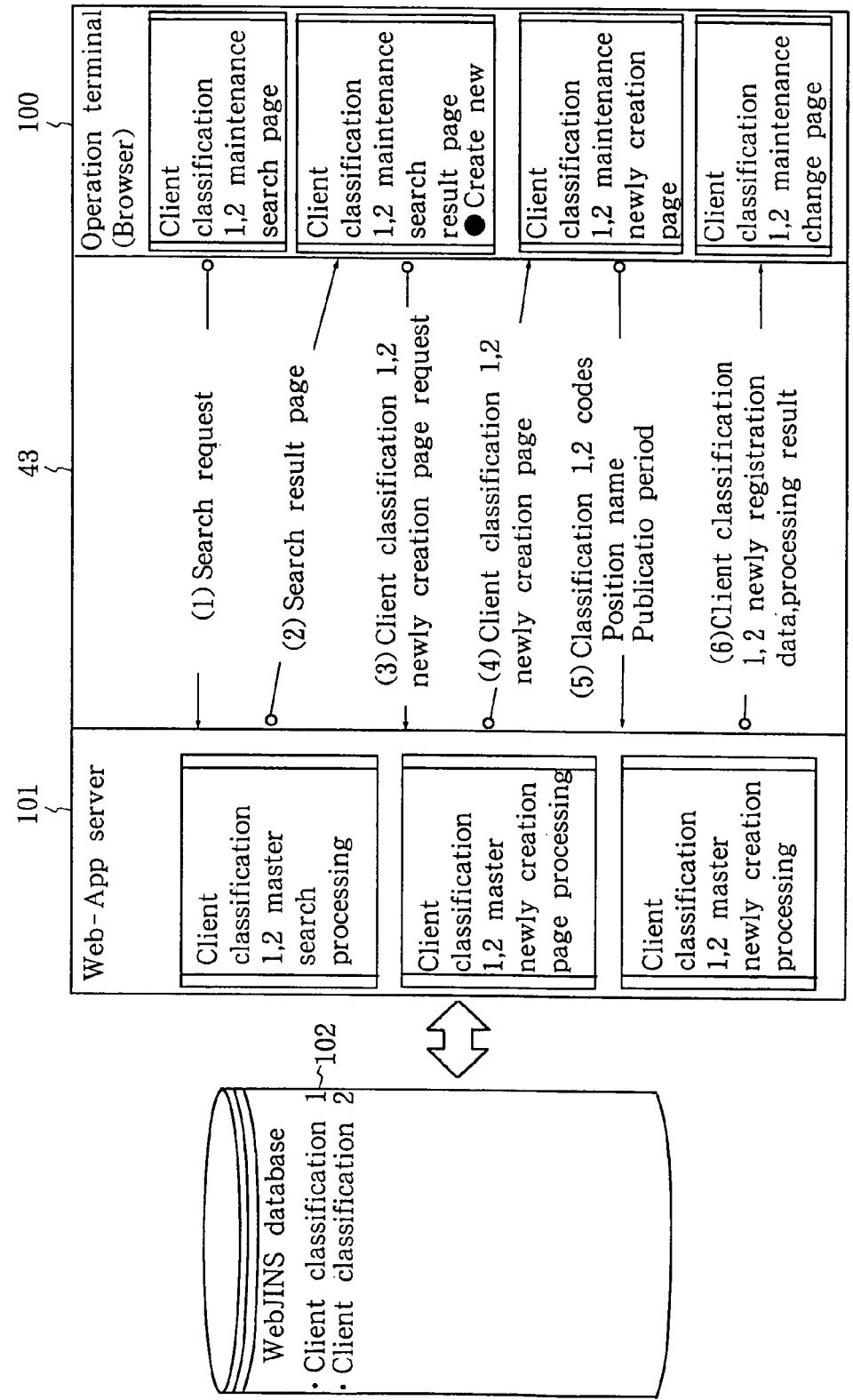
FIG. 41 is a view explaining the maintenance of client classification names in the maintenance function configuration.

FIG. 41 is a view explaining the maintenance of client classification names in the maintenance function configuration.

[Client Classification Name Maintenance]

The operation terminal can execute a processing for creating client classification 1 and 2 masters. The client classification 1 and 2 master data creation processing is the result of giving meanings to classification 1 and 2 codes at the time of the registration of the company information and the processing is used to classify client data.

Although the client classifications 1 and 2 can be set by each company, the setting depends on the company which manages the system.

In addition, this function can be used only by the person in charge of the system.

(1) The operation terminal transmits a search request to the Web application server 101 on a client classification name maintenance search page.

(2) The Web application server 101 transmits a client classification name maintenance search result page to the operation terminal in response to the search request.

(3) The operation terminal can execute the inquiry, change or deletion, and duplication of the data on the transmitted client classification name maintenance search result page. By depressing "Create New" button in the lower left of the search result page, the operation terminal transmits a client classification name maintenance new creation page request to the Web application server 101.

(4) The Web application server 101 creates a client classification name maintenance new creation page based on the login company information in response to the received client classification name maintenance new creation page request, and transmits the created page to the operation terminal.

(5) The operation terminal displays the transmitted client classification name maintenance new creation page.

On the newly created page, the company which publishes the book can designate arbitrary codes as client classification codes and the names of the codes can be input as newly registered data.

In this case, the following respects should be taken into account. If there is client master data having an already registered classification code, basically, the deletion of this data must not be executed. Normally, if the client classifications 1 and 2 are determined once and used, content other than those of the codes can be changed arbitrarily according to purpose regarding its name. However, the data itself must not be deleted. Further, if the codes are used while names are given thereto in advance and the names are greatly different from the initial names registered for the codes, the existing client information itself is of no significance. For these reasons, the client classification 1 and 2 information should be carefully changed.

The operation terminal inputs and selects the above-mentioned input items on the client classification name maintenance newly creation page, and transmits the data to the Web application server 101.

(6) The Web application server 101 fetches client classification 1 data or client classification 2 data from the transmitted data, conducts a consistency check and the like, registers the client classification 1 data or client classification 2 data in the client classification 1 master or client classification 2 master, and transmits the client classification 1 master data or client classification 2 master data to the operation terminal.

Figure 42:
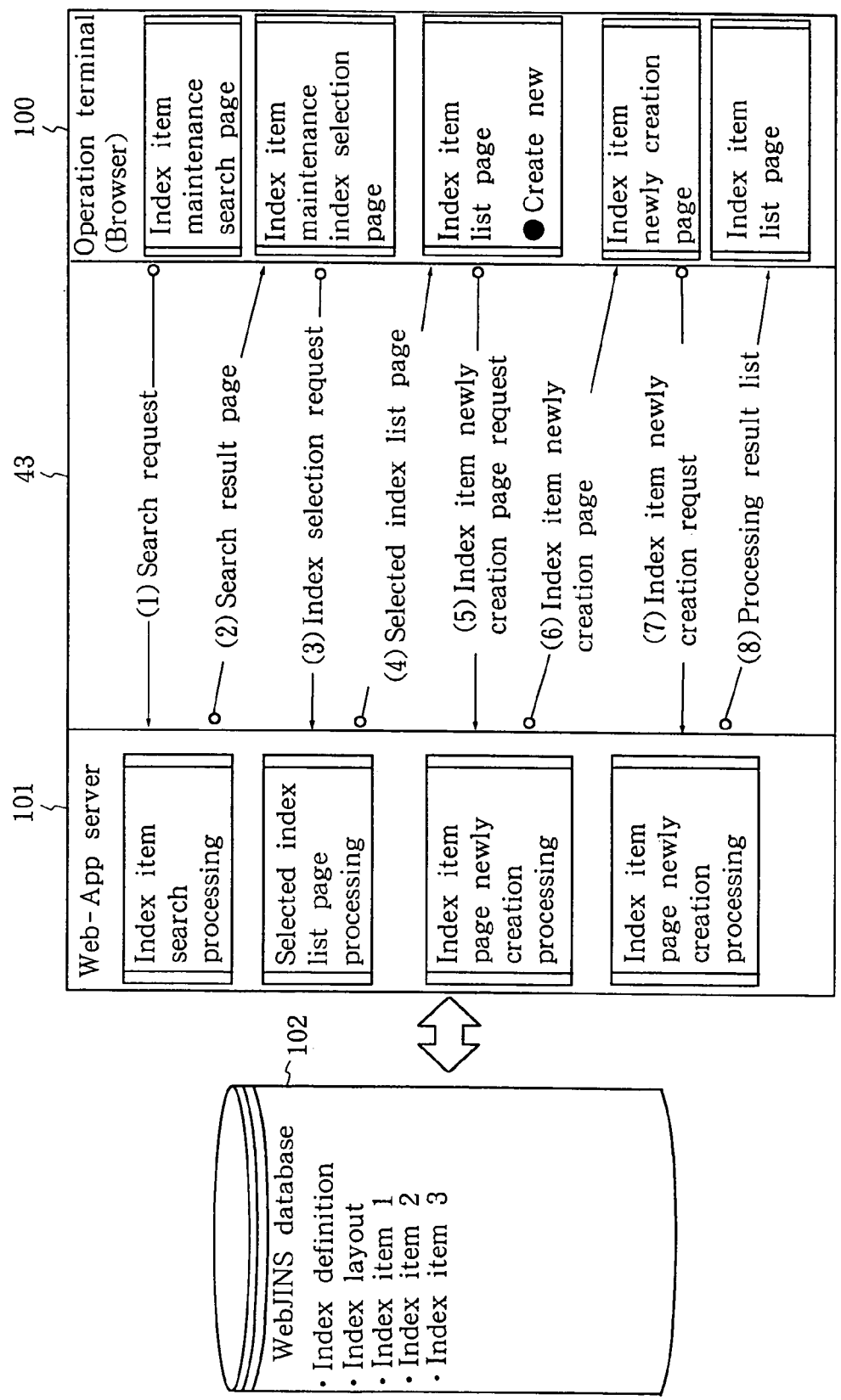
FIG. 42 is a view explaining the maintenance of index items in the maintenance function configuration.

FIG. 42 is a view explaining the maintenance of index items in the maintenance function configuration.

[Index Item Maintenance]

The operation terminal executes an index creation processing. The index data creation processing is determined while the processing is tied to index layout. By designating a specific position on a specific edition at the time of creating a manuscript, the index items can be created.

This index is used to create the index of a book to be published by a company. Due to this, this function is set by a person in charge of editing or system maintenance of the company. This function can be used only by the person authorized a right of system maintenance in the rights of use in the person-in-charge master maintenance.

(1) The operation terminal transmits a search request to the Web application server 101 on an index item maintenance search page.

(2) The Web application server 101 transmits an index item maintenance search result page to the operation terminal in response to the search request.

(3) The operation terminal can execute the inquiry, change or deletion, and duplication of the data on the transmitted index item maintenance search result page. By depressing "Create New" button in the lower left of the search result page, the operation terminal transmits an index item maintenance new creation page request to the Web application server 101.

In this case, the deletion of the data should be carried out while taking the following aspects into account. If an index code is already used in the manuscript data and the data is deleted, an index cannot be created. Normally, if index items are determined once and used, contents other than that of the index code can be changed arbitrarily according to purpose. However, the data itself must not be deleted.

(4) The Web application server 101 creates an index item maintenance new creation page based on the login company information in response to the received index item maintenance new creation page request, and transmits the created page to the operation terminal.

(5) The operation terminal displays the transmitted index item maintenance new creation page.

On the new creation page, index item codes and names can be input as newly registered data.

The operation terminal inputs the above-mentioned input items on the index item maintenance new creation page, and transmits the data to the Web application server 101.

(6) The Web application server 101 fetches index item data from the transmitted data, conducts a consistency check and the like, registers the index item data in index items (1), (2) and (3), respectively, and transmits the index item master data after the registration to the operation terminal.

FIG. 43 is a view explaining the change of the person in charge in the maintenance function configuration.

[Change of Person in Charge]

The system includes a function of allowing the operation terminal to change a person in charge of the registration of client and manuscript data in the same company. The function is as follows. An original person in charge and a person to replace the original person are designated and the original person in charge is changed to the person to replace the original person, whereby the post code and the person-in-charge code of transaction data (client and manuscript data) registered based on the post code and the person-in-charge code for the original person in charge are replaced by those for the person in charge to replace the original person.

(1) The operation terminal transmits a change request to the Web application server 101 on a person-in-charge change page.

(2) The Web application server 101 changes the post code and the person-in-charge code of target transaction data to those for the person to replace the original person in charge in response to the change request.

FIG. 44 is a view explaining an advertisement examination function in the maintenance function configuration.

[Advertisement Examination Function]

The system can tie advertisement agents and good clients to each company. If an agreement is concluded in this client form, a client itself registers manuscript data. As a result, there is a probability that inappropriate expressions appear on the notation of the content of a manuscript (content of an advertisement). This system includes a function of examining and correcting this manuscript (advertisement) notation so as to prevent unexamined manuscript data from becoming a composition processing target.

An advertisement examination right is given to each person in charge during the registration of the person-incharge master. Only the person in charge given this right can utilize the function of manuscript (advertisement) examination.

This advertisement examination function is displayed, as an initial screen/basic function processing button, only to the person in charge of login who is given the examination right by the registration of the person-in-charge master. The processing button is not displayed to the person in charge of login who is not given the examination right.

The advertisement examination processing button is depressed, a change mode manuscript input screen is displayed, and the content of an unexamined manuscript (advertisement) shown on an advertisement examination list screen is checked. If there is no problem, the examination status of the manuscript (advertisement) is changed from an unexamined state to an examined state and the changed examination status is registered, whereby the examination of the manuscript (advertisement) can be validated. In addition, if the content which has a notational problem is discovered, the content can be directly changed.

Next, the outline of a composition system locking processing will be described based on FIG. 45.

The composition system locking processing is intended to provide a function of allowing an ASP company to perform a processing of composing a book from the data registered in the company using a composition system such as an imposition processing.

Due to this, after holding a system utilization agreement with the system control management company, the ASP company can utilize the composition system by installing the system to the company.

If the ASP company has an output device (EDIAN), the page-up data after imposition and manuscript data on the page-up data as well as the data after the creation of the index which serves as index data can be fetched (manuscript text fetch and index text fetch can be performed) without performing the PS file creation processing. Thus, necessary information that constitutes the book is provided from this composition system locking function to the ASP company.

Based on the data having received the information, the ASP company independently creates a book using the EDIAN owned by the company.

If the ASP company has no output device (EDIAN), a PS file creation processing is executed for each edition, the same processings as those for the output of the block copy are performed, and the image of a book to be published is created as a PDF file. In addition, after the PS file is created for each edition, the data can be passed on to the entire paste step.

[Composition Login Processing]

(1) When the composition system starts, the composition system inputs information on a person in charge of use and a password from a login screen, and causes the Web application server 101 to determine whether to authenticate the person in charge based on an authentication user ID owned by the composition system.

(2) During authentication, the Web application server 101 checks composition layout, editions and frame size owned by the authentication user ID, selects information which can be used for a fetch processing, and supplies editable edition information (a processing result) to the composition system based on this information.

[Imposition Fetch Processing]

(1) After the authentication, the composition system can acquire information on editions which can be composed. The composition system selects and inputs an edition to be edited and an editing day from the acquired edition information. The composition system requests the Web application server 101 to perform an imposition data fetch processing.

(2) The Web application server 101 receives the request, checks the composition layout, edition, calendar, publication schedule, frame size imposition parameters, sheet, index definition, index format, index items (1), (2) and (3), publication position, publication instruction, manuscript, company, post, person in charge, client's master data, and client's transaction data based on the information on this edition and the editing day, creates imposition data, and transmits the created data to the composition system.

[Page-Up Processing]

(1) After the completion of the automatic editing processing and imposition processing of the composition system function, the composition system requests the Web application server 101 to perform a page-up processing based on the imposition data.

(2) The Web application server 101 receives the request, determines whether there is an output device, and branches the processing.

If there is an output device, the Web application server 101 creates block copy manuscript text data for each page-up processing, and transmits a page-up processing result to the composition system.

If there is no output device, the Web application server 101 creates block copy manuscript text data for each page-up processing, causes the output device to start an edition-basis manuscript block copy PS file creation processing.

The output device creates a PS file, and supplies the PS file to the PDF creation device. The PDF creation device creates a PDF file, and supplies the PDF file to the output device. The output device stores the received PDF file at a predetermined location in the Web application server 101. Thereafter, the page-up processing result is returned to the composition system.

[Manuscript Text Fetch Processing]

This function is effective only to the ASP company having an output device.

(1) After the completion of the page-up processing of the composition system function, the block copy manuscript text data for each page-up processing created by the page-up processing is downloaded to the operation terminal on which the composition system of the company is active.

(2) The Web application server 101 receives the request, and transmits the block copy manuscript text data created for each page-up processing to the operation terminal on which the composition system is active.

[Index Creation Processing]

(1) After the completion of the page-up processing of the composition system function, the composition system issues an index creation request to the Web application server 101.

(2) The Web application server 101 receives the request, determines whether there is an output device, and branches the processing.

If there is an output device, the Web application server 101 creates index data using index information contained in the block copy manuscript text data for each page-up processing based on the block copy manuscript text data, and transmits an index processing result to the composition system.

If there is no output device, the Web application server 101 causes the output device to start an edition-basis index PS file creation processing using index information contained in the block copy manuscript text data for each page-up processing based on the block copy manuscript text data, and the output device creates the PS file and supplies the PS file to the PDF creation device. The PDF creation device creates a PDF file, and supplies the PDF file to the output device. The output device stores the received PDF file in a predetermined location of the Web application server 101. Thereafter, the index creation processing result is returned to the composition system.

[Index Text Fetch Processing]

This function is effective only to the ASP company having an output device.

(1) After the completion of the index creation processing of the composition system function, the index text data for each page-up processing created by the index creation processing is downloaded to the operation terminal on which the composition system of the company is active.

(2) The Web application server 101 receives the request, transmits the index text data created for each page-up processing to the operation terminal on which the composition system is active.

[Publication Result Update Processing]

For the publication instruction data subjected to the page-up processing with a processing day and an edition designated, the publication result frame size is written to sales data and, by performing this page-up processing, advertisement proof output information is updated to advertisement proof data.

By performing this processing, the publication result frame size is calculated and the agreement frame size is consumed. Further, in relation to the manuscript data, the final publication day is updated as changed information.

Further, in the ASP company, based on the reset total classification determined during the conclusion of the agreement, the advertisement fee of the frame size calculated using the publication result frame size and the frame size unit price set during the agreement is updated to the sales data.

As stated so far, according to this invention, the user terminal and the Web application server can communicate with each other through the Internet network, and the Web application server executes the search request or update request for each data from the user terminal to the system database and the image database using the defined programs, whereby the user can freely perform automatic editing through the Internet network.

The invention claimed is:

1. An information magazine automatic editing system comprising:

a system database storing and accumulating at least client data, manuscript data, publication instruction data and sales data related to various information magazine editing and various constant data constituting a user and various information magazines;

an image database storing and accumulating at least image data of one of a logo and a map to appear on an advertisement;

an automatic editing, imposition and proofread device for fetching publication related data accumulated in the database, creating imposition data from the publication instruction data to perform automatic layout of a manuscript, and creating a page-up manuscript from the imposition data;

an editing layout device for fetching and displaying the page-up manuscript created by the automatic editing, imposition and proofread device and the image data stored in the image database, and transmitting the manuscript data transmission-requested from each user terminal to a client through transmission software as a block copy image;

the user terminal searching and inputting at least the client data, the publication instruction data, the manuscript data, and the sales data related to the information magazine editing; and a web application server executing a search request or an update request from the user terminal for each of the data to the system database and the image database using defined programs, wherein the user terminal and the web application server communicate with each other through an Internet network.

2. The information magazine automatic editing system according to claim 1, wherein the search request or the update request for automatic editing processing data is issued from the user terminal by requesting, from a client side browser, a defined JAVA script program of the web application server to start a system search and input screen and by processing the search request or the update request transmitted through a communication device and the Internet network as a browser request by the defined JAVA script program of the web application server, during monitoring the issued requests, if the web application server receives one of the requests from the user terminal, the web application server acquires a content of the request for the defined JAVA script program from the user terminal, and if the web application server receives the search request for client information, the web application server requests the image database to search the client information having a designated client code and transmits the requested and searched client information to each of the user terminals through the Internet network, and the client side browser of the user terminal monitors the one issued request until the client side browser receives a response to the request after transmitting the request, displays a content of the response on a screen of the user terminal and appropriately continues later processings.

3. The information magazine automatic editing system according to claim 1, wherein the editing layout device transmits as the block copy image, the manuscript data, for which the portable terminal or each said user terminal issues a facsimile transmission request, to a client facsimile through facsimile software.

4. The information magazine automatic editing system according to claim 1, wherein the web application server comprises a web server and a separate application server.

5. The information magazine automatic editing system according to claim 1, including a maintenance terminal that registers information on plural application service provider companies that use the database system and agreement information for each of the companies that use the database system.

6. The information magazine automatic editing system according to claim 5, including a data storage region in the database system for each said application service provider company registered in the database system, each said storage region storing data on the publication of a manuscript including a person in charge and a composition layout publication calendar.

7. The information magazine automatic editing system according to claim 5, wherein the companies select between a flat-rate plan agreement having a fixed rate, a flexible agreement that has a rate charge based on the actually published frame size, and a result-basis agreement where charges are accrued at the end of a time period according to actual publication size.

8. The information magazine automatic editing system according to claim 1, wherein the automatic editing system is utilized by a plurality of application service provider companies to edit and prepare manuscripts over the Internet network that are sold as publications to a plurality of subscribers over the Internet network.

9. The information magazine automatic editing system according to claim 1, wherein manuscript data is capable of being deleted and new manuscripts are capable of being registered using a client code.

10. The information magazine automatic editing system according to claim 1, wherein a publication instruction creating process creates a publication from one of the manuscripts.

11. The information magazine automatic editing system according to claim 10, wherein a publication number for a publication to be purchased is checked to ensure that the publication number does not exceed the number of remaining issues of publication.

12. The information magazine automatic editing system according to claim 1, including a business office local area network connected to an editing section local area network.

13. A magazine automatic editing system comprising:

a system database for storing and accumulating at least client data, manuscript data, publication instruction data and sales data, the database system having data storage regions for each of a plurality of application service provider companies that utilize the editing system and each said data storage region storing various constant data for a respective one of said application service provider companies and storing various magazines for the respective said application service provider company;

an image database for storing and accumulating image data to appear on an advertisement;

an automatic editing, imposition and proofread device for fetching publication related data accumulated in the database, creating imposition data from the publication instruction data to perform automatic layout of a manuscript, and for creating a page-up manuscript from the imposition data;

an editing layout device for fetching and displaying the manuscript created by the automatic editing, imposition and proofread device and the image data stored in the image database, and transmitting the manuscript data as a block copy image;

a user terminal for searching and inputting at least the client data, the publication instruction data, the manuscript data, and the sales data related to the magazine editing for a given said application service provider company; and a web application server connected to the user terminal through an Internet network for executing a search request or an update request from the user terminal for the data in the system database and the image database, wherein the application service provider companies edit and prepare manuscripts over the Internet network that are sold as publications to a plurality of purchasers over the Internet network.

* * * * *